(12) United States Patent
Futaki et al.

(10) Patent No.: US 11,943,819 B2
(45) Date of Patent: Mar. 26, 2024

(54) RADIO TERMINAL, RADIO STATION, CORE NETWORK NODE, AND METHOD THEREIN

(71) Applicant: NEC CORPORATION, Tokyo (JP)

(72) Inventors: Hisashi Futaki, Tokyo (JP); Sadafuku Hayashi, Tokyo (JP)

(73) Assignee: NEC CORPORATION, Tokyo (JP)

(*) Notice: Subject to any disclaimer, the term of this patent is extended or adjusted under 35 U.S.C. 154(b) by 964 days.

(21) Appl. No.: 15/779,208

(22) PCT Filed: Sep. 13, 2016

(86) PCT No.: PCT/JP2016/004165
§ 371 (c)(1),
(2) Date: May 25, 2018

(87) PCT Pub. No.: WO2017/115452
PCT Pub. Date: Jul. 6, 2017

(65) Prior Publication Data
US 2021/0212131 A1 Jul. 8, 2021

(30) Foreign Application Priority Data

Dec. 28, 2015 (JP) .................................. 2015-256034

(51) Int. Cl.
*H04W 76/10* (2018.01)
*H04W 8/24* (2009.01)
*H04W 76/27* (2018.01)

(52) U.S. Cl.
CPC ............. *H04W 76/10* (2018.02); *H04W 8/24* (2013.01); *H04W 76/27* (2018.02)

(58) Field of Classification Search
CPC ..... H04W 4/023; H04W 60/04; H04W 68/02; H04W 68/04; H04W 68/06; H04W 8/005;
(Continued)

(56) References Cited

U.S. PATENT DOCUMENTS

| 9,118,464 | B2 | 8/2015 | Nix |
| 10,270,892 | B2 * | 4/2019 | Chen ..................... H04W 4/70 |

(Continued)

FOREIGN PATENT DOCUMENTS

| CN | 103929733 A | 7/2014 |
| RU | 2566981 C2 | 10/2015 |
| WO | 2014045319 A1 | 3/2014 |
| WO | 2014130713 A1 | 8/2014 |
| WO | WO 2016/2000357 A1 * | 12/2016 ............. H04W 4/00 |
| WO | 2017/123417 A1 | 7/2017 |

OTHER PUBLICATIONS

NTT Docomo, Inc., "Necessary IEs in Message 3", 3GPP TSG-RAN2#93bis, R2-162661, Apr. 11-15, 2016, Dubrovnik, Croatia, 5 pages total.

(Continued)

*Primary Examiner* — Joseph Arevalo
(74) *Attorney, Agent, or Firm* — Sughrue Mion, PLLC

(57) ABSTRACT

A radio terminal (1) is configured to transmit, to a radio station (2), a Radio Resource Control (RRC) connection setup complete message including a UE assistance information element indicating which of a plurality of communication architecture types for data packet transmission relating to Cellular Internet of Things (CIoT) the radio terminal desires to use, the radio terminal supports, or the radio terminal is configured with. As a result, with regard to a specific communication procedure involving determination of communication architecture used for a radio terminal serving as a CIoT device, it is for example possible to contribute to enhancement of efficiency of the communication procedure, reduction of signaling messages, or appropriate CN selection.

17 Claims, 28 Drawing Sheets

(58) Field of Classification Search
CPC ......... H04W 8/02; H04W 76/27; H04W 4/70; H04W 76/10; H04W 76/25; H04W 60/00; H04W 48/18; H04W 76/11; H04W 76/12; H04W 8/08; H04W 48/16; H04W 84/042; H04W 80/10; H04W 12/06; H04W 24/08; H04W 76/18; H04W 76/34; H04W 24/10; H04W 36/0022; H04W 76/19; H04W 76/22; H04W 24/02; H04W 36/14; H04W 48/12; H04W 76/30; H04W 8/24; H04W 84/12; H04W 88/06; H04W 4/20; H04W 76/15; H04W 8/06; H04W 28/0205; H04W 4/90; H04W 72/04; H04W 72/535; H04W 76/20; H04W 76/38; H04W 8/18; H04W 84/18; H04W 12/037; H04W 12/08; H04W 28/24; H04W 48/20; H04W 72/21; H04W 8/22; H04W 84/00; H04W 28/0215; H04W 28/0247; H04W 52/0216; H04W 52/0219; H04W 52/028; H04W 72/20; H04W 72/23; H04W 74/0833; H04W 76/50; H04W 8/04; H04W 80/02; H04W 88/14; H04W 12/0431; H04W 12/72; H04W 28/065; H04W 36/00837; H04W 36/0094; H04W 4/02; H04W 48/02; H04W 64/00; H04W 64/003; H04W 72/1273; H04W 72/51; H04W 76/14; H04W 76/16; H04W 88/04; H04W 12/02; H04W 12/03; H04W 12/033; H04W 12/0471; H04W 12/069; H04W 12/68; H04W 28/02; H04W 28/0252; H04W 28/0268; H04W 28/0289; H04W 28/04; H04W 28/06; H04W 28/16; H04W 28/18; H04W 36/0009; H04W 36/0033; H04W 36/0038; H04W 36/0066; H04W 36/0085; H04W 36/08; H04W 36/12; H04W 36/16; H04W 4/025; H04W 4/029; H04W 4/14; H04W 4/80; H04W 48/06; H04W 48/08; H04W 52/02; H04W 52/0212; H04W 52/0229; H04W 52/0251; H04W 52/0258; H04W 60/005; H04W 60/02; H04W 64/006; H04W 68/005; H04W 72/0466; H04W 72/53; H04W 72/542; H04W 74/08; H04W 76/00; H04W 76/32; H04W 80/04; H04W 80/08; H04W 84/06; H04W 88/02; H04W 92/10; H04W 92/20; H04W 12/04; H04W 12/041; H04W 12/10; H04W 12/106; H04W 16/28; H04W 24/04; H04W 28/0226; H04W 36/0058; H04W 36/0069; H04W 36/0077; H04W 36/06; H04W 36/305; H04W 36/32; H04W 36/36; H04W 4/40; H04W 4/50; H04W 40/20; H04W 68/00; H04W 74/004; H04W 74/006; H04W 76/23; H04W 8/183; H04W 8/26; H04W 84/047; H04W 88/08; H04W 88/085; H04W 88/12; H04W 92/12; H04W 92/22; H04M 1/724
USPC ....... 370/328, 352, 329, 252, 311, 401, 216, 370/281, 350, 235, 332, 331, 230, 310, 370/474, 312
See application file for complete search history.

(56) References Cited

U.S. PATENT DOCUMENTS

| | | | |
|---|---|---|---|
| 10,298,549 B2* | 5/2019 | Lee | H04L 63/16 |
| 10,326,689 B2* | 6/2019 | Liu | H04W 40/20 |
| 10,749,721 B2* | 8/2020 | Fertonani | H04L 1/1893 |
| 2013/0100895 A1 | 4/2013 | Aghili et al. | |
| 2013/0122913 A1* | 5/2013 | Agarwal | H04W 72/04 455/439 |
| 2015/0085803 A1 | 3/2015 | Hu et al. | |
| 2015/0089164 A1* | 3/2015 | Ware | G11C 5/02 711/149 |
| 2015/0312835 A1* | 10/2015 | Subramanian | H04W 52/0206 455/445 |
| 2017/0187691 A1* | 6/2017 | Lee | H04L 9/0822 |
| 2018/0184246 A1* | 6/2018 | Ryu | H04W 68/06 |
| 2018/0220289 A1* | 8/2018 | Ryu | H04W 4/02 |
| 2018/0324652 A1* | 11/2018 | Ryu | H04W 36/12 |
| 2018/0352416 A1* | 12/2018 | Ryu | H04W 4/70 |
| 2019/0191295 A1* | 6/2019 | Jain | H04W 28/02 |
| 2019/0313288 A1* | 10/2019 | Li | H04W 56/0045 |
| 2020/0045521 A1* | 2/2020 | Tamura | H04W 4/20 |
| 2021/0168583 A1* | 6/2021 | Kuge | H04W 28/06 |

OTHER PUBLICATIONS

Extended European Search Report dated May 29, 2019 issued by the European Patent Office in counterpart application No. 16881433.3.

"3rd Generation Partnership Project; Technical Specification Group Services and System Aspects; Architecture enhancements for Cellular Internet of Things (Release 13)", 3GPP TR 23.720 V1.2.0, Nov. 2015, 96 pages.

HTC, "RRC aspects in NB-Iot", 3GPP TSG-RAN2 Meeting #92, R2-156425, Nov. 16-20, 2015, Anaheim, USA, 19 pages.

NEC, "Remaining issues related to CT1/SA2 questions", 3GPP TSG RAN2#93, R2-161664, Feb. 15-19, 2016, 7 pages, St. Julians', Malta.

Qualcomm Incorporated, "NB-IoT SA2 architecture implications," 3GPP TSG RAN WG2 #92, Tdoc R2-156645, Nov. 16-20, 2015, 3 pages, Anaheim, USA.

International Search Report for PCT/JP2016/004165 dated Nov. 29, 2016 (PCT/ISA/210).

Alcatel-Lucent et al., "Introduction of attach procedure changes for CIoT EPS optimization", 3GPP TSG SA WG2 Meeting #112, S2-154452, Anaheim, USA, Nov. 16-20, 2015, 15 pages total.

Huawei et al., NB-IOT-PDCP Layer Functions, 3GPP TSG-RAN WG2 #91BIS, R2-154511, Malmo, Sweden, Oct. 5-9, 2015, 2 pages total.

Notice of Grounds for Rejection dated May 20, 2019 issued by the Korean Intellectual Property Office in counterpart Application No. 10-2018-7018555.

Communication dated Mar. 20, 2019, from the Russian Patent and Trademark Office in counterpart application No. 2018123306/08.

LG Electronics, "Interaction between CP & UP solution", 3GPP, SA WG2 Meeting S2#112, S2-153925, Nov. 16-20, 2015, pp. 1-3 (total 3 pages).

Huawei (Rapporteur), "Running 36.300 CR to capture agreements on NB-IoT", 3GPP TSG-RAN WG2 Meeting #92, Nov. 16-20, 2015, R2-157187, total 18 pages.

Communication dated May 4, 2020 from the Korean Intellectual Property Office in Application No. 10-2020-7004535.

Communication dated Mar. 19, 2020, from the Intellectual Property of India in application No. 201817018309.

* cited by examiner

RADIO TERMINAL, RADIO STATION, CORE NETWORK NODE, AND METHOD THEREIN

CROSS REFERENCE TO RELATED APPLICATIONS

This application is a National Stage of International Application No. PCT/JP2016/004165 filed Sep. 13, 2016, claiming priority based on Japanese Patent application No. 2015-256034, filed Dec. 28, 2015, the disclosure of which is incorporated herein in its entirety by reference.

TECHNICAL FIELD

The present disclosure relates to a radio communication system that supports a plurality of communication architecture types for data transmission.

BACKGROUND ART

In the 3rd Generation Partnership Project (3GPP), standardization of Cellular Internet of Things (CIoT) has been underway. The intended CIoT in the 3GPP includes Long Term Evolution enhanced Machine to Machine (LTE eMTC) and Narrowband IoT (NB-IoT). The characteristic features of the LTE eMTC and the NB-IoT include ultra-low User Equipment (UE) power consumption, a larger number of devices per cell, narrow-band spectrums, and extended coverages. In the LTE eMTC (Category M), it is specified that reception UE Radio Frequency (RF) bandwidth is 1.4 MHz. Meanwhile, in the NB-IoT, it is assumed that a peak rate for downlink and uplink is 200 kbps or 144 kbps for optimizing the cost, reducing the power consumption, and extending the coverage even further, and UE RF bandwidth is about 200 kHz (effective bandwidth is 180 kHz) for both uplink and downlink.

Non-patent Literature 1 discloses several communication architecture solutions for infrequent small data transmission in the NB-IoT. These solutions include architecture for data transmission through a control plane (Solution 2), and architecture for data transmission through a user plane involving suspension and resumption of an RRC connection (Solution 18). In Non-patent Literature 1, support of Solution 2 is mandatory for both the UE and the network, while support of Solution 18 is optional for both the UE and the network.

The solution 2 is based on lightweight core network (CN) architecture for CIoT. In the lightweight CN architecture, in consideration of typical use cases for CIoT devices, a core network supports only a limited number of functions, compared to the number of those in CN entities according to the existing LTE (i.e., a Mobility Management Entity (MME), a Serving Gateway (S-GW), and a Packet Data Network Gateway (P-GW)). FIG. 1 shows network architecture for CIoT in a non-roaming case.

The CIoT Serving Gateway Node (C-SGN) is a new logical network entity. The C-SGN is a CN node having both a control plane (CP) and a user plane (UP). The C-SGN provides a limited Mobility Management (MM) procedure for CIoT devices, a small data transmission procedure, a security procedure for small data transmission, and a termination of an SGi interface for the non-roaming case. The P-GW function may be separated from the C-SGN. In this case, an S5 interface is used between the C-SGN and the P-GW. In the roaming case, the C-SGN provides an S8 interface.

The S1-lite interface is an optimized version of S1-C (S1-MME). The S1-lite interface supports necessary S1 Application Protocol (S1AP) messages and information elements (IEs) for CIoT procedures, and supports optimized security procedures. For efficient small data transmission, user data is delivered through the S1AP layer.

Specifically, in the case of Mobile Originated (MO) small data transmission for the non-roaming case, the UE transmits an uplink Non-Access Stratum (NAS) message carrying a small data packet (e.g., Internet Protocol (IP), non-IP, or short message service (SMS)). This uplink NAS message arrives at the C-SGN through the CIoT Base Station (CIoT BS). The uplink NAS message is transmitted on a Signaling Radio Bearer (SRB). Therefore, it is unnecessary to set up a Data Radio Bearer (DRB). Further, Access Stratum (AS) security may be omitted.

The C-SGN decrypts the uplink NAS message to obtain the small data packet. The C-SGN forwards the small data packet according to the data type of the small data packet. For IP small data, the C-SGN sends it over the SGi interface. For SMS, the C-SGN sends it to an entity related to the SMS (e.g., SMS Gateway Mobile Services Switching Center (SMS-GMSC), SMS Interworking Mobile Services Switching Center (SMS-IWMSC), or SMS router). For Non-IP small data, the C-SGN sends it to the Service Capability Exposure Function (SCEF).

In the case of Mobile Terminated (MT) small data transmission for the non-roaming case, the C-SGN transmits a downlink NAS message carrying a small data packet to the UE through the CIoT BS. Any DRB is also not required for downlink small data packet transmission and AS security may be omitted.

The CIoT BS shown in FIG. 1 is a base station located in a CIoT Radio Access Network (CIoT RAN). An LTE eNB that is configured to be connected to the C-SGN may be used in place of the CIoT BS shown in FIG. 1. This LTE eNB may be an eNB that supports the LTE eMTC.

Meanwhile, architecture according to the solution 18 provides infrequent small data transmission on the user plane. The architecture according to the solution 18 has the feature of reusing information obtained from the previous RRC connection for the subsequent RRC connection setup, thereby reducing the number of signalings required for UE Radio Resource Control (RRC) state transition.

Specifically, a UE enters RRC-Idle mode from RRC-Connected mode and retains information about the RRC connection (e.g., an Access Stratum Security Context, bearer related information (incl. RoHC state information), and L2/1 parameters when applicable) while it is in RRC-Idle mode. Similarly, an eNB retains information about the RRC connection of the UE (e.g., the Access Stratum Security Context, bearer related information (incl. RoHC state information), and L2/1 parameters when applicable). Further, the eNB and an MME retain S1AP UE Contexts. Furthermore, the eNB retains S1-U tunnel addresses.

When the UE returns to RRC-Connected mode, it sends a RRC Connection Resume Request to the eNB. The eNB restores a DRB(s), a security context, an S1AP connection, and an S1-U tunnel(s) based on the previously retained information about the RRC connection. Further, the eNB notifies the MME of the UE state change using a new S1AP message (i.e., S1-AP UE Context Active). The MME changes the Evolved Packet System (EPS) Connection Management (ECM) state of the UE to the ECM-Connected state, and then sends a Modify Bearer Request message to an S-GW. As a result, the S-GW recognizes that the UE is in the connected state and hence enters a state in which the S-GW can transmit downlink data to the UE.

In the solution 18, a UE can return to RRC-Connected and ECM-Connected without transmitting a NAS message (i.e., Service Request). Further, compared to the legacy RRC connection setup procedure, the following RRC messages can be removed:

RRC Connection Setup Complete;
RRC Security Mode Command;
RRC Security Mode Complete;
RRC Connection Reconfiguration; and
RRC Connection Reconfiguration Complete.

Non-patent Literature 2 describes that a UE may decide, during the attach procedure, which of the architecture of the solution 2 and the architecture of solution 18 it desires to use. Further, Non-patent Literature 2 describes that an AS or NAS procedure may include information to allow the network to select the solution 2 or the solution 18 for data transmission.

CITATION LIST

Non Patent Literature

Non-patent Literature 1: 3GPP TR 23.720 V1.2.0 (2015-11), "3rd Generation Partnership Project; Technical Specification Group Services and System Aspects; Architecture enhancements for Cellular Internet of Things (Release 13)", November 2015

Non-patent Literature 2: 3GPP R2-156645, Qualcomm Incorporated, "NB-IoT SA2 architecture implications", 3GPP TSG RAN WG2 #92, Anaheim, USA, 16-20 Nov. 2015

SUMMARY OF INVENTION

Technical Problem

The inventors have studied communication architecture for CIoT and communication architecture for reducing power consumption of radio terminals and have found several problems. For example, Non-patent Literature 1 and 2 fails to disclose a specific procedure for determining an architecture type to be used for data packet transmission for a UE from among a plurality of communication architecture types (e.g., the solutions 2 and 18). The inventors have studied specific communication procedures involving determination (or selection) of communication architecture used for a UE serving as a CIoT device and have conceived several improvements that contribute, for example, to enhancement of efficiency of the communication procedures, reduction of signaling messages, or appropriate CN selection.

Further, for example, Non-patent Literature 1 and 2 does not sufficiently consider mobility of UEs serving as CIoT devices. The mobility of CIoT devices include a cell change in idle mode (e.g., RRC-Idle) (i.e., idle-mode mobility) and a cell change in connected mode (e.g., RRC-Connected mode) (i.e., connected-mode mobility). The inventors have conceived several improvements for mobility procedures for CIoT devices.

One of the objects to be attained by embodiments disclosed herein is to provide an apparatus, a method, and a program that contribute to enhancement of efficiency of a communication procedure, reduction of signaling messages, or appropriate CN selection, with regard to a specific communication procedure involving determination (or selection) of communication architecture used for a UE serving as a CIoT device. It should be noted that the above-described object is merely one of the objects to be attained by the embodiments disclosed herein. Other objects or problems and novel features will be made apparent from the following description and the accompanying drawings.

Solution to Problem

In a first aspect, a radio terminal includes a memory and at least one processor coupled to the memory. The at least one processor is configured to transmit to a radio station a Radio Resource Control (RRC) connection request message including an establishment cause or another information element indicating which of a plurality of communication architecture types for data packet transmission relating to Cellular Internet of Things (CIoT) the radio terminal desires to use, the radio terminal supports, or the radio terminal is configured with.

In a second aspect, a method in a radio terminal includes transmitting to a radio station a Radio Resource Control (RRC) connection request message including an establishment cause or another information element indicating which of a plurality of communication architecture types for data packet transmission relating to Cellular Internet of Things (CIoT) the radio terminal desires to use, the radio terminal supports, or the radio terminal is configured with.

In a third aspect, a radio station includes a memory and at least one processor coupled to the memory. The at least one processor is configured to receive a Radio Resource Control (RRC) connection request message from a radio terminal. The at least one processor is further configured to retrieve, from the RRC connection request message, an establishment cause or another information element indicating which of a plurality of communication architecture types for data packet transmission relating to Cellular Internet of Things (CIoT) the radio terminal desires to use, the radio terminal supports, or the radio terminal is configured with.

In a fourth aspect, a method in a radio station includes: (a) receiving a Radio Resource Control (RRC) connection request message from a radio terminal; and (b) retrieving, from the RRC connection request message, an establishment cause or another information element indicating which of a plurality of communication architecture types for data packet transmission relating to Cellular Internet of Things (CIoT) the radio terminal desires to use, the radio terminal supports, or the radio terminal is configured with.

In a fifth aspect, a radio terminal includes a memory and at least one processor coupled to the memory. The at least one processor is configured to transmit to a radio station a Radio Resource Control (RRC) connection setup complete message including a UE assistance information element indicating which of a plurality of communication architecture types for data packet transmission relating to Cellular Internet of Things (CIoT) the radio terminal desires to use, the radio terminal supports, or the radio terminal is configured with.

In a sixth aspect, a method in a radio terminal includes transmitting to a radio station a Radio Resource Control (RRC) connection setup complete message including a UE assistance information element indicating which of a plurality of communication architecture types for data packet transmission relating to Cellular Internet of Things (CIoT) the radio terminal desires to use, the radio terminal supports, or the radio terminal is configured with.

In a seventh aspect, a radio station includes a memory and at least one processor coupled to the memory. The at least one processor is configured to receive a Radio Resource Control (RRC) connection setup complete message from a radio terminal. The at least one processor is further configured to retrieve, from the RRC connection setup complete message, a UE assistance information element indicating which of a plurality of communication architecture types for data packet transmission relating to Cellular Internet of Things (CIoT) the radio terminal desires to use, the radio terminal supports, or the radio terminal is configured with.

In an eighth aspect, a method in a radio station includes: (a) receiving a Radio Resource Control (RRC) connection setup complete message from a radio terminal; and (b) retrieving, from the RRC connection setup complete message, a UE assistance information element indicating which of a plurality of communication architecture types for data packet transmission relating to Cellular Internet of Things (CIoT) the radio terminal desires to use, the radio terminal supports, or the radio terminal is configured with.

In a ninth aspect, a radio station includes a memory and at least one processor coupled to the memory. The at least one processor is configured to receive a Radio Resource Control (RRC) connection setup complete message from a radio terminal. The at least one processor is further configured to, when a second communication architecture type in which a data packet is transmitted through a user plane is selected to be used for the radio terminal from among a plurality of communication architecture types relating to Cellular Internet of Things (CIoT), generate an initial UE message including an initial Non-Access Stratum (NAS) message, retrieved from the RRC connection setup complete message, and a downlink tunnel endpoint identifier used in the second communication architecture type. The at least one processor is still further configured to transmit the initial UE message to a core network.

In a tenth aspect, a method in a radio station includes:
 (a) receiving a Radio Resource Control (RRC) connection setup complete message from a radio terminal;
 (b) when a second communication architecture type in which a data packet is transmitted through a user plane is selected to be used for the radio terminal from among a plurality of communication architecture types relating to Cellular Internet of Things (CIoT), generating an initial UE message, the initial UE message including an initial Non-Access Stratum (NAS) message, retrieved from the RRC connection setup complete message, and a downlink tunnel endpoint identifier used in the second communication architecture type; and
 (c) transmitting the initial UE message to a core network.

In an eleventh aspect, a core network node includes a memory and at least one processor coupled to the memory. The at least one processor is configured to receive an initial UE message from a base station. The initial UE message includes an initial Non-Access Stratum (NAS) message, transmitted from a radio terminal, and an information element indicating a communication architecture type determined by the radio station from among a plurality of communication architecture types for data packet transmission relating to Cellular Internet of Things (CIoT). The at least one processor is further configured to determine, based on the information element, to reroute the initial NAS message to a core network corresponding to the determined communication architecture type. The at least one processor is still further configured to transmit to the radio station a reroute NAS message request message indicating that the initial NAS message is to be rerouted to the corresponding core network.

In a twelfth aspect, a method in a core network node includes:
 (a) receiving an initial UE message from a base station, the initial UE message including an initial Non-Access Stratum (NAS) message transmitted from a radio terminal, and an information element indicating a communication architecture type determined by the radio station from among a plurality of communication architecture types for data packet transmission relating to Cellular Internet of Things (CIoT);
 (b) determining, based on the information element, to reroute the initial NAS message to a core network corresponding to the determined communication architecture type; and
 (c) transmitting to the radio station a reroute NAS message request message indicating that the initial NAS message is to be rerouted to the corresponding core network.

In a thirteenth aspect, a core network node includes a memory and at least one processor coupled to the memory. The at least one processor is configured to receive an initial UE message from a base station. The initial UE message includes an initial Non-Access Stratum (NAS) message, transmitted from a radio terminal, and an information element indicating which of a plurality of communication architecture types for data packet transmission relating to Cellular Internet of Things (CIoT) the radio terminal desires to use, the radio terminal supports, or the radio terminal is configured with. The at least one processor is also configured to determine, based on the information element, a communication architecture type to be used for data packet transmission for the radio terminal. The at least one processor is further configured to determine to reroute the initial NAS message to a core network corresponding to the determined communication architecture type. The at least one processor is still further configured to transmit to the radio station a reroute NAS message request message indicating that the initial NAS message is to be rerouted to the corresponding core network.

In a fourteenth aspect, a method in a core network node includes:
 (a) receiving an initial UE message from a base station, the initial UE message including an initial Non-Access Stratum (NAS) message, transmitted from a radio terminal, and an information element indicating which of a plurality of communication architecture types for data packet transmission relating to Cellular Internet of Things (CIoT) the radio terminal desires to use, the radio terminal supports, or the radio terminal is configured with;
 (b) determining, based on the information element, a communication architecture type to be used for data packet transmission for the radio terminal;
 (c) determining to reroute the initial NAS message to a core network corresponding to the determined communication architecture type; and
 (d) transmitting to the radio station a reroute NAS message request message indicating that the initial NAS message is to be rerouted to the corresponding core network.

In a fifteenth aspect, a program includes a set of instructions (software codes) that, when loaded into a computer, causes the computer to perform a method according to the above-described second, fourth, sixth, eighth, tenth, twelfth, or fourteenth aspect.

Advantageous Effects of Invention

According to the above-described aspects, it is possible to provide an apparatus, a method, and a program that contribute to enhancement of efficiency of a communication procedure, reduction of signaling messages, or appropriate CN selection, with regard to a specific communication procedure involving determination (or selection) of communication architecture used for a UE serving as a CIoT device.

DESCRIPTION OF EMBODIMENTS

Specific embodiments are described hereinafter in detail with reference to the drawings. The same or corresponding elements are denoted by the same symbols throughout the drawings, and duplicated explanations are omitted as necessary for the sake of clarity.

Each of the embodiments described below may be used individually, or two or more of the embodiments may be appropriately combined with one another. These embodiments include novel features different from each other. Accordingly, these embodiments contribute to attaining objects or solving problems different from one another and also contribute to obtaining advantages different from one another.

The following descriptions on the embodiments mainly focus on radio communication networks for CIoT including LTE eMTC and NB-IoT. However, these embodiments may also be applied to radio communication networks for another CIoT.

First Embodiment

Figure 1:
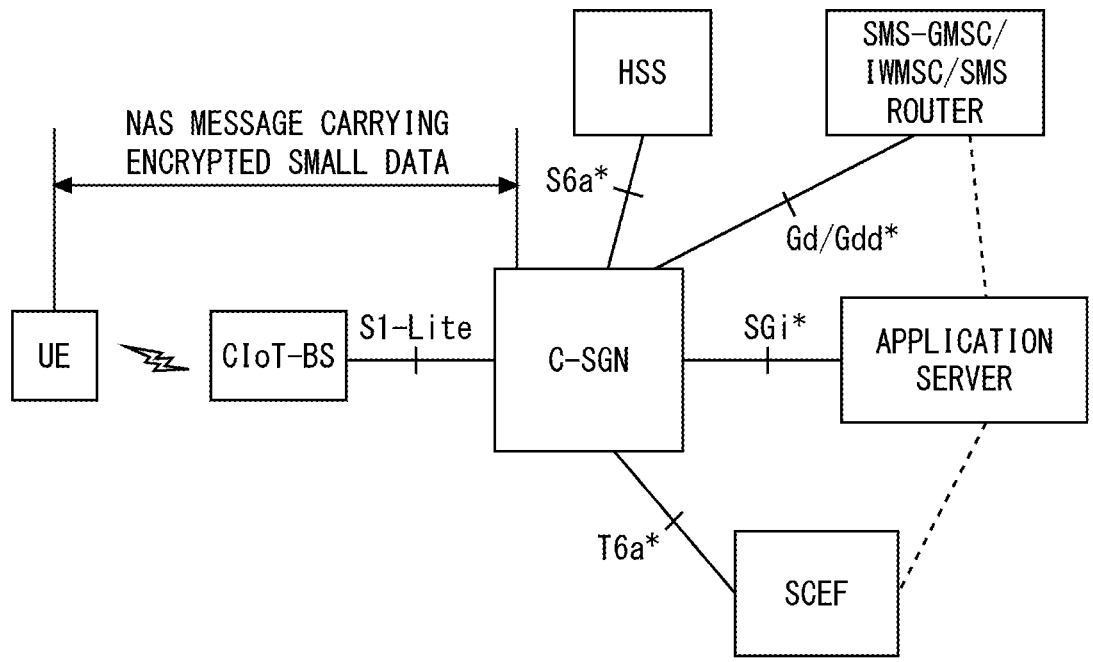
FIG. 1 is a diagram showing an example of CIoT architecture.
Figure 2:
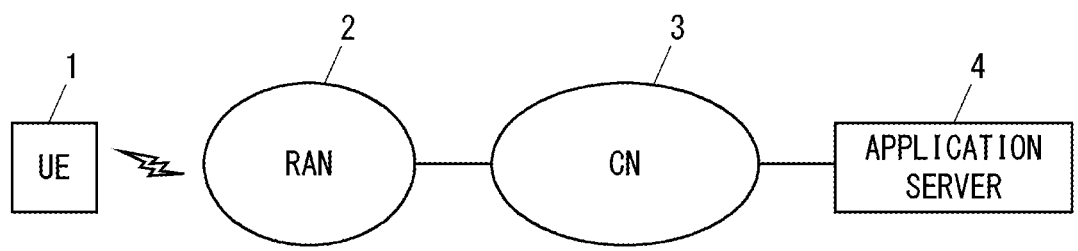
FIG. 2 is a diagram showing a configuration example of a radio communication network according to some embodiments.

FIG. 2 shows a configuration example of a radio communication network according to some embodiments including this embodiment. In the example shown in FIG. 2, a UE 1, which functions as a CIoT device, communicates with an application server 4 through a CIoT Radio Access Network (RAN) 2 and a Core Network (CN) 3. The RAN 2 supports a plurality of communication architecture types for data packet transmission related to CIoT. The RAN 2 broadcasts, in a cell, information which explicitly or implicitly indicates the plurality of communication architecture types supported by the RAN 2, by using a Master Information Block (MIB) or a System Information Block (SIB), for example. The UE 1 supports at least one of these communication architecture types. The CN 3 supports these communication architecture types. The CN 3 may include dedicated CNs (DCNs) each associated with a different one of the communication architecture types.

In some implementations, the plurality of communication architecture types may include first and second communication architecture types corresponding respectively to the solutions 2 and 18, which are disclosed in Non-patent Literature 1. In the first communication architecture type, user data packets transmitted or received by the UE 1 are transferred through a control plane (e.g., NAS messages transmitted between the UE and an MME/C-SGN). In the first communication architecture type, the RAN 2 does not need to set up a DRB for data packet transmission for the UE 1. Further, regarding the SRB used for data packet transmission, Access Stratum (AS) security (i.e., ciphering and deciphering of control plane data and integrity protection and integrity verification of control plane data) by the RAN 2 may be omitted. In other words, the processes of a Packet Data Convergence Protocol (PDCP) layer for the SRB used for the data packet transmission may be omitted. In this case, data packets for the UE 1 are encrypted and decrypted by the UE 1 and the CN 3 (e.g., MME or C-SGN) by using NAS security keys. In contrast to this, in the second communication architecture type, user data packets transmitted or received by the UE 1 are transferred through a user plane (e.g., an EPS bearer including a DRB and a General Packet Radio Service (GPRS) Tunneling Protocol (GTP) tunnel).

The UE 1 may support either or both of LTE eMTC and NB-IoT. In other words, the UE 1 may support either or both of CIoT RAT (NB-IoT RAT) and LTE RAT (eMTC). The RAN 2 may include either or both of a CIoT BS supporting the CIoT RAT (NB-IoT RAT) and an eNB supporting the LTE RAT (eMTC). The CN 3 may include a C-SGN, or an MME and an S-GW, or both of them. Further, the CN 3 may include other network entities such as a P-GW, a Home Subscriber Server (HSS), and a Policy and Charging Rules Function (PCRF).

Figure 3:
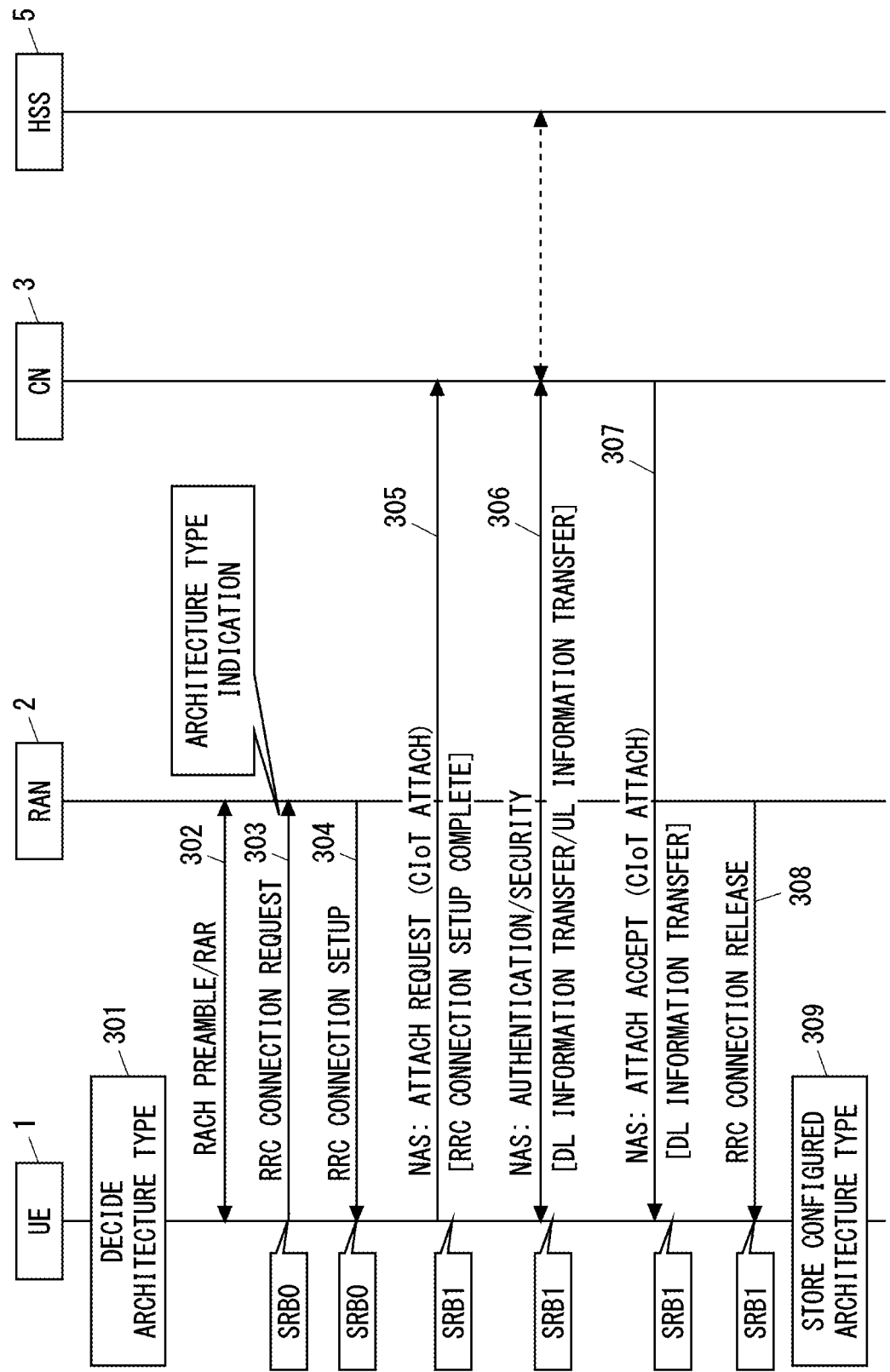
FIG. 3 is a sequence diagram showing an example of a communication procedure according to a first embodiment.

FIG. 3 is a sequence diagram showing an example of a communication procedure according to this embodiment. In the procedure shown in FIG. 3, a communication architecture type to be used for data packet transmission for the UE 1 is determined during a procedure for attaching the UE 1 to the CN 3. The UE 1 determines a communication architecture type to be used for data packet transmission for the UE 1 and transmits to the RAN 2 an RRC Connection Request message including an establishment cause explicitly or implicitly indicating the determined communication architecture type.

In step 301, the UE 1 determines (or selects) a communication architecture type to be used for data packet transmission for the UE 1. In some implementations, the UE 1 may select a communication architecture type to be used based on a default UE capability that has been preconfigured in the UE 1. Additionally or alternatively, the UE 1 may measure reference signal received power (RSRP) from the RAN 2 or an estimated propagation loss between the UE 1 and the RAN 2 (CIoT-BS/eNB) and select a communication architecture type to be used based on the measured RSRP or propagation loss. Additionally or alternatively, the UE 1 may determine a necessary coverage enhancement (CE) level based on the measured RSRP or propagation loss and select a communication architecture type based on the determined CE level. Additionally or alternatively, the UE 1 may select a communication architecture type according to a data transmission trigger (e.g., mo-Data, mo-ExceptionData, mt-Access, or mo-Signaling). Additionally or alternatively, the UE 1 may select a communication architecture type according to the type of an application that performs data packet transmission.

In step 302, the UE 1 starts a random access procedure. That is, the UE 1 transmits a random access preamble (i.e., a Random Access Channel (RACH) preamble) to the RAN 2 and receives a random access response (RAR) message from the RAN 2.

In step 303, the UE 1 transmits a third message (Msg3) in the random access procedure (i.e., an RRC Connection Request message) to the RAN 2. This RRC Connection Request message is transmitted by an SRB 0 on a Common Control Channel (CCCH). The RRC Connection Request message includes an establishment cause information element explicitly or implicitly indicating a communication architecture type determined (or selected) by the UE 1.

Regarding the establishment cause indicating the communication architecture type, for example, one of the ordinary establishment causes (e.g., mo-Data, mo-ExceptionData, mo-Signaling, mt-Access) may be used for indicating the first (or second) communication architecture type, and a specific establishment cause may be used for indicating the second (or first) communication architecture type. When a specific establishment cause is used for the first communication architecture type, it may be, for example, information (e.g., mo-DataOverNAS, mo-ExceptionDataOverNAS, mo-SignalingDataOverNAS, or Mt-AccessDataOverNAS) indicating a communication architecture type in which user data is transmitted by a NAS message. When a specific establishment cause is used for the second communication architecture type, it may be, for example, information (e.g., mo-DataUP, Mo-ExceptionDataUP, Mo-SignalingUP, or Mt-AccessUP) indicating that a DRB is configured and user data is transmitted through a User Plane (UP) (an AS message).

In step 304, upon receiving the RRC Connection Request message, the RAN 2 transmits an RRC Connection Setup message to the UE 1. This RRC Connection Setup message is transmitted by an SRB 0 on a CCCH. The RRC Connection Setup message includes configuration information regarding an SRB 1 and allows subsequent signaling to use a Dedicated Control Channel (DCCH).

The RRC Connection Setup message may indicate a need for a PDCP. More specifically, the RRC Connection Setup message may indicate a need for a PDCP (e.g., whether a PDCP is used similar as in a conventional manner) to the UE 1. In some implementations, flag information indicating a need for a PDCP may be included in a RadioResourceConfigDedicated IE or another IE included in the RRC Connection Setup message.

In some implementations, a PDCP configuration (pdcp-Config) included in the RRC Connection Setup message may indicate a need for a PDCP. This PDCP configuration may include flag information indicating a need for a PDCP (e.g., whether a PDCP is used similar as in a conventional manner) to the UE 1. The PDCP configuration may include information indicating whether a default configuration of the PDCP Config of the SRB 1 should be enabled to the UE 1. The PDCP configuration may include a specific PDCP Config (e.g., RLC-SAP and PDCP Sequence Number (SN) length applied to the SRB 1). Alternatively, the RAN 2 may determine whether to include the PDCP configuration (pdcp-Config) in the RRC Connection Setup message depending on the communication architecture type determined by the UE 1. Specifically, if the UE 1 selects the second communication architecture type, the RAN 2 may incorporate the PDCP configuration for the SRB 1 into the RRC Connection Setup message.

In step 305, the UE 1 transmits an RRC Connection Setup Complete message to the RAN 2. This RRC Connection Setup Complete message is transmitted by an SRB 1 on a DCCH. The RRC Connection Setup Complete message carries an initial NAS message. Note that since FIG. 3 shows the attach procedure, the initial NAS message is an Attach Request message. This Attach Request message includes an EPS attach type Information Element (IE) set to "CIoT Attach".

The RAN 2 receives the RRC Connection Setup Complete message from the UE 1 and sends the initial NAS message (i.e., the Attach Request message) retrieved from the RRC Connection Setup Complete message to the CN 3 (e.g., MME or C-SGN) using an S1AP: Initial UE message. The Initial NAS message (i.e., Attach Request message) is embedded into a NAS-Protocol Data Unit (PDU) Information Element (IE) of the S1AP: Initial UE Message. The RAN 2 may incorporate an information element indicating the communication architecture type determined (or selected) by the UE 1 into the S1AP: Initial UE message. The RAN 2 may select, from DCNs in the CN 3, a DCN corresponding to the communication architecture type determined by the UE 1 and send the S1AP: Initial UE message carrying the Initial NAS message (i.e., the Attach Request message) to the selected DCN.

In step 306, the CN 3 (e.g., MME or C-SGN) performs an authentication and security procedure and thereby sets up NAS security. A downlink NAS message(s) necessary for the authentication and security procedure (i.e., an Authentication Request and a NAS Security Mode Command) is transmitted by an RRC: DL Information Transfer message on the SRB 1. Similarly, an uplink NAS message(s) necessary for the authentication and security procedure (i.e., an Authentication Response and a NAS Security Mode Complete) is transmitted by an RRC: UL Information Transfer message on the SRB 1.

In step 307, the CN 3 (e.g., MME or C-SGN) sends a NAS: Attach Accept message to the UE 1. The setup of a session for the UE 1 (e.g., a DRB and an S1 bearer) is not needed. Accordingly, the CN 3 (e.g., MME or C-SGN) does not need to send an S1AP: Initial Context Setup Request message to the RAN 2 (e.g., CIoT-BS or eNB). Thus, the Attach Accept message may be transmitted from the CN 3 to the RAN 2 by an S1AP: Downlink NAS transport message. The RAN 2 transmits the Attach Accept message to the UE 1 on the SRB 1 using an RRC: DL Information Transfer message.

The UE 1 receives the Attach Accept message from the CN 3 through the RAN 2. The Attach Accept message may indicate a transfer data type (e.g., IP, non-IP, or SMS) and a UE address (e.g., IP address). Upon receiving the Attach Accept message, the UE 1 transmits a NAS: Attach Complete message to the CN 3. This Attach Complete message is transmitted to the RAN 2 by an RRC: UL Information Transfer message on the SRB 1. The RAN 2 forwards the received Attach Complete message to the CN 3 using an S1AP: Uplink NAS transport message.

In step 308, the RAN 2 transmits an RRC Connection Release message to the UE 1 on the SRB 1. The CN 3 may request the RAN 2 to release the RRC connection with the UE 1 by sending an S1AP: S1 UE Context Release Command message to the RAN 2. Upon receiving the RRC Connection Release message, the UE 1 transitions from RRC-Connected mode to RRC-Idle mode. For the UE 1 serving as a CIoT device, another suspension mode or state different from the existing RRC-idle mode may be defined. Thus, upon receiving the RRC Connection Release message, the UE 1 may enter RRC-Idle mode or the other suspension mode. The other suspension mode or state may be used in the second communication architecture type in order to retain information about the RRC connection (e.g., an Access Stratum Security Context, bearer related information, and L2/1 parameters).

The Attach Accept message in step 307, the RRC Connection Release message in step 308, or another downlink NAS message transmitted from the CN 3 to the UE 1 may explicitly or implicitly indicate a communication architecture type to be used for the UE 1 (e.g., an Applied Architecture Type or a Selected Architecture Type).

In step 309, the UE 1 records (stores) the communication architecture type configured during the attach procedure.

The procedure shown in FIG. 3 may be modified as follows. The UE 1 may include, in addition to the ordinary establishment cause, another information element in the RRC Connection Request message (step 303) to indicate the communication architecture type. This information element may be, for example, an information element indicating which of the first and second communication architecture types the UE 1 has selected (e.g., a Selected Architecture Type or an Applied Architecture Type). For example, the UE 1 may set the value of the information element to "DataOverNAS (DONAS)" or "Type 1" in order to indicate the first communication architecture type, and set the value of the information element to "RRC-Suspend" or "Type 2" in order to indicate the second communication architecture type.

For example, the above-described information element may be defined as "SelectedArcType ENUMERATED {type1, type2} (or, {DataOverNAS, rrc-Suspend})". Alternatively, the information element may be flag information indicating that the first communication architecture type has been selected (e.g., SelectedArcType ENUMERATED {type1}, or ArcType1 ENUMERATED {true}). Alternatively, the information element may be flag information indicating that the second communication architecture type has been selected (e.g., SelectedArcType ENUMERATED {type2}, or ArcType2 ENUMERATED {true}).

If the UE 1 implements a method of transmitting flag information indicating that one of the two communication architecture types (e.g., the second communication architecture type) has been selected, use of the other communication architecture type (e.g., the first communication architecture type) by the UE 1 may be defined as a default configuration (or a basic configuration). Thus, when the UE 1 does not transmit the flag information, it implicitly indicates that the UE 1 has selected the default communication architecture type. That is, if the RAN 2 does not receive the flag information, the RAN 2 recognizes that the UE 1 has selected the default communication architecture type.

The procedure shown in FIG. 3 may be further modified as follows. The RAN 2 may use a communication architecture type different from the communication architecture type indicated by the UE 1 in the RRC Connection Request message (step 303). In this case, the RAN 2 may notify the UE 1 of this different communication architecture type (e.g., an Applied Architecture Type or a Selected Architecture Type) using the RRC Connection Setup message (step 304). Alternatively, the RAN 2 may transmit to the UE 1 in step 304 an RRC Connection Reject message, instead of the RRC Connection Setup message, and notify the UE 1 of the different communication architecture type using this message. Upon receiving the notification of the different communication architecture type, the UE 1 may terminate the current attach procedure and restart a new RRC connection setup procedure. Alternatively, the UE 1 may continue the current attach procedure and the RRC connection setup procedure in accordance with the notification of the different communication architecture type transmitted from the RAN 2.

When the second communication architecture type, in which user data packets are transmitted through the user plane (e.g., an EPS bearer including a DRB and a GPRS Tunneling Protocol (GTP) tunnel), is used for the UE 1, the CN 3 may incorporate the NAS: Attach Accept message into an S1AP: Initial Context Setup Request message and transmit them to the RAN 2 in step 307. This S1AP: Initial Context Setup Request message includes a security key ($K_{eNB}$) and a UE Security Algorithm used for the UE 1. The RAN 2 may perform an AS security setup in accordance with the received security key ($K_{eNB}$) and UE Security Algorithm. The AS security setup may be performed before or after the transmission of the NAS: Attach Accept message to the UE 1.

Although FIG. 3 shows Mobile Originated (MO) data transmission, a procedure similar to that shown in FIG. 3 may be applied to Mobile Terminated (MT) data transmission.

In the example shown in FIG. 3, the UE 1 determines a communication architecture type to be used for data packet transmission for the UE 1 and transmits to the RAN 2 an RRC Connection Request message including an establishment cause or another information element indicating the determined communication architecture type. Using the establishment cause or another information element included in the RRC Connection Request message to indicate the communication architecture type determined by the UE 1 provides the following advantages, for example. Firstly, it allows the UE 1 to transmit a communication architecture type determined by the UE 1 as AS (RRC) information, rather than as NAS information. Therefore, the RAN 2 can recognize the communication architecture type desired by the UE 1, and thus the RAN 2 can perform a process (e.g., selecting a CN (DCN)) according to the communication architecture type desired by the UE 1. Secondly, it allows the UE 1 to notify the RAN 2 of the communication architecture type determined by the UE 1, before establishing an RRC connection. Thus, the RAN 2 can reduce the number of signaling messages required to set up an RRC connection according to the communication architecture type determined by the UE 1.

Second Embodiment

Figure 4:
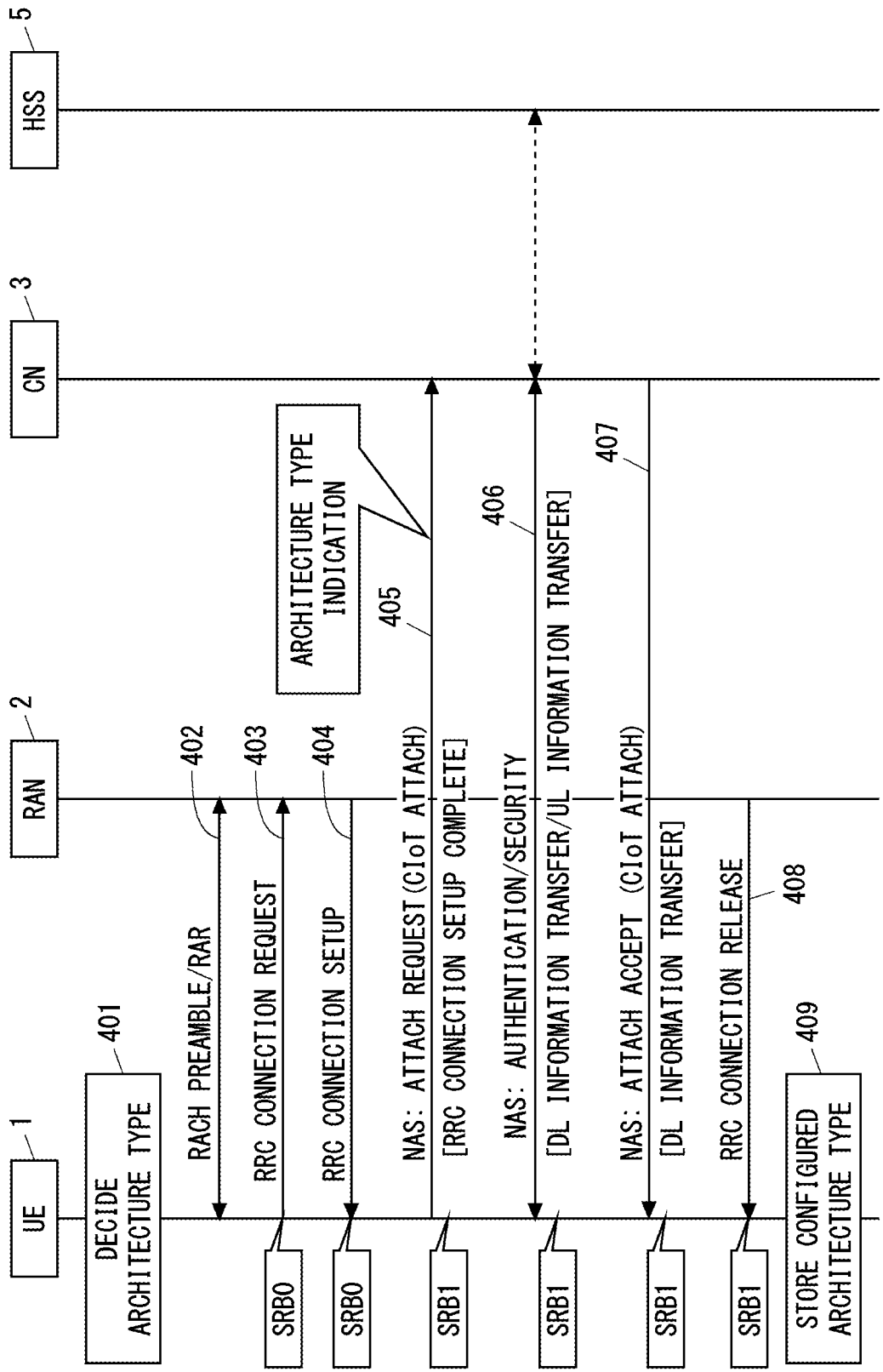
FIG. 4 is a sequence diagram showing an example of a communication procedure according to a second embodiment.

A configuration example of a radio communication network according to this embodiment is similar to the one shown in FIG. 2. This embodiment provides another communication procedure involving determination (or selection) of communication architecture used for the UE 1. FIG. 4 is a sequence diagram showing an example of a communication procedure according to this embodiment. In the procedure shown in FIG. 4, a communication architecture type to be used for data packet transmission for the UE 1 is determined during a procedure for attaching the UE 1 to the CN 3. The UE 1 determines a communication architecture type to be used for data packet transmission for the UE 1 and transmits to the RAN 2 an RRC Connection Setup Complete message including an information element about the determined communication architecture type, which explicitly or implicitly indicates the determined communication architecture type.

Steps 401 to 404 are similar to steps 301 to 304 shown in FIG. 3. However, an RRC Connection Request message in step 403 does not indicate the communication architecture type determined (selected) by the UE 1.

In step 405, the UE 1 transmits an RRC Connection Setup Complete message to the RAN 2. This RRC Connection Setup Complete message is transmitted by an SRB 1 on a DCCH. The RRC Connection Setup Complete message includes an initial NAS message and a UE assistance Information Element (IE) about the communication architecture type determined by the UE 1, which explicitly or implicitly indicates the communication architecture type. The UE assistance IE may be NAS information or may be AS (RRC) information.

When the UE assistance IE is AS (RRC) information, depending on the communication architecture type determined by the UE 1, the RAN 2 may transmit a PDCP configuration (pdcp-Config) for the SRB 1 to the UE 1 or may notify the UE 1 that a PDCP layer is used (applied). Specifically, the RAN 2 may transmit the PDCP configuration for the SRB 1 to the UE 1 when the UE 1 selects the second communication architecture type.

The RAN 2 receives the RRC Connection Setup Complete message from the UE 1 and sends to the CN 3 an initial NAS message (i.e., an Attach Request message) retrieved from the RRC Connection Setup Complete message (e.g., MME or C-SGN), using an initial UE message. When the UE assistance IE is AS (RRC) information, the RAN 2 may select, from DCNs in the CN 3, a DCN corresponding to the communication architecture type determined by the UE 1 and send the Initial UE message carrying the initial NAS message (i.e., the Attach Request message) to the selected DCN. In contrast to this, when the UE assistance IE is NAS information, the UE assistance IE is incorporated into a NAS-PDU Information Element (IE) of the S1AP: Initial UE message together with the initial NAS message. In this case, the RAN 2 may receive a notification explicitly or implicitly indicating the communication architecture type determined by the UE 1 from the CN 3 using, for example, an Initial Context Setup Request message (e.g., an Architecture Type IE).

Steps 406 to 409 are similar to steps 306 to 309 shown in FIG. 3.

The procedure shown in FIG. 4 may be modified, for example, as follows. The RAN 2 or the CN 3 may use a communication architecture type different from the communication architecture type indicated by the UE 1 in the RRC Connection Setup Complete message or the Attach Request message from the UE 1 (step 404).

In response to the RRC Connection Setup Complete message (step 404), the RAN 2 may transmit an RRC Connection Reject message indicating the different communication architecture type (e.g., an Applied Architecture Type or a Selected Architecture Type) to the UE 1. In this case, the UE 1 may restart a new RRC Connection Setup procedure.

Alternatively, the CN 3 may notify the UE 1 of the different communication architecture type (e.g., an Applied Architecture Type or a Selected Architecture Type) using the Attach Accept message (step 407). In this case, the UE 1 may terminate the current attach procedure and restart a new RRC connection setup procedure. Alternatively, the UE 1 may continue the current attach procedure in accordance with the notification of the different communication architecture type transmitted from the RAN 2.

When the second communication architecture type, in which user data packets are transmitted through the user plane (e.g., an EPS bearer including a DRB and a GPRS Tunneling Protocol (GTP) tunnel), is used for the UE 1, the CN 3 may incorporate the NAS: Attach Accept message into an S1AP: Initial Context Setup Request message and transmit them to the RAN 2 in step 407. This S1AP: Initial Context Setup Request message includes a security key ($K_{eNB}$) and a UE Security Algorithm used for the UE 1. The RAN 2 may perform an AS security setup in accordance with the received security key ($K_{eNB}$) and UE Security Algorithm. The AS security setup may be performed before or after the transmission of the NAS: Attach Accept message to the UE 1.

Although FIG. 4 shows Mobile Originated (MO) data transmission, a procedure similar to that shown in FIG. 4 may be applied to Mobile Terminated (MT) data transmission.

In the example shown in FIG. 4, the UE 1 determines a communication architecture type to be used for data packet transmission for the UE 1 and transmits to the RAN 2 an RRC Connection Setup Complete message including a UE assistance IE indicating the determined communication architecture type. Using the RRC Connection Setup Complete message to indicate the communication architecture type determined by the UE 1 provides the following advantages, for example. In some implementations, it allows the UE 1 to transmit a communication architecture type determined by the UE 1 as NAS information. Therefore, the UE 1 can easily notify the CN 3 of the communication architecture type desired by the UE 1.

Third Embodiment

Figure 5:
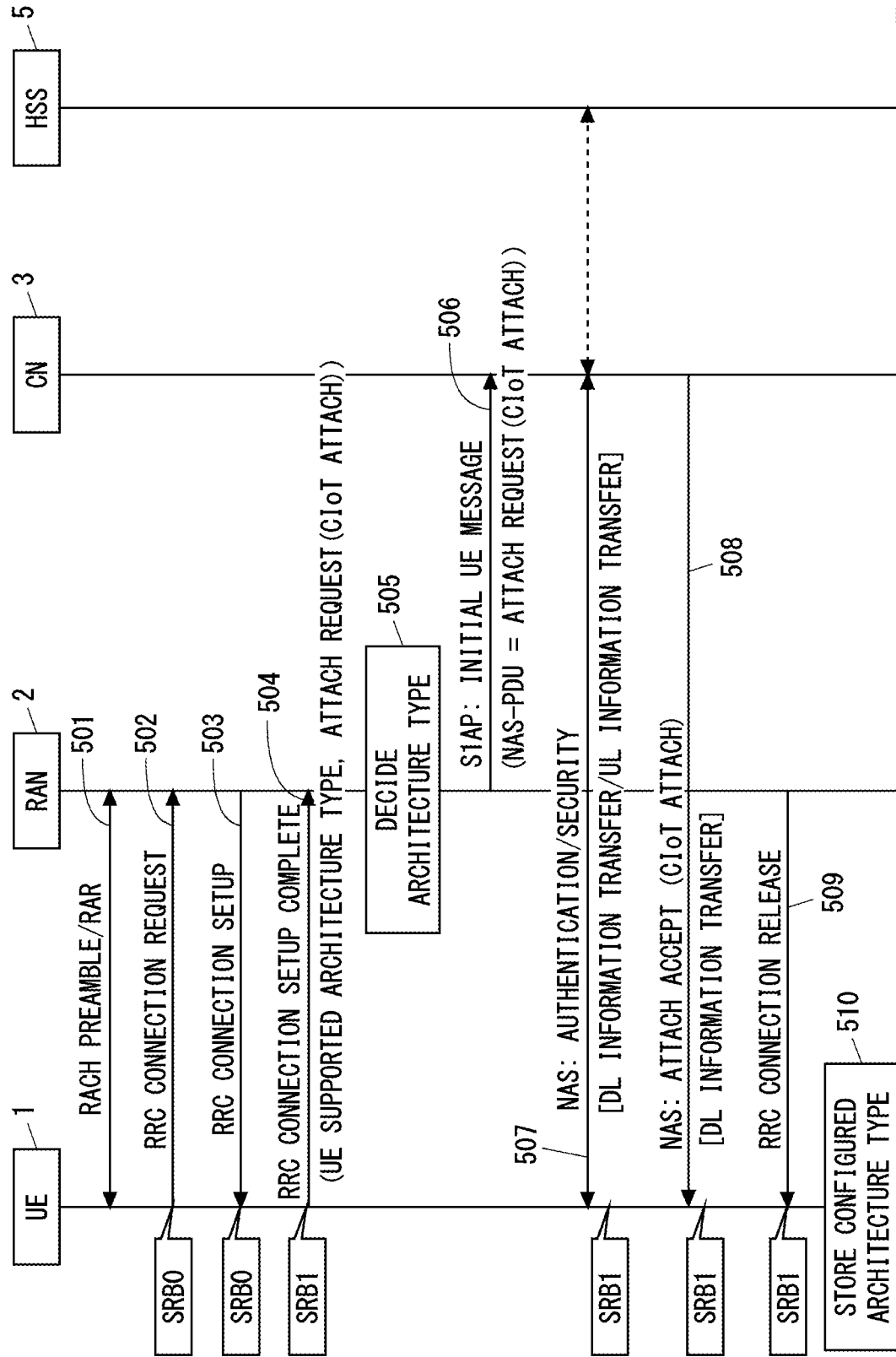
FIG. 5 is a sequence diagram showing an example of a communication procedure according to a third embodiment.

A configuration example of a radio communication network according to this embodiment is similar to the one shown in FIG. 2. This embodiment provides another communication procedure involving determination (or selection) of communication architecture used for the UE 1. FIG. 5 is a sequence diagram showing an example of a communication procedure according to this embodiment. In the procedure shown in FIG. 5, the RAN 2 determines (or selects) a communication architecture type to be used for data packet transmission for the UE 1, during a procedure for attaching the UE 1 to the CN 3.

Steps 501 to 504 are similar to steps 402 to 405 shown in FIG. 4. However, an RRC Connection Setup Complete message in step 504 includes an information element about communication architecture types (e.g., a UE Supported Architecture Type), which explicitly or implicitly indicates one or more communication architecture types supported by the UE 1. This information element is AS (RRC) information. Accordingly, this information element allows the RAN 2 (e.g., CIoT-BS or eNB) to detect the one or more communication architecture types supported by the UE 1.

This information element may indicate, for example, a communication architecture type(s) supported by the UE 1 (e.g., {type1, type2, . . . }, or {DONAS, RRC-Suspend, . . . }). The information element may be a bitmap indicating which one or more of a plurality of communication architecture types are supported by the UE 1. The information element may be a flag or a bitmap indicating whether one or more optional communication architecture types other than a default communication architecture type are supported by the UE 1. That is, the information element may indicate that an optional communication architecture type is supported (e.g., typeX supported), or may indicate whether the optional communication architecture type is supported (e.g., Support of typeX=ENUMERATED {true, . . . }, or {Supported, Not Supported}). The above-described values "type1" and "type2" (and "typeX") may be replaced by names that indicate a communication architecture type in a more specific manner, such as "DataOverNAS (DONAS)" or "RRC-Suspend".

In step 505, the RAN 2 determines a communication architecture type to be used for the UE 1 while considering the one or more communication architecture types supported by the UE 1. In some implementations, the RAN 2 may select a communication architecture type used for the UE 1 based on a default UE capability that has been preconfigured in the UE 1. Additionally or alternatively, the RAN 2 may select a communication architecture type used for the UE 1 based on received power at the UE 1 of a reference signal transmitted from the RAN 2 (i.e., RSRP) or an estimated propagation loss between the UE 1 and the RAN 2 (e.g., CIoT-BS/eNB). A measurement result of the RSRP or the propagation loss may be sent from the UE 1 to the RAN 2. Additionally or alternatively, the RAN 2 may select a communication architecture type used for the UE 1 based on a network capability of the CN 3. Additionally or alternatively, the RAN 2 may select a communication architecture type used for the UE 1 based on a load on the RAN 2 (e.g., a Cell load, an S1 Transport Network Layer (TNL) load, the number of Connected UEs, or the number of UEs whose UE context stored).

Depending on the communication architecture type determined by the UE 1, the RAN 2 may transmit a PDCP configuration (pdcp-Config) for the SRB 1 to the UE 1 or may notify the UE 1 that a PDCP layer is used (applied). Specifically, the RAN 2 may transmit the PDCP configuration for the SRB 1 to the UE 1 when the RAN 2 selects the second communication architecture type for the UE 1.

In step 506, the RAN 2 sends an initial NAS message (i.e., Attach Request message) retrieved from the RRC Connection Setup Complete message to the CN 3 (e.g., MME or C-SGN) using an S1AP: Initial UE message. The initial NAS message (i.e., the Attach Request message) is embedded into a NAS-PDU Information Element (IE) of the S1AP: Initial UE message. The RAN 2 may incorporate an information element indicating the communication architecture type determined in step 505 into the S1AP: Initial UE message. The RAN 2 may select, from DCNs in the CN 3, a DCN corresponding to the communication architecture type determined in step 505 and send the S1AP: Initial UE message carrying the initial NAS message (i.e., the Attach Request message) to the selected DCN.

Steps 507 to 510 are similar to steps 306 to 309 in FIG. 3 or steps 406 to 409 in FIG. 4.

When the second communication architecture type is used for the UE 1, the procedure shown in FIG. 5 may be changed so that an AS security setup is performed as in the case of the above-described other procedures. Although FIG. 5 shows Mobile Originated (MO) data transmission, a procedure similar to that shown in FIG. 5 may be applied to Mobile Terminated (MT) data transmission.

Fourth Embodiment

Figure 6:
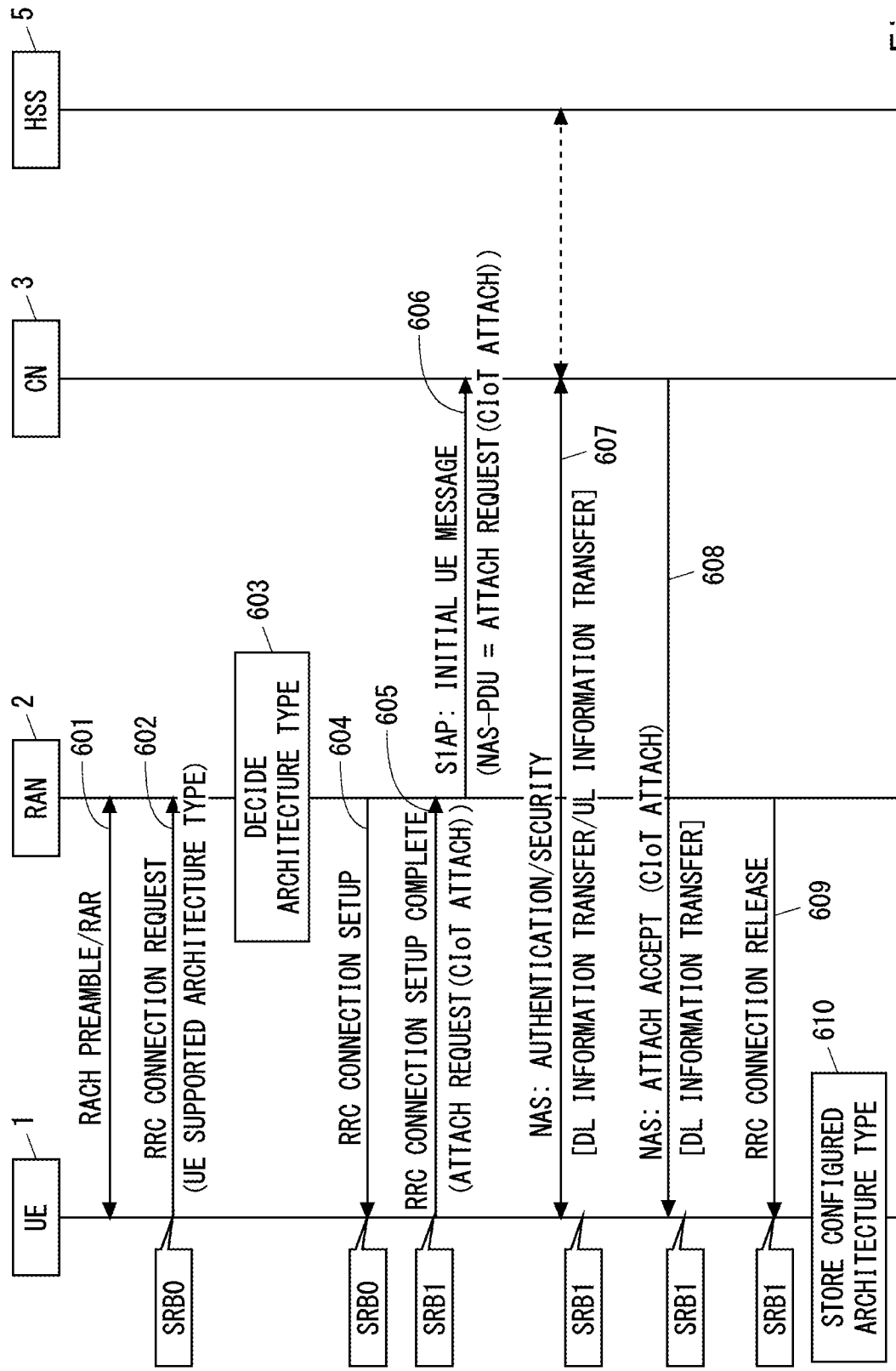
FIG. 6 is a sequence diagram showing an example of a communication procedure according to a fourth embodiment.

A configuration example of a radio communication network according to this embodiment is similar to the one shown in FIG. 2. This embodiment provides another communication procedure involving determination (or selection) of communication architecture used for the UE 1. FIG. 6 is a sequence diagram showing an example of a communication procedure according to this embodiment. In the procedure shown in FIG. 6, the RAN 2 determines a communication architecture type used for data packet transmission for the UE 1, during a procedure for attaching the UE 1 to the CN 3. Note that the procedure shown in FIG. 6 differs from that shown in FIG. 5 in that an information element about communication architecture types (e.g., a UE Supported Architecture Type), which explicitly or implicitly indicates one or more communication architecture types supported by the UE 1, is transmitted by an RRC Connection Request message.

Steps 601 and 602 are similar to steps 302 and 303 shown in FIG. 3. However, an RRC Connection Request message in step 602 includes an information element indicating one or more communication architecture types supported by the UE 1 (e.g., a UE Supported Architecture Type). This information element is AS (RRC) information. Accordingly, this information element allows the RAN 2 (e.g., CIoT-BS or eNB) to detect the one or more communication architecture types supported by the UE 1.

In step 603, the RAN 2 determines a communication architecture type used for the UE 1 while considering the one or more communication architecture types supported by the UE 1.

Step 604 is similar to step 304 in FIG. 3. However, an RRC Connection Setup message in step 604 may indicate the communication architecture type determined by the RAN 2 in step 603 (e.g., an Applied Architecture Type or a Selected Architecture Type).

Steps 605 and 606 are similar to steps 305 in FIG. 3. However, the RAN 2 may incorporate an information element indicating the communication architecture type determined in step 603 (e.g., an Applied Architecture Type or a Selected Architecture Type) into the S1AP: Initial UE message. The RAN 2 may select, from DCNs in the CN 3, a DCN corresponding to the communication architecture type determined in step 603 and send the S1AP: Initial UE message carrying the initial NAS message (i.e., the Attach Request message) to the selected DCN.

Steps 607 to 610 are similar to steps 306 to 309 in FIG. 3 or steps 507 to 510 in FIG. 5.

When the second communication architecture type is used for the UE 1, the procedure shown in FIG. 6 may be changed so that an AS security setup is performed as in the case of the above-described other procedures. Although FIG. 6 shows Mobile Originated (MO) data transmission, a procedure similar to that shown in FIG. 6 may be applied to Mobile Terminated (MT) data transmission.

Fifth Embodiment

Figure 7:
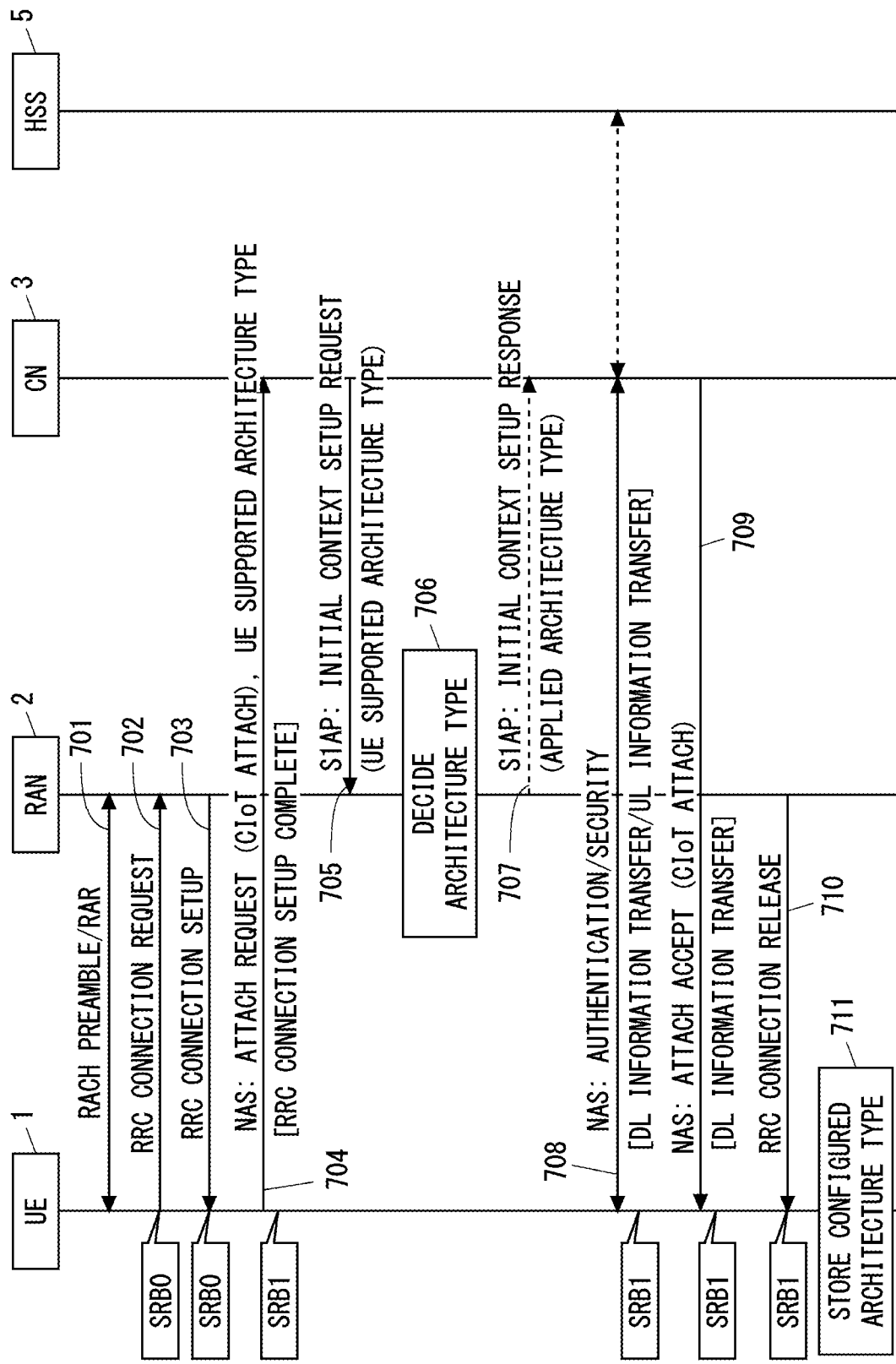
FIG. 7 is a sequence diagram showing an example of a communication procedure according to a fifth embodiment.

A configuration example of a radio communication network according to this embodiment is similar to the one shown in FIG. 2. This embodiment provides another communication procedure involving determination (or selection) of communication architecture used for the UE 1. FIG. 7 is a sequence diagram showing an example of a communication procedure according to this embodiment. In the procedure shown in FIG. 7, the RAN 2 determines a communication architecture type used for data packet transmission for the UE 1, during a procedure for attaching the UE 1 to the CN 3. Note that the procedure shown in FIG. 7 differs from those shown in FIGS. 5 and 6 in that an information element about communication architecture types supported by the UE 1 (e.g., a UE Supported Architecture Type), which explicitly or implicitly indicates one or more communication architecture types supported by the UE 1, is transmitted as NAS information together with an initial NAS message (i.e., an Attach Request message).

Steps 701 to 704 are similar to steps 402 to 405 shown in FIG. 4. However, in step 704, the UE 1 transmits a NAS information element indicating one or more communication architecture types supported by the UE 1 (e.g., a UE Supported Architecture Type) together with the Attach Request message. This NAS information element may indicate, for example, a communication architecture type(s) supported by the UE 1 (e.g., {type1, type2, . . . }, or {DONAS, RRC-Suspend, . . . }). Alternatively, the NAS information element may indicate that an optional communication architecture type is supported (e.g., typeX supported), or may indicate whether the optional communication architecture type is supported (e.g., Support of typeX=ENUMERATED {true, . . . }, or {Supported, Not Supported}). The above-described values "type1" and "type2" (and "typeX") may be replaced by names that indicate a communication architecture type in a more specific manner, such as "DataOverNAS (DONAS)" or "RRC-Suspend".

In step 705, the CN 3 sends an S1AP: Initial Context Setup Request message indicating the one or more communication architecture types supported by the UE 1 (e.g., the UE Supported Architecture Type) to the RAN 2. In step 706, the RAN 2 determines a communication architecture type used for the UE 1 while considering the one or more communication architecture types supported by the UE 1 based on the information received from the CN 3. The RAN 2 may notify the CN 3 of the determined communication architecture type using an S1AP: Initial Context Setup Response message (step 707).

Steps 708 to 711 are similar to steps 306 to 309 in FIG. 3, steps 507 to 510 in FIG. 5, or steps 607 to 610 in FIG. 6.

When the second communication architecture type is used for the UE 1, the procedure shown in FIG. 7 may be changed so that an AS security setup is performed as in the case of the above-described other procedures. Although FIG. 7 shows Mobile Originated (MO) data transmission, a procedure similar to that shown in FIG. 7 may be applied to Mobile Terminated (MT) data transmission.

Sixth Embodiment

Figure 8:
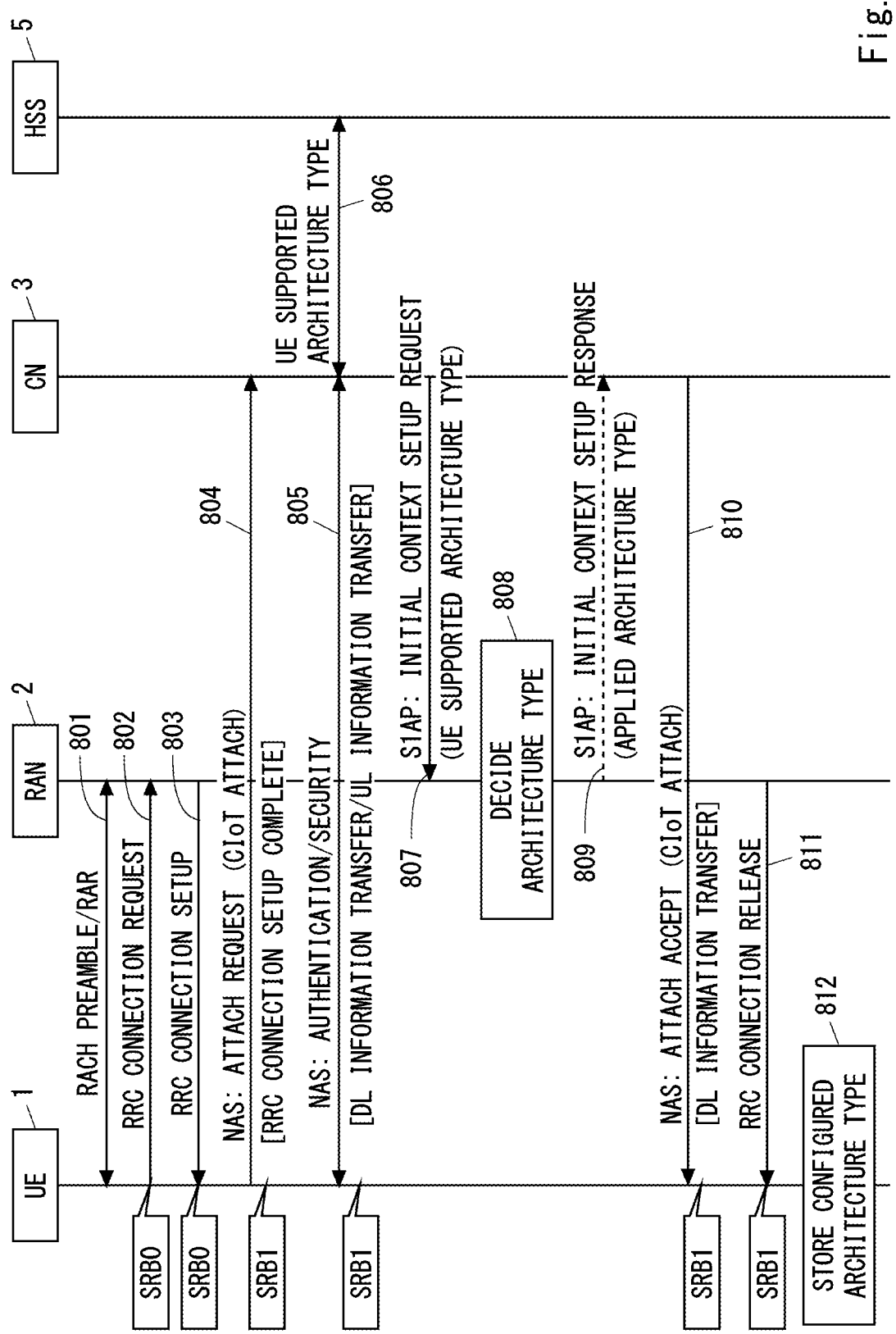
FIG. 8 is a sequence diagram showing an example of a communication procedure according to a sixth embodiment.

A configuration example of a radio communication network according to this embodiment is similar to the one shown in FIG. 2. This embodiment provides another communication procedure involving determination (or selection) of communication architecture used for the UE 1. FIG. 8 is a sequence diagram showing an example of a communication procedure according to this embodiment. In the procedure shown in FIG. 8, the RAN 2 determines a communication architecture type used for data packet transmission for the UE 1, during a procedure for attaching the UE 1 to the CN 3. Note that the procedure shown in FIG. 8 differs from those shown in FIGS. 5 to 7 in that an information element about communication architecture types (e.g., a UE Supported Architecture Type), which explicitly or implicitly indicates one or more communication architecture types supported by the UE 1, is transmitted from an HSS 5 to the RAN 2 through the CN 3 (e.g., MME or C-SGN).

Steps 801 to 804 are similar to steps 701 to 704 shown in FIG. 7. However, in step 804, the UE 1 does not need to transmit a NAS information element (e.g., a UE Supported Architecture Type) indicating one or more communication architecture types supported by the UE 1.

In step 805, the CN 3 (e.g., MME or C-SGN) performs an authentication and security procedure and thereby sets up NAS security. In step 806, when the CN 3 (e.g., MME or C-SGN) receives authentication information regarding the UE 1 from the HSS 5, the CN 3 further receives one or more communication architecture types supported by the UE 1 (e.g., the UE Supported Architecture Type) from the HSS 5.

The HSS 5 manages the UE Supported Architecture Type as subscriber information regarding the UE 1.

Steps 807 to 809 are similar to steps 705 to 707 in FIG. 7. Steps 810 to 812 are similar to steps 307 to 309 in FIG. 3, steps 508 to 510 in FIG. 5, steps 608 to 611 in FIG. 6, or steps 709 to 711 in FIG. 7.

When the second communication architecture type is used for the UE 1, the procedure shown in FIG. 8 may be changed so that an AS security setup is performed as in the case of the above-described other procedures. Although FIG. 8 shows Mobile Originated (MO) data transmission, a procedure similar to that shown in FIG. 8 may be applied to Mobile Terminated (MT) data transmission.

Seventh Embodiment

Figure 9:
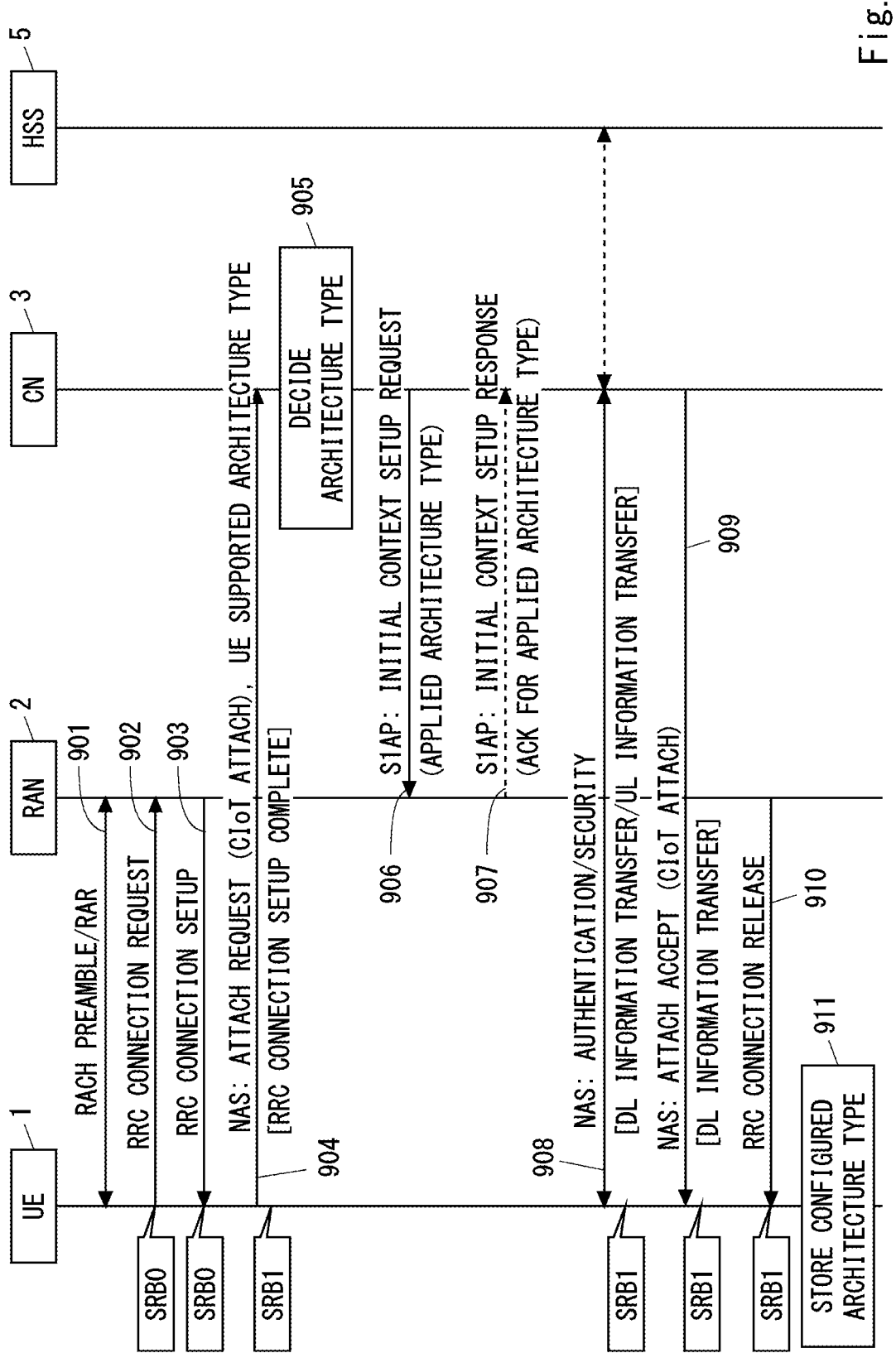
FIG. 9 is a sequence diagram showing an example of a communication procedure according to a seventh embodiment.

A configuration example of a radio communication network according to this embodiment is similar to the one shown in FIG. 2. This embodiment provides another communication procedure involving determination (or selection) of communication architecture used for the UE 1 is described. FIG. 9 is a sequence diagram showing an example of a communication procedure according to this embodiment. In the procedure shown in FIG. 9, the CN 3 determines a communication architecture type used for data packet transmission for the UE 1, during a procedure for attaching the UE 1 to the CN 3.

Steps 901 to 904 are similar to steps 701 to 704 in FIG. 7. That is, in step 904, the CN 3 (e.g., MME or C-SGN) receives a NAS information element about communication architecture types (e.g., a UE Supported Architecture Type), which explicitly or implicitly indicates one or more communication architecture types supported by the UE 1, together with an Attach Request message from the UE 1.

In step 905, the CN 3 determines a communication architecture type used for the UE 1 while considering the one or more communication architecture types supported by the UE 1 (i.e., the UE Supported Architecture Type). In some implementations, the CN 3 may select a communication architecture type used for the UE 1 based on a default UE capability that has been preconfigured in the UE 1. Additionally or alternatively, the CN 3 may select a communication architecture type used for the UE 1 based on a network capability of the RAN 2 (e.g., CIoT BS or eNB). Additionally or alternatively, the CN 3 may select a communication architecture type used for the UE 1 based on a load on the CN 3 (e.g., an S1 Transport Network Layer (TNL) load, the number of Connected UEs, the number of UEs whose UE context stored). Additionally or alternatively, the CN 3 may select a communication architecture type used for the UE 1 based on Quality of Service (QoS) applied to the UE 1 (e.g., a QoS Class Identifier (QCI), an Allocation and Retention Priority (ARP), a resource type (a Guaranteed Bit Rate (GBR) or a non-GBR)).

In step 906, the CN 3 sends an S1AP: Initial Context Setup Request message indicating the communication architecture type determined in step 905 (e.g., an Applied Architecture Type or a Selected Architecture Type) to the RAN 2. The RAN 2 may send a response to the notification received in step 906 (step 907).

Steps 908 to 911 are similar to steps 306 to 309 in FIG. 3, steps 406 to 409 in FIG. 4, steps 507 to 510 in FIG. 5, steps 607 to 610 in FIG. 6, or steps 708 to 711 in FIG. 7.

When the second communication architecture type is used for the UE 1, the procedure shown in FIG. 9 may be changed so that an AS security setup is performed as in the case of the above-described other procedures. Although FIG. 9 shows Mobile Originated (MO) data transmission, a procedure similar to that shown in FIG. 9 may be applied to Mobile Terminated (MT) data transmission.

Eighth Embodiment

Figure 10:
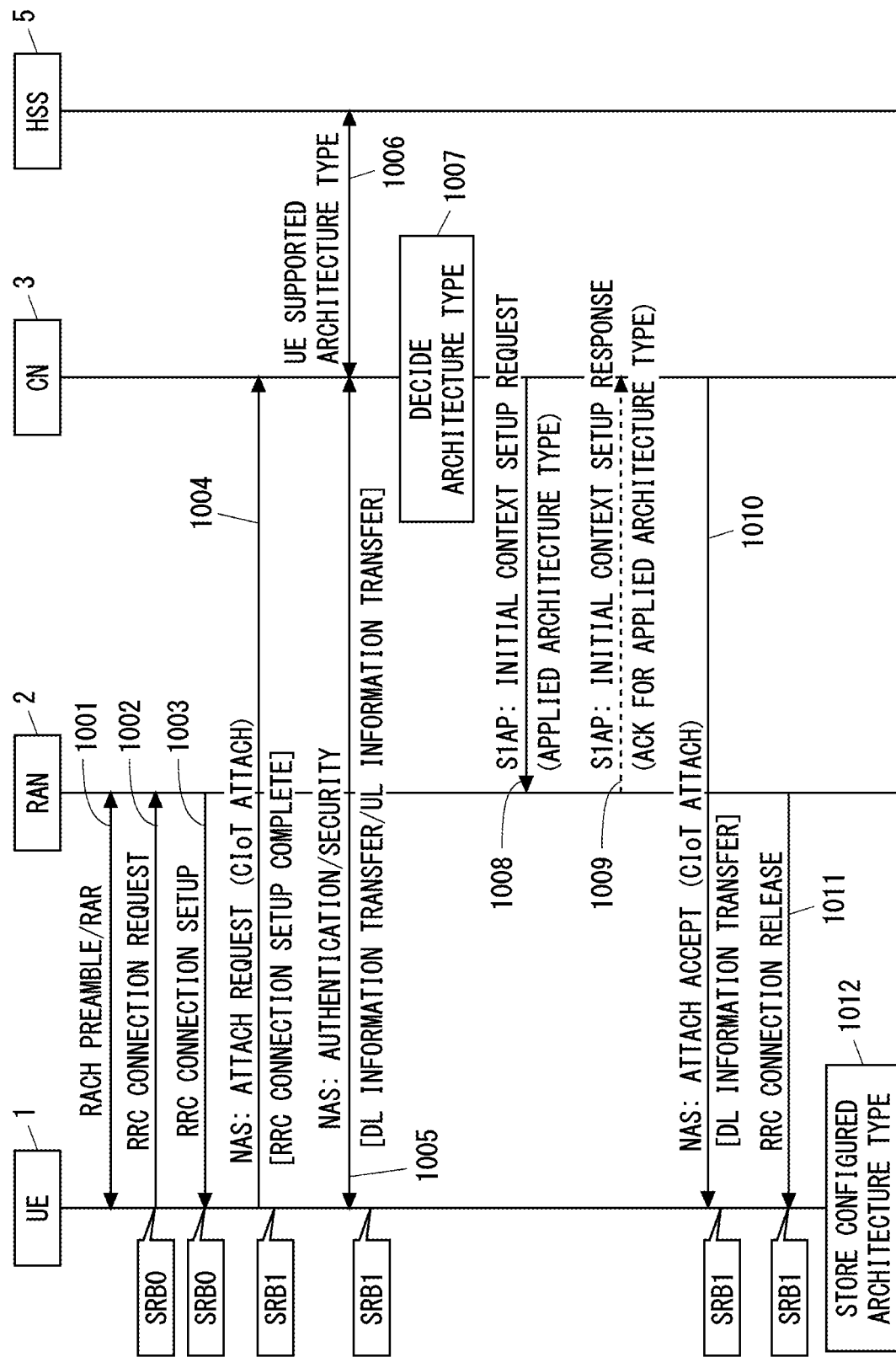
FIG. 10 is a sequence diagram showing an example of a communication procedure according to an eighth embodiment.

A configuration example of a radio communication network according to this embodiment is similar to the one shown in FIG. 2. This embodiment provides another communication procedure involving determination (or selection) of communication architecture used for the UE 1. FIG. 10 is a sequence diagram showing an example of a communication procedure according to this embodiment. In the procedure shown in FIG. 10, the CN 3 determines a communication architecture type used for data packet transmission for the UE 1, during a procedure for attaching the UE 1 to the CN 3. Note that the procedure shown in FIG. 10 differs from that shown in FIG. 9 in that an information element about communication architecture types (e.g., a UE Supported Architecture Type), which explicitly or implicitly indicates one or more communication architecture types supported by the UE 1, is transmitted from an HSS 5 to the CN 3 (e.g., MME or C-SGN).

Steps 1001 to 1006 are similar to steps 801 to 806 in FIG. 8. Steps 1007 to 1009 are similar to steps 905 to 907 in FIG. 9. Steps 1010 to 1012 are similar to steps 307 to 309 in FIG. 3, steps 407 to 409 in FIG. 4, steps 508 to 510 in FIG. 5, steps 608 to 610 in FIG. 6, steps 709 to 711 in FIG. 7, steps 810 to 812 in FIG. 8, or steps 909 to 911 in FIG. 9.

When the second communication architecture type is used for the UE 1, the procedure shown in FIG. 10 may be changed so that an AS security setup is performed as in the case of the above-described other procedures. Although FIG. 10 shows Mobile Originated (MO) data transmission, a procedure similar to that shown in FIG. 10 may be applied to Mobile Terminated (MT) data transmission.

Ninth Embodiment

Figure 11:
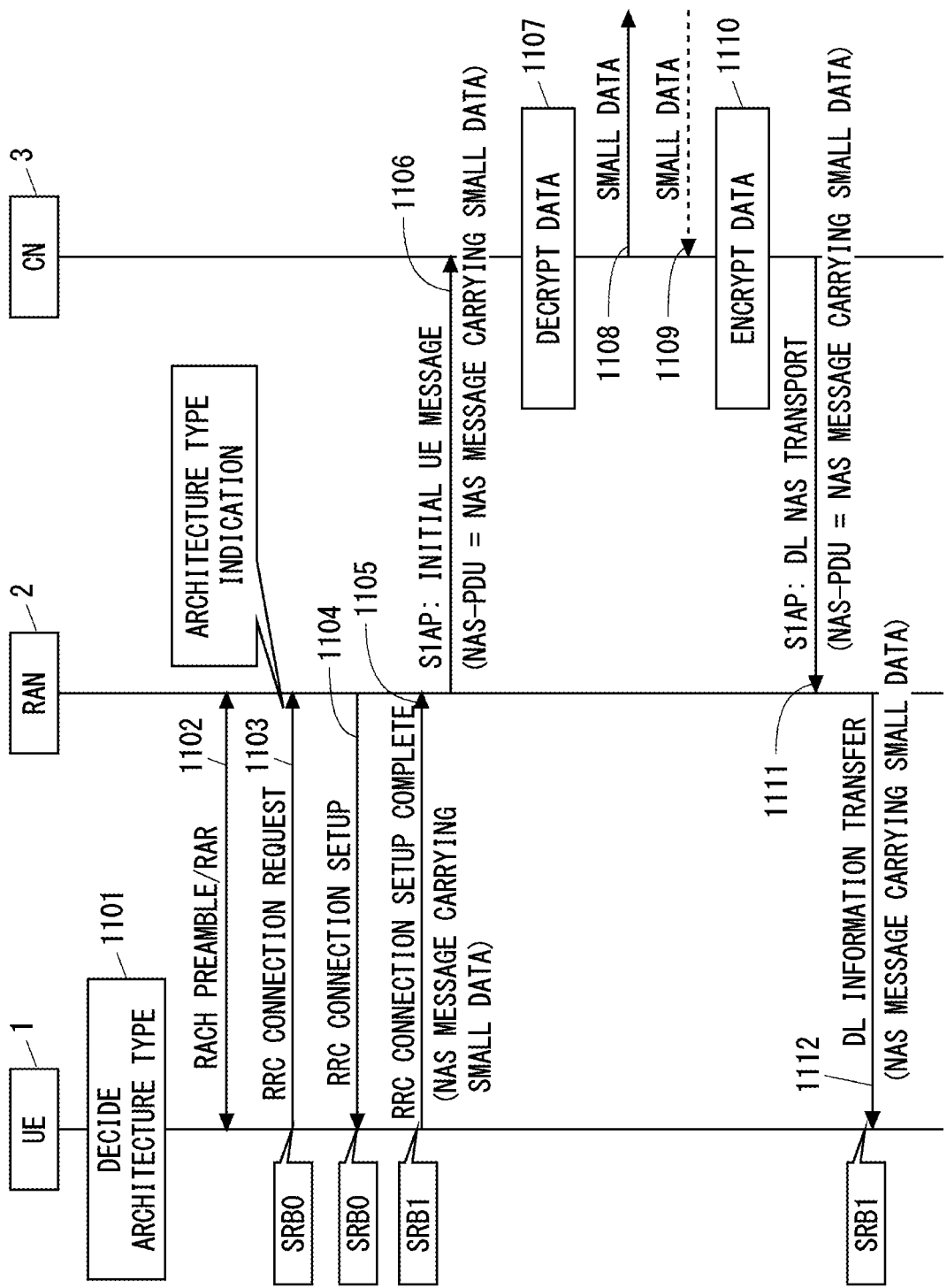
FIG. 11 is a sequence diagram showing an example of a communication procedure according to a ninth embodiment.
Figure 12:
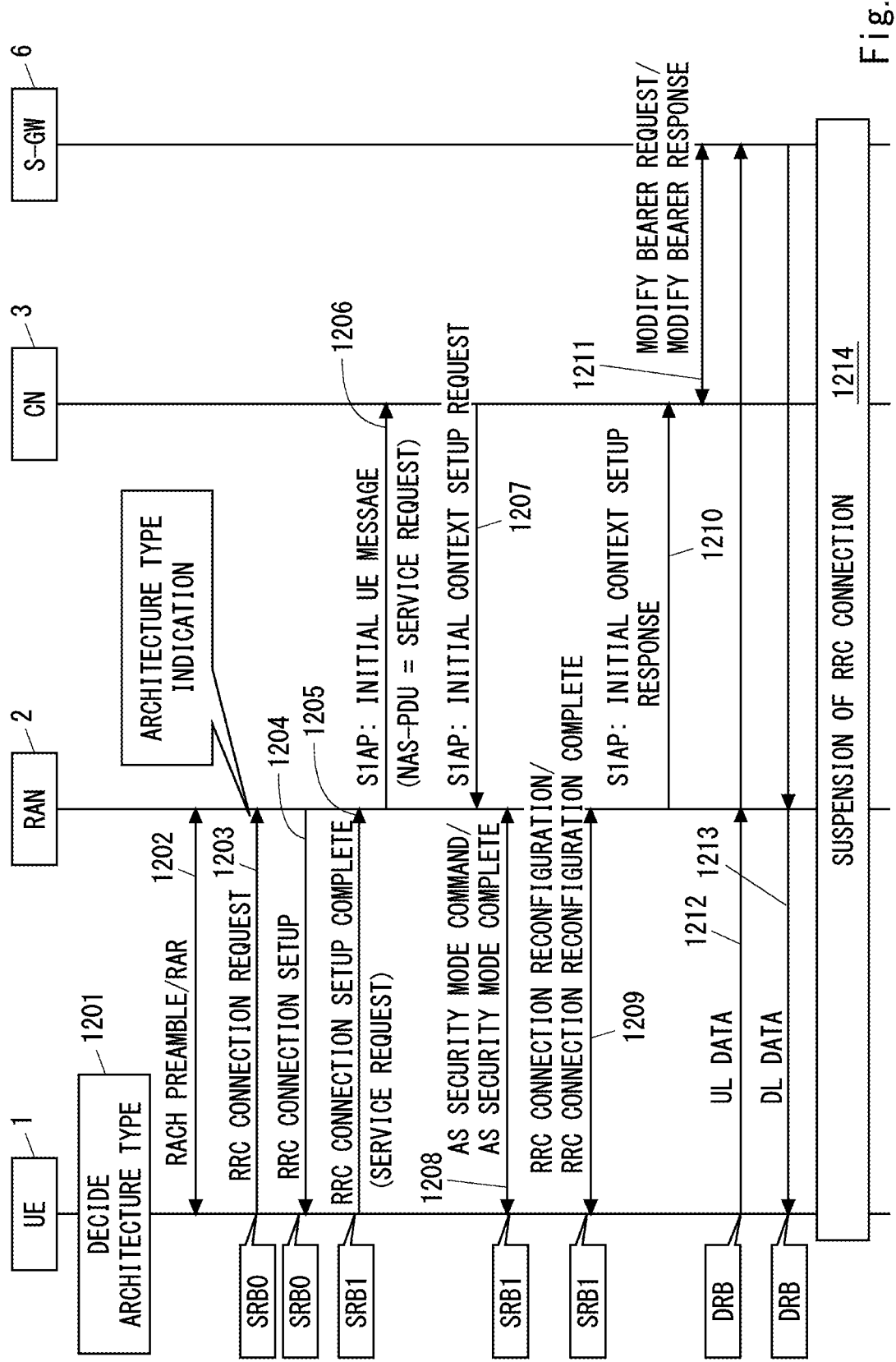
FIG. 12 is a sequence diagram showing an example of a communication procedure according to a ninth embodiment.

A configuration example of a radio communication network according to this embodiment is similar to the one shown in FIG. 2. This embodiment provides another communication procedure involving determination (or selection) of communication architecture used for the UE 1. FIGS. 11 and 12 show a sequence diagram showing examples of a communication procedure according to this embodiment. In the procedures shown in FIGS. 11 and 12, the UE 1 determines (or selects) a communication architecture type used for data packet transmission for the UE 1, during an RRC connection setup procedure in which the UE 1 transitions from RRC-Idle mode (or another suspension mode) to RRC-Connected mode to perform data packet transmission after attach.

FIG. 11 shows a case where the first communication architecture type is used for the UE 1. As already described, in the first communication architecture type, user data packets transmitted or received by the UE 1 are transferred through the control plane (e.g., a NAS message transmitted between the UE and the MME/C-SGN). Meanwhile, FIG. 12 shows a case where the second communication architecture type is used for the UE 1. In the second communication architecture type, user data packets transmitted or received by the UE 1 are transferred through the user plane (e.g., an EPS bearer including a DRB and a GPRS Tunneling Protocol (GTP) tunnel).

Referring to FIG. 11, the UE 1 determines (selects) a communication architecture type used for data packet transmission for the UE 1 in step 1101. The determination of a communication architecture type may take into account parameters similar to those in step 301 in FIG. 3. In the example shown in FIG. 11, the UE 1 can determine (or select) a communication architecture type at every transmission opportunity. Accordingly, the UE 1 may take into account a parameter(s) that dynamically changes at every transmission opportunity. For example, the UE 1 may select a communication architecture type according to a data transmission trigger (e.g., mo-Data, mo-ExceptionData, mt-Access, or mo-Signaling). Additionally or alternatively, the UE 1 may select a communication architecture type according to the type of an application that performs data packet transmission.

Steps 1102 to 1106 are similar to steps 302 to 305 in FIG. 3. However, the example in FIG. 11 shows a transition from RRC-Idle mode (or another suspension mode) to RRC-Connected mode performed after attach. Further, in the example shown in FIG. 11, the UE 1 selects the first communication architecture type in step 1101. Thus, the initial NAS message transmitted by the UE 1 in step 1105 is a NAS message carrying small data. That is, the small data piggybacks onto the initial NAS message.

In step 1106, the RAN 2 sends an initial NAS message (i.e., a NAS message carrying the small data) retrieved from the RRC Connection Setup Complete message to the CN 3 (e.g., MME or C-SGN) using an S1AP: Initial UE message. The initial NAS message (i.e., the NAS message carrying the small data) is embedded into a NAS-PDU Information Element (IE) of the S1AP: Initial UE message. The RAN 2 may incorporate an information element explicitly or implicitly indicating the first communication architecture type determined by the UE 1 into the S1AP: Initial UE message. The RAN 2 may select, from DCNs in the CN 3, a DCN corresponding to the first communication architecture type determined by the UE 1 and send the S1AP: Initial UE message to the selected DCN.

In step 1107, the CN 3 (e.g., MME or C-SGN) decrypts the uplink NAS message transmitted from the UE 1 to obtain the small data packet. In step 1108, the CN 3 forwards the small data packet according to the data type of the small data packet. When an ACK or a response to the Mobile Originated small packet is expected to be transmitted, the CN 3 receives an arriving response downlink data packet (step 1109). In step 1110, the CN 3 encrypts the downlink data packet and generates a downlink NAS message carrying the encrypted downlink data packet. In step 1111, the CN 3 sends an S1AP: DL NAS Transport message to the RAN 2. In step 1112, the RAN 2 transmits an RRC: DL Information Transfer message to the UE 1 on an SRB 1. This DL Information Transfer message includes the downlink NAS message carrying the encrypted downlink data packet destined for the UE 1.

Next, referring to FIG. 12, step 1201 in FIG. 12 is similar to step 1101 in FIG. 11. However, in the example shown in FIG. 12, the UE 1 selects the second communication architecture type for data packet transmission for the UE 1.

Steps 1202 to 1206 are similar to steps 1102 to 1106 in FIG. 11. However, since the second communication architecture type is used in the example shown in FIG. 12, the initial NAS message transmitted by the UE 1 in step 1205 is a Service Request message.

In step 1206, the RAN 2 sends an initial NAS message (i.e., a Service Request message) retrieved from the RRC Connection Setup Complete message to the CN 3 (e.g., MME or C-SGN) using an S1AP: Initial UE message. The Initial NAS message (i.e., the Service Request message) is embedded into a NAS-PDU Information Element (IE) of the S1AP: Initial UE Message. The RAN 2 may incorporate an information element explicitly or implicitly indicating the second communication architecture type determined by the UE 1 into the S1AP: Initial UE message. The RAN 2 may select, from DCNs in the CN 3, a DCN corresponding to the second communication architecture type determined by the UE 1 and send the S1AP: Initial UE message to the selected DCN.

Steps 1207 to 1211 are similar to an EPS bearer establishment procedure in the existing service request procedure. In steps 1212 and 1213, the UE 1 transmits uplink data on an uplink bearer through an S-GW 6 and the RAN 2 and receives downlink data on a downlink bearer through the S-GW 6 and the RAN 2.

In step 1214, the UE 1, the RAN 2, and the CN 3 suspend the RRC connection. The UE 1 transitions from RRC-Connected mode to RRC-Idle mode (or another suspension mode) and retains information about the RRC connection (e.g., an Access Stratum Security Context, a bearer related information (incl. RoHC state information), and L2/1 parameters when applicable) while it is in RRC-Idle mode (or another suspension mode). Similarly, the RAN 2 retains information about the RRC connection for the UE 1 (e.g., an Access Stratum Security Context, bearer related information (incl. RoHC state information), and L2/1 parameters when applicable). Further, the RAN 2 and the CN 3 retain S1AP UE Contexts. Furthermore, the RAN 2 retains S1-U tunnel addresses. In this way, the UE 1, the RAN 2, and the CN 3 can reuse the information obtained from the previous RRC connection for the subsequent RRC connection setup.

Although FIGS. 11 and 12 show Mobile Originated (MO) data transmission, procedures similar to those shown in FIGS. 11 and 12 may be applied to Mobile Terminated (MT) data transmission.

The procedure shown in FIG. 12 may be modified as follows. In some implementations, the S1AP: Initial UE message in step 1206 may indicate a downlink tunnel endpoint identifier used in the second communication architecture type. The downlink tunnel endpoint identifier specifies a tunnel endpoint on the RAN 2 of a bearer between the RAN 2 and the CN 3 which is used for data packet transmission for the UE 1 in the second communication architecture type. The downlink tunnel endpoint identifier may be an S1 eNB TEID (i.e., an S1 TEID (DL)) of an S1 bearer (i.e., a GTP tunnel). Further, the S1AP: Initial UE message in step 1206 may indicate an address of the RAN 2 (e.g., an eNB address) used for data packet transmission for the UE 1 in the second communication architecture type. In this way, it is possible to omit transmission of a Modify Bearer Request message from the MME to the S-GW and a Modify Bearer Response message from the S-GW to the MME, which are necessary in the existing EPS bearer establishment procedure. Additionally or alternatively, it is possible to omit transmission of an Initial Context Setup Response message from the eNB to the MME, which is necessary in the existing EPS bearer establishment procedure. In CIoT, the RAN 2 and the CN 3 is required to have a capability of communicating with a large number of CIoT devices. By eliminating transmission of these signaling messages, it is possible to contribute to reducing the CIoT-related load on the RAN 2 and the CN 3.

In the examples shown in FIGS. 11 and 12, the UE 1 determines a communication architecture type used for data packet transmission for the UE 1 and transmits to the RAN 2 an RRC Connection Request message including an establishment cause indicating the determined communication architecture type. Accordingly, the examples shown in FIGS. 11 and 12 can provide the same advantages as the example shown in FIG. 3. Further, the examples shown in FIGS. 11 and 12 allows the UE 1 to determine a communication architecture type used for data packet transmission for the UE 1, during an RRC connection setup procedure in which the UE 1 transitions from RRC-Idle mode (or another suspension mode) to RRC-Connected mode to perform data packet transmission after attach.

Tenth Embodiment

Figure 13:
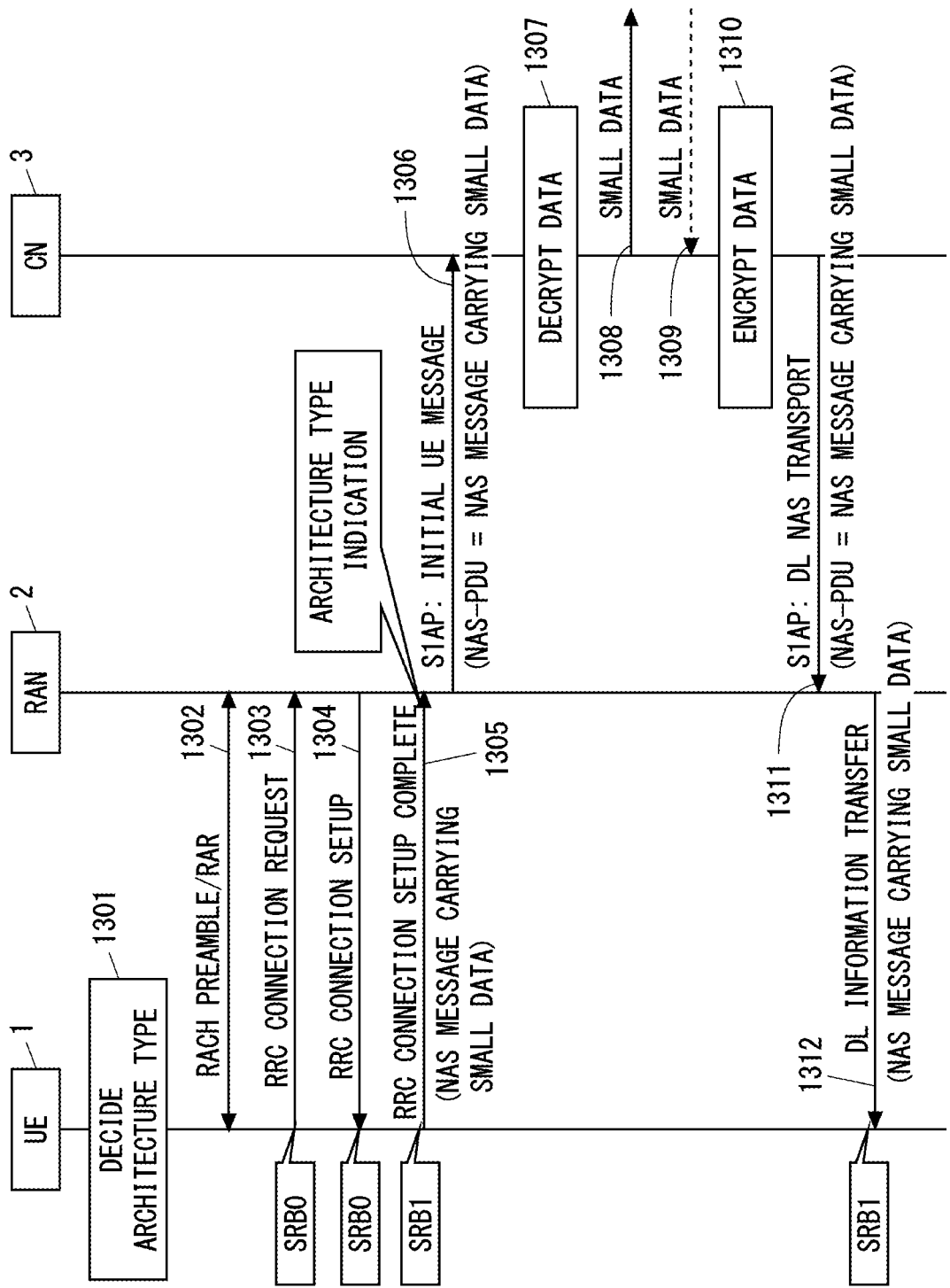
FIG. 13 is a sequence diagram showing an example of a communication procedure according to a tenth embodiment.
Figure 14:
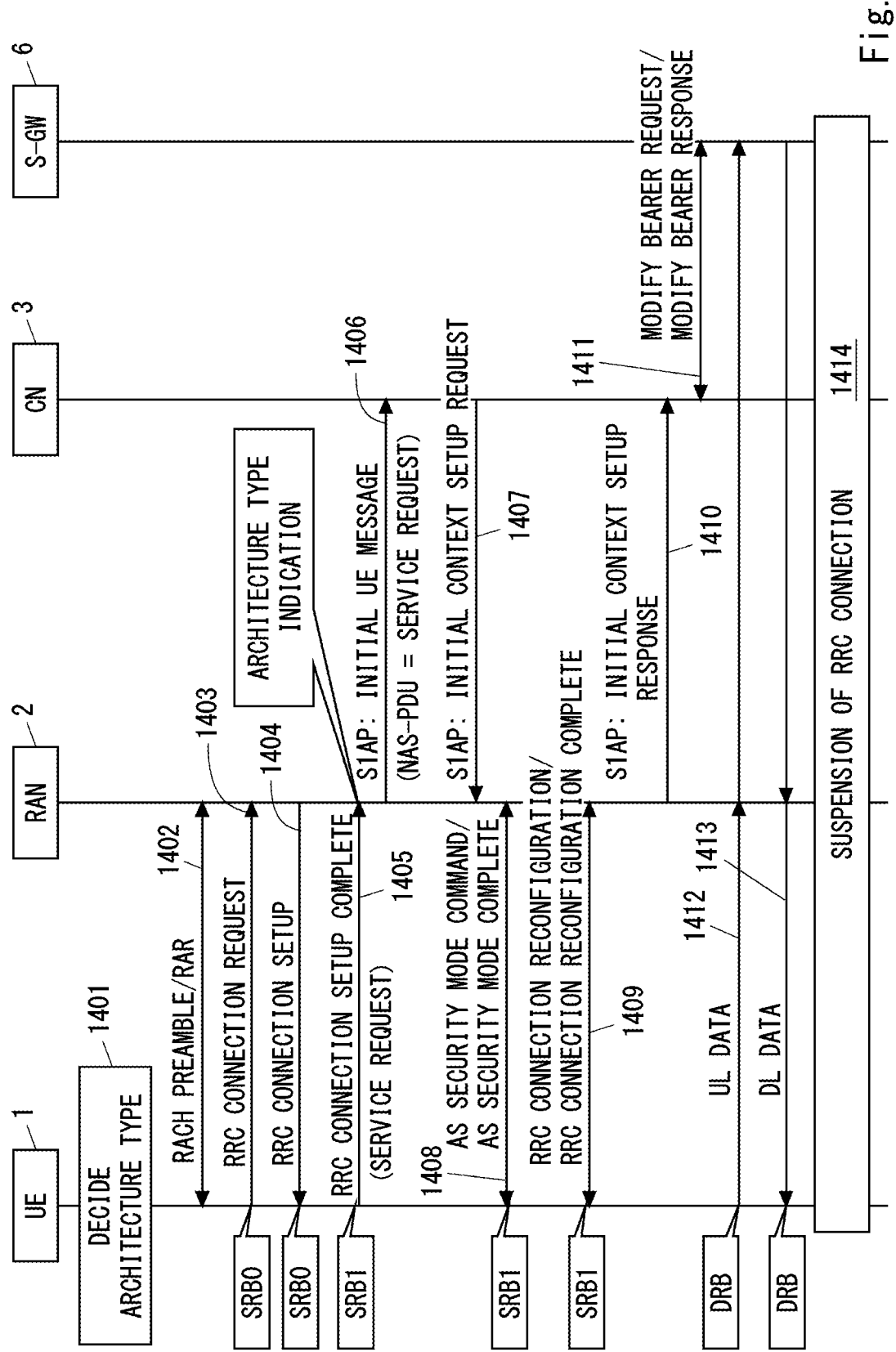
FIG. 14 is a sequence diagram showing an example of a communication procedure according to the tenth embodiment.

A configuration example of a radio communication network according to this embodiment is similar to the one shown in FIG. 2. This embodiment provides another communication procedure involving determination (or selection) of communication architecture used for the UE 1. FIGS. 13 and 14 show a sequence diagram showing an example of a communication procedure according to this embodiment. In the procedures shown in FIGS. 13 and 14, the UE 1 determines a communication architecture type used for data packet transmission for the UE 1, during an RRC connection setup procedure in which the UE 1 transitions from RRC-Idle mode (or another suspension mode) to RRC-Connected mode to perform data packet transmission after attach. FIG. 13 shows a case where the first communication architecture type is used for the UE 1. Meanwhile, FIG. 14 shows a case where the second communication architecture type is used for the UE 1. Note that the procedures in FIGS. 13 and 14 are different from the procedures in FIGS. 11 and 12 in that the communication architecture type determined by the UE 1 is sent to the RAN 2 by an RRC Connection Setup Complete message.

Referring to FIG. 13, steps 1301 to 1312 are similar to steps 1101 to 1112 in FIG. 11. However, in the procedure in FIG. 13, the UE 1 transmits, to the RAN 2, a UE Assistance Information Element (IE) explicitly or implicitly indicating the first communication architecture type determined by the UE 1, using an RRC Connection Setup Complete message (step 1305) as in the procedure in FIG. 4.

Next, referring to FIG. 14, steps 1401 to 1414 are similar to steps 1201 to 1214 in FIG. 12. However, in the procedure in FIG. 14, the UE 1 transmits, to the RAN 2, a UE Assistance Information Element (IE) explicitly or implicitly indicating the second communication architecture type determined by the UE 1, using an RRC Connection Setup Complete message (step 1405) as in the procedure in FIG. 4.

Although FIGS. 13 and 14 show Mobile Originated (MO) data transmission, procedures similar to those shown in FIGS. 13 and 14 may be applied to Mobile Terminated (MT) data transmission.

In the examples shown in FIGS. 13 and 14, the UE 1 determines a communication architecture type used for data packet transmission for the UE 1 and transmits to the RAN 2 an RRC Connection Setup Complete message including a UE assistance IE indicating the determined communication architecture type. Accordingly, the examples shown in FIGS. 13 and 14 can provide the same advantages as the example shown in FIG. 4. Further, the example shown in FIGS. 13 and 14 allows the UE 1 to determine a communication architecture type used for data packet transmission for the UE 1, during an RRC connection setup procedure in which the UE 1 transitions from RRC-Idle mode (or another suspension mode) to RRC-Connected mode to perform data packet transmission after attach.

Eleventh Embodiment

Figure 15:
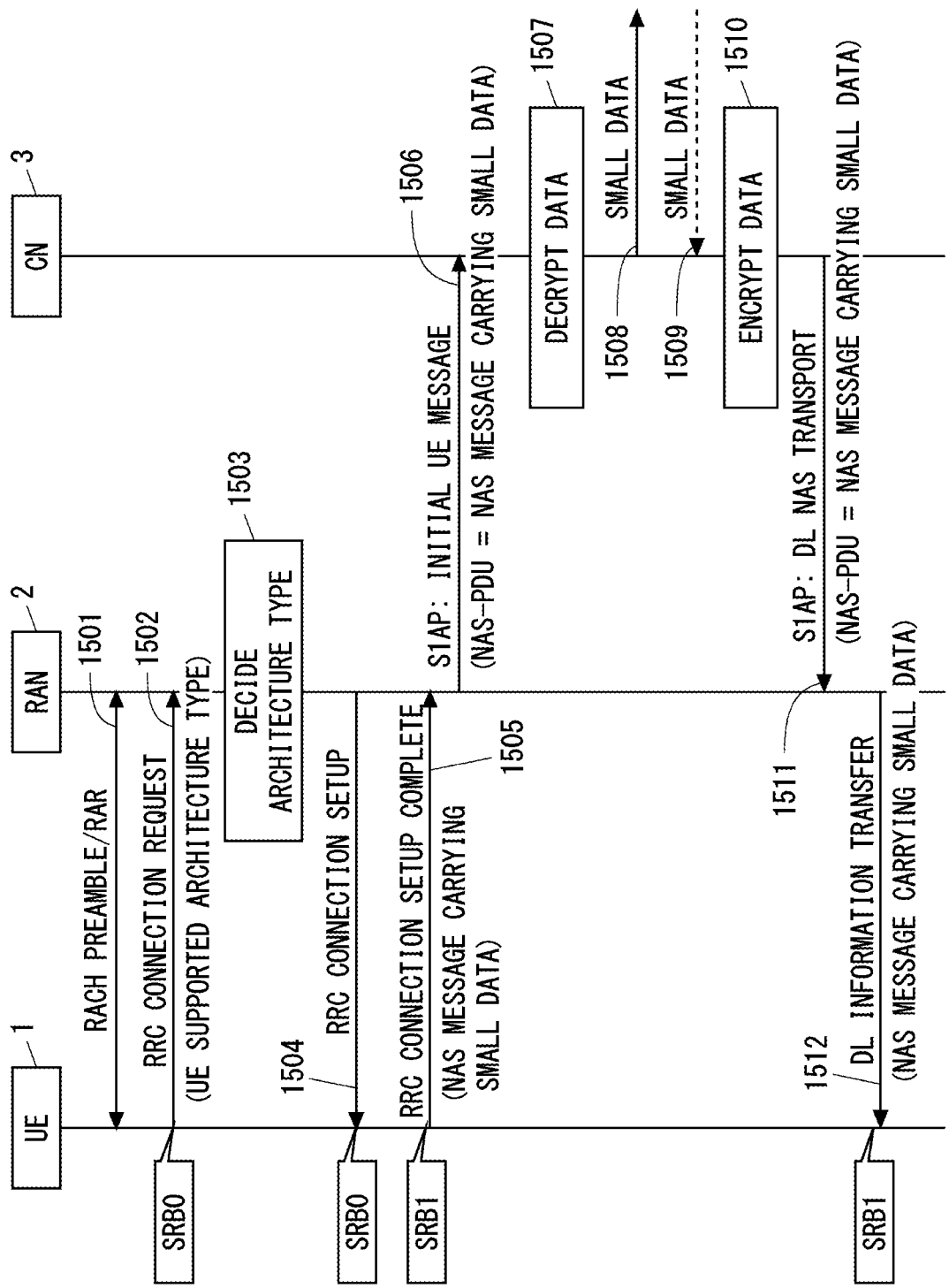
FIG. 15 is a sequence diagram showing an example of a communication procedure according to an eleventh embodiment.
Figure 16:
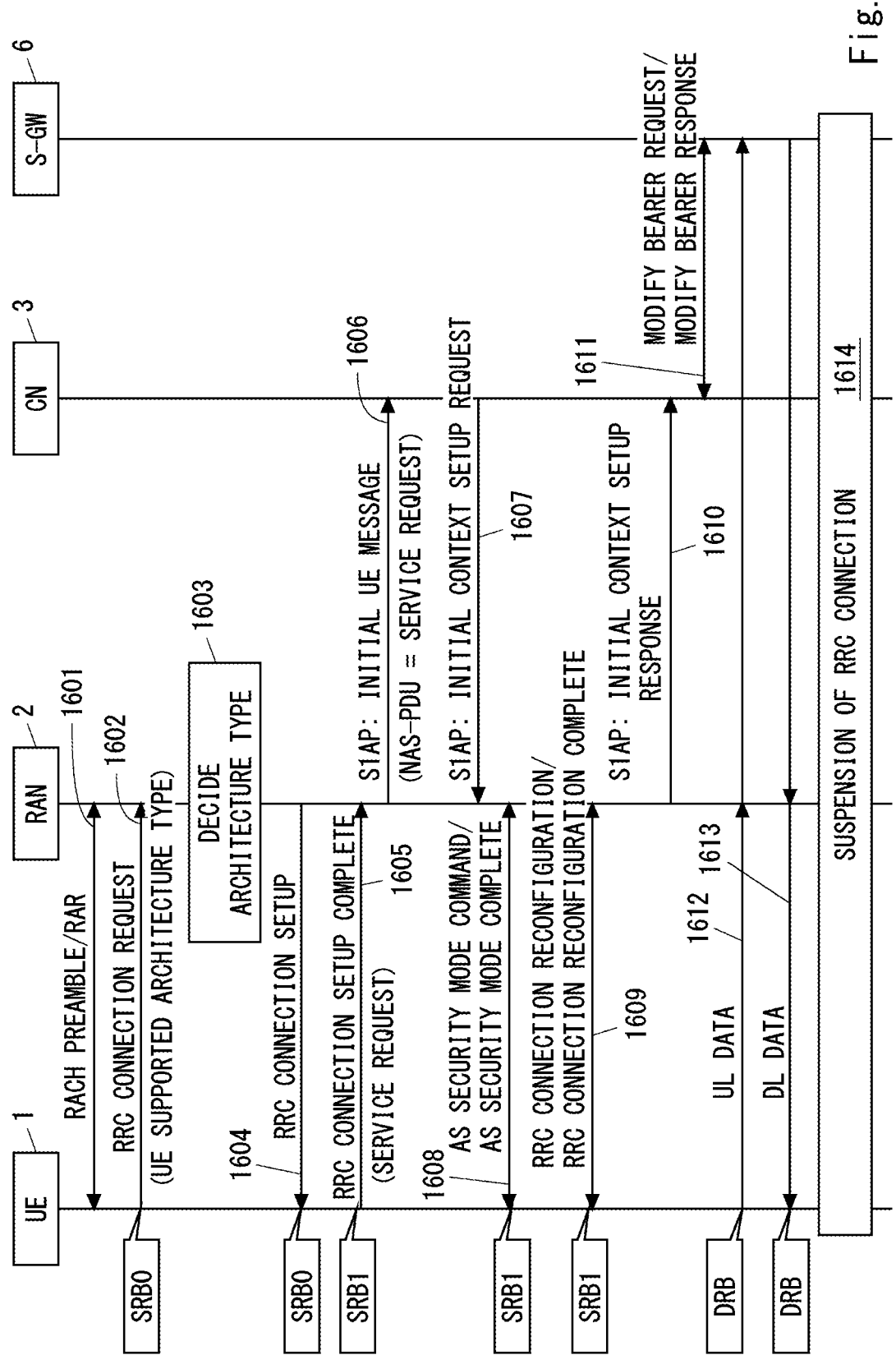
FIG. 16 is a sequence diagram showing an example of a communication procedure according to the eleventh embodiment.

A configuration example of a radio communication network according to this embodiment is similar to the one shown in FIG. 2. This embodiment provides another communication procedure involving determination (or selection) of communication architecture used for the UE 1. FIGS. 15 and 16 show a sequence diagram showing an example of a communication procedure according to this embodiment. In the procedures shown in FIGS. 15 and 16, the RAN 2 determines a communication architecture type used for data packet transmission for the UE 1, during an RRC connection setup in which the UE 1 transitions from RRC-Idle mode (or another suspension mode) to RRC-Connected mode to perform data packet transmission after attach. FIG. 15 shows a case where the first communication architecture type is used for the UE 1. Meanwhile, FIG. 16 shows a case where the second communication architecture type is used for the UE 1. Note that the procedures in FIGS. 15 and 16 are different from the procedures in FIGS. 11 and 12 in that the RAN 2 determines the communication architecture type.

Referring to FIG. 15, steps 1501 to 1505 are similar to steps 601 to 605 in FIG. 6. However, the example in FIG. 15 shows a transition from RRC-Idle mode (or another suspension mode) to RRC-Connected mode performed after attach. Further, in the example shown in FIG. 15, the RAN 2 selects the first communication architecture type for the UE 1 in step 1503. Thus, the initial NAS message transmitted by the UE 1 in step 1505 is a NAS message carrying small data. That is, the small data piggybacks onto the initial NAS message. The RRC Connection Setup message in step 1504 may explicitly or implicitly indicate the first communication architecture type determined by the RAN 2 in step 1503 (e.g., an Applied Architecture Type or a Selected Architecture Type).

When the RAN 2 explicitly indicates a communication architecture type, the RAN 2 may transmit to the UE 1 an RRC Connection Setup message including an AS layer (e.g., RRC layer) information element or a NAS layer information element indicating the communication architecture type. When a NAS information element indicating the communication architecture type is transmitted, the NAS layer of the UE 1 may send information indicating the communication architecture type to be used to the AS layer of the UE 1, or may start data transmission in accordance with the communication architecture type. On the other hand, when the RAN 2 implicitly indicates the communication architecture type, the RAN 2 may notify the UE 1 of the selected communication architecture type by incorporating configuration information for the selected communication architecture type into the RRC Connection Setup message.

In step 1506, the RAN 2 sends an initial NAS message (i.e., a NAS message carrying the small data) retrieved from the RRC Connection Setup Complete message to the CN 3 (e.g., MME or C-SGN) using an S1AP: Initial UE message. The initial NAS message (i.e., the NAS message carrying the small data) is embedded into a NAS-PDU Information Element (IE) of the S1AP: Initial UE message. The RAN 2 may incorporate an information element indicating the communication architecture type determined in step 1503 (e.g., an Applied Architecture Type or a Selected Architecture Type) into the S1AP: Initial UE message. The RAN 2 may select, from DCNs in the CN 3, a DCN corresponding to the communication architecture type determined in step 1503 and send the S1AP: Initial UE message carrying the initial NAS message (i.e., the Attach Request message) to the selected DCN.

Steps 1507 to 1512 are similar to steps 1107 to 1112 in FIG. 11 or steps 1307 to 1312 in FIG. 13.

Next, referring to FIG. 16, steps 1601 to 1606 are similar to steps 1501 to 1505 in FIG. 15. However, in step 1603, the RAN 2 selects the second communication architecture type for the UE 1. Thus, the initial NAS message transmitted by the UE 1 in step 1605 is a Service Request message. The RRC Connection Setup message in step 1604 may explicitly or implicitly indicate the second communication architecture type determined by the RAN 2 in step 1603 (e.g., an Applied Architecture Type or a Selected Architecture Type).

Steps 1606-1614 are similar to steps 1206 to 1214 in FIG. 12 or steps 1406-1414 in FIG. 14.

Although FIGS. 15 and 16 show Mobile Originated (MO) data transmission, procedures similar to those shown in FIGS. 15 and 16 may be applied to Mobile Terminated (MT) data transmission.

The example shown in FIGS. 15 and 16 allows the RAN 2 to determine a communication architecture type used for data packet transmission for the UE 1, during an RRC connection setup procedure in which the UE 1 transitions from RRC-Idle mode (or another suspension mode) to RRC-Connected mode to perform data packet transmission after attach.

Twelfth Embodiment

A configuration example of a radio communication network according to this embodiment is similar to the one shown in FIG. 2. However, the CN 3 includes a plurality of (dedicated) core networks. The RAN 2 determines a communication architecture type used for data packet transmission for the UE 1 and selects, from a plurality of (dedicated) core networks included in the CN 3, a (dedicated) core network corresponding to the determined communication architecture type. Further, the RAN 2 is configured to send an initial Non-Access Stratum (NAS) message to the selected core network.

Figure 17:
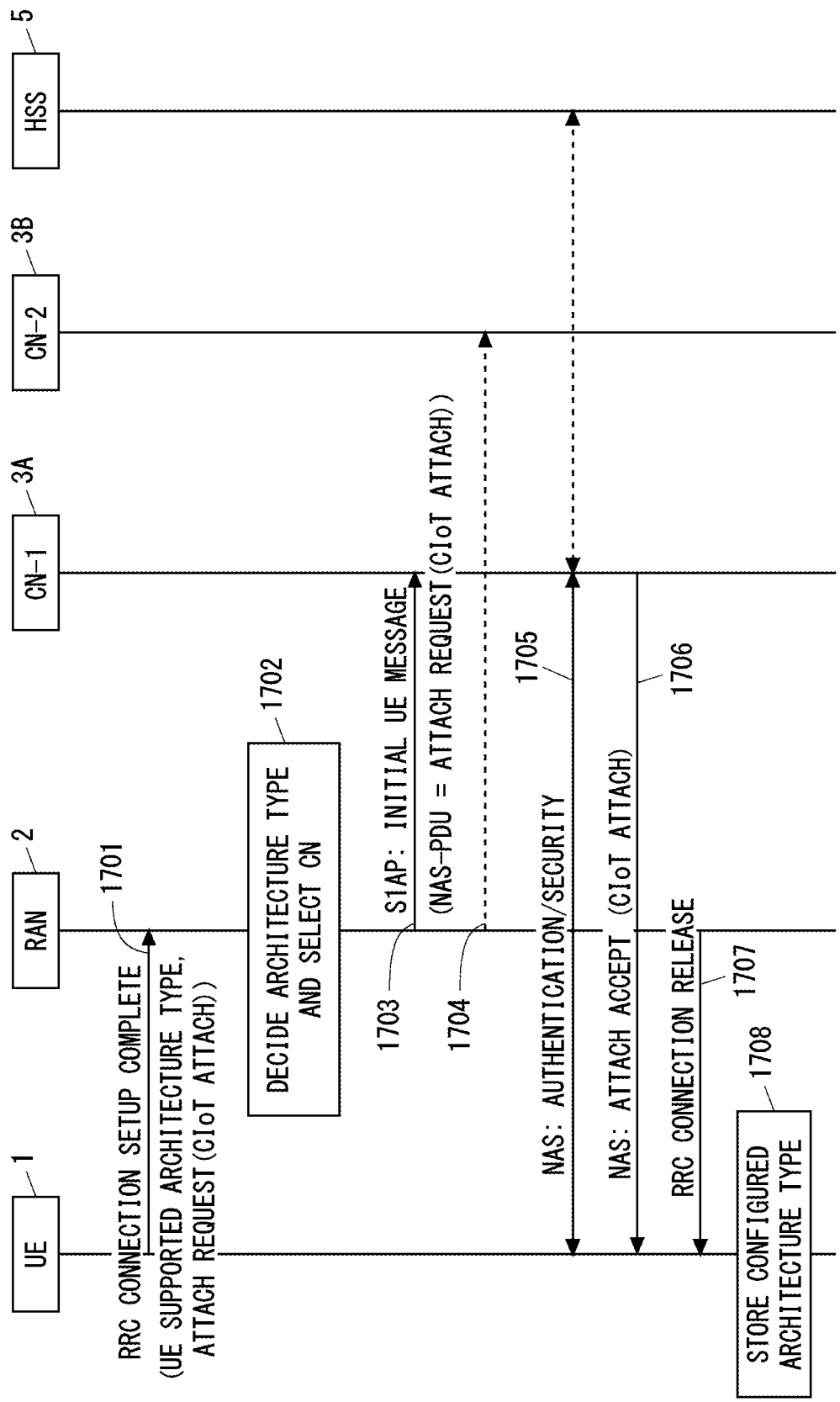
FIG. 17 is a sequence diagram showing an example of a communication procedure according to a twelfth embodiment.

FIG. 17 is a sequence diagram showing an example of a communication procedure according to this embodiment. In the example shown in FIG. 17, the CN 3 includes a first (dedicated) core network ((D)CN-1 3A) corresponding to the first communication architecture type and a second (dedicated) core network ((D)CN-2 3B) corresponding to the second communication architecture type.

Step 1701 is similar to step 504 in FIG. 5. That is, the UE 1 transmits an RRC Connection Setup Complete message during an RRC connection setup procedure for initial attach. The RRC Connection Setup Complete message in step 1701 includes an information element explicitly or implicitly indicating one or more communication architecture types supported by the UE 1 (e.g., a UE Supported Architecture Type). This information element is AS (RRC) information.

In step 1702, similarly to step 505 in FIG. 5, the RAN 2 determines a communication architecture type used for the UE 1 while considering the one or more communication architecture types supported by the UE 1. Further, the RAN 2 selects, from a plurality of (dedicated) core networks included in the CN 3, a (dedicated) core network corresponding to the determined communication architecture type. That is, when the RAN 2 selects the first communication architecture type for the UE 1, it selects the CN-1 3A and sends an S1AP: Initial UE message to the CN-1 3A (step 1703). When the RAN 2 selects the second communication architecture type for the UE 1, it selects the CN-2 3B and sends an Initial UE message to the CN-2 3B (step 1704). This Initial UE message may indicate the communication architecture type selected by the RAN 2 (e.g., an Applied Architecture Type or a Selected Architecture Type).

Steps 1705 to 1708 are similar to steps 507 to 510 in FIG. 5. The Attach Accept message in step 1706, the RRC Connection Release message in step 1707, or another downlink NAS message transmitted from the CN 3 (i.e., the CN-1 3A or the CN-2 3B) to the UE 1 may explicitly or implicitly indicate the communication architecture type used for the UE 1.

When the UE 1 performs data transmission after attach in accordance with the procedure shown in FIG. 17, the UE 1 may indicate information about the dedicated CN to which the UE 1 has been registered (i.e., information about the MME or the C-SGN), using a Registered MME Information Element (IE) included in the RRC Connection Setup Complete message. The RAN 2 may use the Registered MME IE included in the RRC Connection Setup Complete message to select a communication architecture type applied to the UE 1 and select a (dedicated) CN. That is, when the Registered MME IE indicates a NAS node (e.g., MME/C-SGN) of the CN-1 3A, the RAN 2 selects the first communication architecture type and the CN-1 3A for the UE 1, whereas when the Registered MME IE indicates a NAS node (e.g., MME/C-SGN) of the CN-2 3B, the RAN 2 selects the second communication architecture type and the CN-2 3B for the UE 1. A Registered C-SGN IE, a Registered DCN IE, or a UE Usage Type may be used, in addition to or instead of the Registered MME IE.

In the example shown in FIG. 17, the RAN 2 determines a communication architecture type used for the UE 1 and selects a (dedicated) core network to which an Initial UE message to be transmitted. It thus enables the RAN 2 to select an appropriate (dedicated) core network according to a dynamic determination in the RAN 2 of a communication architecture type used for the UE 1.

Thirteenth Embodiment

A configuration example of a radio communication network according to this embodiment is similar to the one shown in FIG. 2. However, the CN 3 includes a plurality of (dedicated) core networks. The RAN 2 is configured to determine a communication architecture type used for data packet transmission for the UE 1. The CN 3 is configured to perform rerouting (or redirection) of an Initial UE message so that the Initial UE message is transmitted to an appropriate (dedicated) core network corresponding to the communication architecture type determined by the RAN 2.

Figure 18:
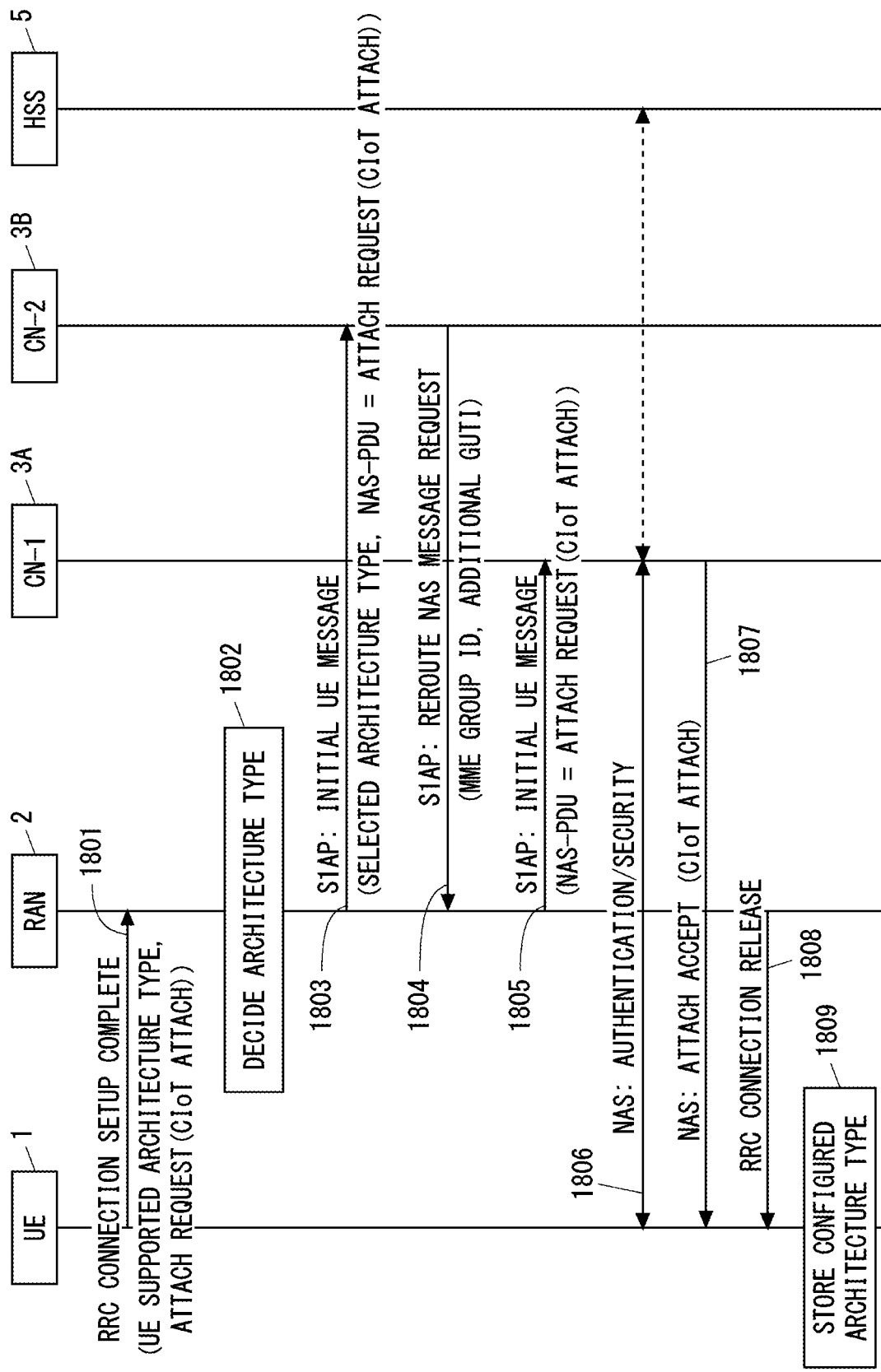
FIG. 18 is a sequence diagram showing an example of a communication procedure according to a thirteenth embodiment.

FIG. 18 is a sequence diagram showing an example of a communication procedure according to this embodiment. In the example shown in FIG. 18, the CN 3 includes a first (dedicated) core network ((D)CN-1 3A) corresponding to the first communication architecture type and a second (dedicated) core network ((D)CN-2 3B) corresponding to the second communication architecture type.

Steps 1801 and 1805 are similar to steps 504 and 505 in FIG. 5. The RAN 2 receives an RRC Connection Setup Complete message including an initial NAS message from the UE 1. The RAN 2 then determines a communication architecture type used for the UE 1 while considering the one or more communication architecture types supported by the UE 1.

In step 1803, the RAN 2 sends an S1AP Initial UE message to a pre-designated or arbitrarily-selected (dedicated) core network. This Initial UE message includes an information element explicitly or implicitly indicating the communication architecture type used for the UE 1 (e.g., an Applied Architecture Type or a Selected Architecture Type). In the example shown in FIG. 18, the RAN 2 sends the Initial UE message to the (dedicated) core network CN-2 3B. The pre-designated (dedicated) core network may be, for example, a core network that supports a default communication architecture type.

In step 1804, a NAS node (e.g., MME/C-SGN) located in the CN 3 (i.e., the CN-2 3B in this example) receives the Initial UE message from the RAN 2 and refers to the information element indicating the communication architecture type (e.g., an Applied Architecture Type or a Selected Architecture Type) included in the received Initial UE message. When the communication architecture type used for the UE 1 is associated with the CN-2 3B, the NAS node located in the CN-2 3B continues the attach process based on the Attach Request message included in the Initial UE message. On the other hand, when the communication architecture type used for the UE 1 is associated with another (dedicated) core network (i.e., the CN-1 3A in this example), the NAS node located in the CN-2 3B requests the RAN 2 to reroute the Initial UE message to the CN-1 3A. Specifically, as shown in FIG. 18, the CN-2 3B sends an S1AP: Reroute NAS Message Request message to the RAN 2. This Reroute NAS Message Request message includes an identifier of the (dedicated) core network to which the Initial UE message to be sent (e.g., an MME Group ID, a C-SGN Group ID, a DCN Group ID, and an Additional Global Unique Temporary Identity (GUTI)).

In step 1804, to determine the rerouting of the Initial UE message, the CN 3 may further consider subscription data of the UE 1 retrieved from the HSS 5 (e.g., a UE Capability or a UE Usage Type (e.g., C-IoT, a general MTC, or a delay tolerant MTC)).

In step 1805, upon receiving the S1AP: Reroute NAS Message Request message, the RAN 2 reroutes the Initial UE message to the core network (the CN-1 3A in this example) designated in the Reroute NAS Message Request message.

Steps 1806 to 1809 are similar to steps 1705 to 1708 in FIG. 17. The Attach Accept message in step 1807, the RRC Connection Release message in step 1808, or another downlink NAS message transmitted from the CN 3 (i.e., the CN-1 3A or the CN-2 3B) to the UE 1 may explicitly or implicitly indicate the communication architecture type used for the UE 1.

When the UE 1 performs data transmission after attach in accordance with the procedure shown in FIG. 18, the UE 1 may indicate information about a dedicated CN to which the UE 1 has been registered (i.e., information about the MME or the C-SGN), using a Registered MME Information Element (IE) included in the RRC Connection Setup Complete message. The RAN 2 may use the Registered MME IE included in the RRC Connection Setup Complete message to select a communication architecture type applied to the UE 1 and select a (dedicated) CN. That is, when the Registered MME IE indicates a NAS node (e.g., MME/C-SGN) of the CN-1 3A, the RAN 2 selects the first communication architecture type and the CN-1 3A for the UE 1, whereas when the Registered MME IE indicates a NAS node (e.g., MME/C-SGN) of the CN-2 3B, the RAN 2 selects the second communication architecture type and the CN-2 3B for the UE 1.

In the example shown in FIG. 18, the CN 3 recognizes the communication architecture type determined by the RAN 2 and reroutes the Initial UE message according to the communication architecture type determined by the RAN 2. It is thus enable the CN 3 to handle the Initial UE message in an appropriate (dedicated) core network according to a dynamic determination in the RAN 2 of the communication architecture type used for the UE 1.

Fourteenth Embodiment

A configuration example of a radio communication network according to this embodiment is similar to the one shown in FIG. 2. However, the CN 3 includes a plurality of (dedicated) core networks. The CN 3 is configured to determine a communication architecture type used for data packet transmission for the UE 1 and perform rerouting (redirection) of an Initial UE message so that the Initial UE message is transmitted to an appropriate (dedicated) core network corresponding to the communication architecture type determined by the CN 3.

Figure 19:
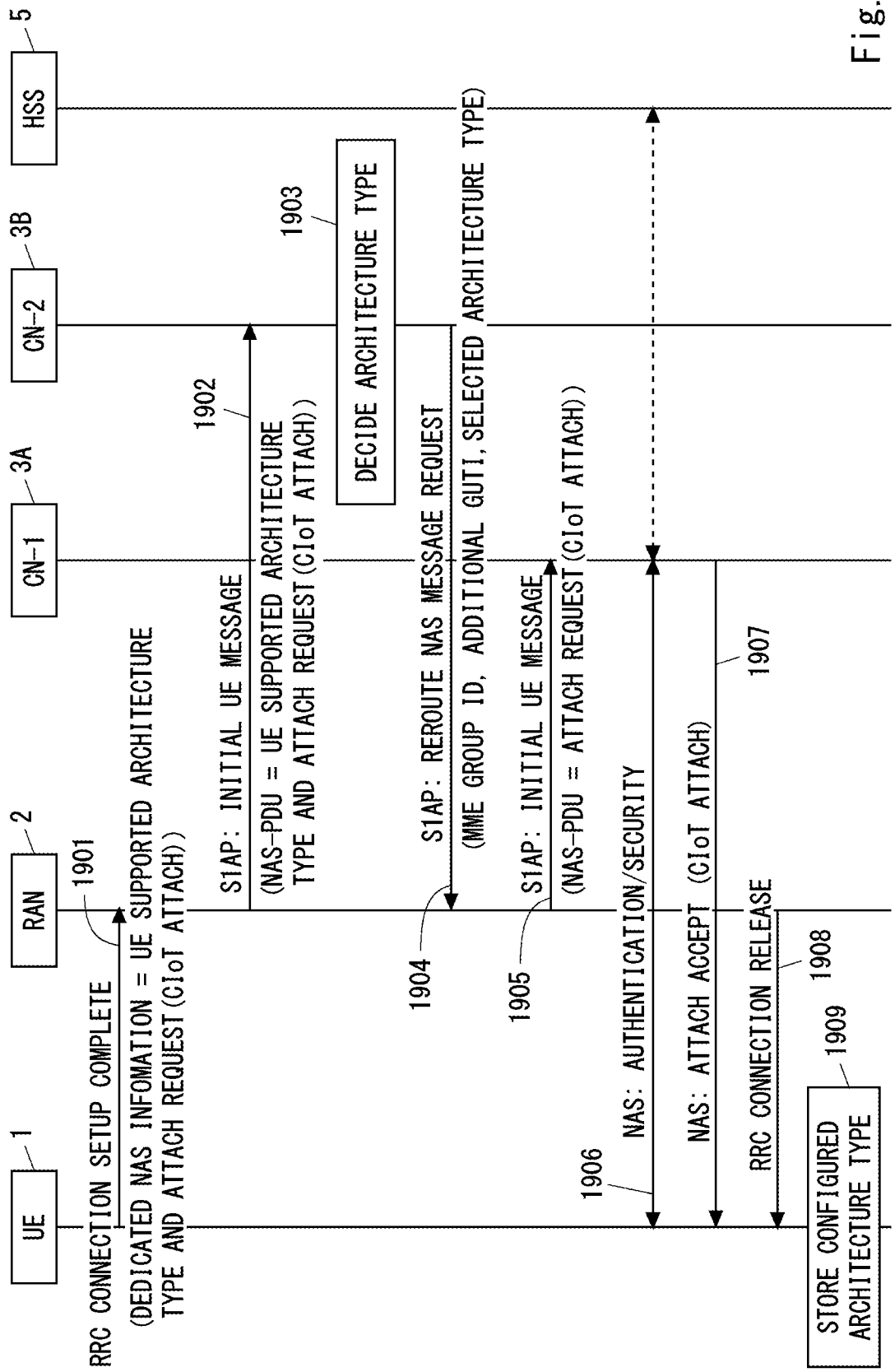
FIG. 19 is a sequence diagram showing an example of a communication procedure according to a fourteenth embodiment.

FIG. 19 is a sequence diagram showing an example of a communication procedure according to this embodiment. In the example shown in FIG. 19, the CN 3 includes a first (dedicated) core network ((D)CN-1 3A) corresponding to the first communication architecture type and a second (dedicated) core network ((D)CN-2 3B) corresponding to the second communication architecture type. The procedure shown in FIG. 19 is different from the one shown in FIG. 18 in that the CN 3 determines the communication architecture type used for the UE 1.

Steps 1901 and 1902 are similar to step 904 in FIG. 9. That is, in step 1901, the UE 1 transmits to the RAN 2 an RRC Connection Setup Complete message carrying Dedicated NAS information including an initial NAS message (i.e., an Attach Request message) and one or more communication architecture types supported by the UE 1 (e.g., a UE Supported Architecture Type). In step 1902, the RAN 2 retrieves the dedicated NAS information from the RRC Connection Setup Complete message. The RAN 2 then sends an S1AP: Initial UE message carrying a NAS-PDU including the retrieved dedicated NAS information to a pre-designated or arbitrarily-selected (dedicated) core network. In the example shown in FIG. 19, the RAN 2 sends the Initial UE message to the (dedicated) core network CN-2 3B.

Step 1903 is similar to step 905 in FIG. 9. That is, a NAS node (e.g., MME/C-SGN) located in the CN 3 (i.e., the CN-2 3B in this example) determines a communication architecture type used for the UE 1 while considering the one or more communication architecture types supported by the UE 1 (e.g., the UE Supported Architecture Type). To determine the communication architecture type, the NAS node located in the CN-2 3B may further consider subscription data of the UE 1 retrieved from the HSS 5 (e.g., a UE Capability or a UE Usage Type).

Steps 1904 to 1909 are similar to steps 1804 to 1809 in FIG. 18. However, the S1AP: Reroute NAS Message Request message in step 1904 may include an information element explicitly or implicitly indicating the communication architecture type used for the UE 1 determined by the CN-2 3B (e.g., an Applied Architecture Type or a Selected Architecture Type). In this way, the RAN 2 can recognize the communication architecture type used for the UE 1.

In the example shown in FIG. 19, the CN 3 determines a communication architecture type for the UE 1 and reroutes an Initial UE message according to the determined communication architecture type. It is thus enable the CN 3 to handle the Initial UE message in an appropriate (dedicated)

core network according to a dynamic determination in the CN 3 of the communication architecture type used for the UE 1.

Fifteenth Embodiment

The method for transmitting an information element explicitly or implicitly indicating a communication architecture type from the UE 1 to the RAN 2 is not limited to the methods described in the above embodiments. That is, it is not limited to the methods using an RRC message (e.g., RRC Connection Request or RRC Connection Setup Complete).

For example, the UE 1 may transmit the information element (e.g., UE assistance IE) indicating a communication architecture type, using an RLC header, a MAC header, or a MAC Control Element (MAC CE) in a layer lower than the RRC (i.e., RLC or MAC). Additionally or alternatively, the UE 1 may transmit information indicating an omission of a PDCP process (e.g., an AS security process) to the RAN 2, using an RLC header, a MAC header, or a MAC CE. More specifically, when the first communication architecture type involves an omission of a PDCP process, the UE 1 may transmit at least one of an information element indicating the first communication architecture type and an information element indicating the omission of the PDCP process, using a MAC CE.

For example, when the UE 1 determines (selects) the first communication architecture type in step 401 in FIG. 4, the UE 1 may omit the PDCP process for the SRB 1 to transmit the RRC Connection Setup Complete message (step 405). Accordingly, the UE 1 transmits at least one of the information element indicating the first communication architecture type and the information element indicating the omission of the PDCP process, using a MAC CE. By using the MAC CE, the RAN 2 can recognize, in its MAC process before its PDCP process, that the PDCP process in the UE 1 has been omitted for the message received from the UE 1 (including the RRC Connection Setup Complete).

Sixteenth Embodiment

Although the above-described embodiments provides examples in which a random access procedure involving transmission of a random access preamble is performed when the UE 1 transitions from RRC-Idle mode (or another suspension mode) to RRC-Connected mode, the present disclosure is not limited to such examples. Other random access procedures may be implemented in the UE 1 and the RAN 2. In some implementations, a UE 1 may transmit a small (or short) message, instead of a random access preamble (i.e., a RACH preamble), on an RACH. In this case, the message transmitted on the RACH may indicate a communication architecture type that is determined (or selected) or supported by the UE 1. It allows the UE 1 to inform the RAN 2 of the communication architecture type determined (or selected) or supported by the UE 1, before establishing an RRC connection. Thus, for example, the RAN 2 can generate an RA response message while considering the communication architecture type received from the UE 1. The RA response message may include a backoff indicator determined based on the communication architecture type received from the UE 1.

Seventeenth Embodiment

RACH resources that are used by the UE 1 when the UE 1 transitions from RRC-Idle mode (or another suspension mode) to RRC-Connected mode may be allocated respectively to a plurality of communication architecture types. In this case, the UE 1 may use a particular RACH resource for the first RACH transmission containing a preamble or a small (short) message to implicitly indicate a communication architecture type determined (or selected) or supported by the UE 1. It allows the UE 1 to inform the RAN 2 of the communication architecture type determined (or selected) or supported by the UE 1, before establishing an RRC connection. Thus, for example, the RAN 2 can generate an RA response message while considering the communication architecture type received from the UE 1. The RA response message may include a backoff indicator determined based on the communication architecture type received from the UE 1.

Eighteenth Embodiment

The above-described embodiments may be applied to either or both of NB-IoT communication and LTE eMTC communication. Further, the above-described embodiments may be applied to LTE communication, LTE-Advanced communication, and other UE communication according to modified versions of these standards.

A configuration example of a radio communication network according to this embodiment is similar to the one shown in FIG. 2. Note that the UE 1 according to this embodiment may be a CIoT device (e.g., NB-IoT or LTE eMTC), or may be a UE conforming to LTE, LTE-Advanced, or modified versions of these standards. This embodiment provides examples of mobility in a case where one of the above-described communication architecture types is applied to the UE 1.

The mobility of the UE 1 includes a cell change in idle mode (e.g., RRC-Idle or another suspension mode) (i.e., idle-mode mobility) and a cell change in connected mode (e.g., RRC-Connected) (i.e., connected-mode mobility). The Idle-mode mobility includes a cell reselection procedure in idle mode. The connected-mode mobility includes backward and forward handover procedures in connected mode (e.g., RRC release with redirection).

The radio communication network according to this embodiment may not be required to support mobility of UEs 1 to which at least one of a plurality of communication architecture types including the first and second communication architecture types is applied. Note that "not supporting mobility" means that the communication architecture type and its configuration that was used for the UE 1 before the cell change are not taken into consideration in determination or selection of a communication architecture type to be applied to the UE 1 after the cell change.

In some implementations, the RAN 2 may disable functions for the mobility in RRC-Connected mode (e.g., handover and redirection) for the UE 1 to which the first (or second) communication architecture type is applied. In other words, the UE 1 may deactivate functions (e.g., measurement report, handover, and redirection) for the mobility in RRC-Connected mode. Additionally or alternatively, the RAN 2 may disable functions for the mobility in RRC-Idle mode (e.g., cell reselection) for the UE 1 to which the second (or first) communication architecture type is applied. In other words, the UE 1 may deactivate functions (e.g., cell reselection and measurement) for the mobility in RRC-Idle mode.

In some implementations, functions for the mobility in RRC-Idle mode and RRC-Connected mode may be activated for the UE 1 to which the first (or second) communication architecture type is applied. In this case, the UE 1 may operate as follows to change a cell in RRC-Idle mode or RRC-Connected mode.

For example, upon performing a cell reselection, the UE 1 may release (or discard) information regarding the communication architecture type that has been configured in (or applied to) the UE 1 in a cell before the cell reselection.

For example, during a handover procedure in RRC-Connected mode (i.e., backward handover), the UE 1 may release (or discard) information about the communication architecture type that has been configured in (or applied to) the UE 1 in response to receiving a handover instruction from the source RAN node (e.g., source eNB or source CIoT BS) located in the RAN 2. The handover instruction may be, for example, an RRC Connection Reconfiguration message including a mobilityControlInfo IE.

For example, during an RRC release with redirection procedure in RRC-Connected mode, the UE 1 may release (or discard) information about the communication architecture type that has been configured in (or applied to) the UE 1 in response to receiving, from the source RAN node (e.g., a source eNB or a source CIoT BS) located in the RAN 2, an RRC Connection Release message for requesting redirection. Alternatively, upon performing a cell reselection in accordance with the RRC Connection Release message for requesting redirection, the UE 1 may release (or discard) information about the communication architecture type that was configured in (or applied to) the UE 1 in a cell before the cell reselection. In this case, the release cause used in the RRC Connection Release message may be set to "other". Alternatively, a new cause (e.g., redirectionForCIoT, redirectionForCellUpdate, redirectionRequired, or cellUpdateRequired) may be defined and used for the release cause.

After the cell change of the UE 1, the UE 1, the RAN 2, and the CN 3 may determine (or select) a communication architecture type to be used for the UE 1 in accordance with any one of the methods described in the above-described embodiments. Alternatively, after the cell change, the UE 1 may perform data transmission according to an existing manner in LTE and LTE-Advanced (i.e., the UE 1 may fall back to a legacy/conventional mechanism).

As described above, in this embodiment, after performing a cell change in idle mode (or a suspension mode) or connected mode, the UE 1 releases (or discards) the communication architecture type configuration that was used before the cell change. It is thus possible to prevent an inconsistency (or mismatch) between the communication architecture type configuration in the UE 1 and that in the network after the cell change.

Nineteenth Embodiment

A configuration example of a radio communication network according to this embodiment is similar to the one shown in FIG. 2. The UE 1 according to this embodiment may be a CIoT device (e.g., NB-IoT or LTE eMTC), or may be a UE conforming to LTE, LTE-Advanced, or modified versions of these standards. This embodiment provides examples of idle-mode mobility in a case where one of the above-described communication architecture types is applied to the UE 1.

The UE 1 according to this embodiment transmits to the RAN 2 or the CN 3, after performing a cell reselection, an information element explicitly or implicitly indicating the communication architecture type that has been configured in (or applied to) the UE 1 since before the cell reselection. Specifically, the UE 1 may transmit the information element when the UE 1 enters RRC-Connected mode for the first time after the cell reselection.

Figure 20:
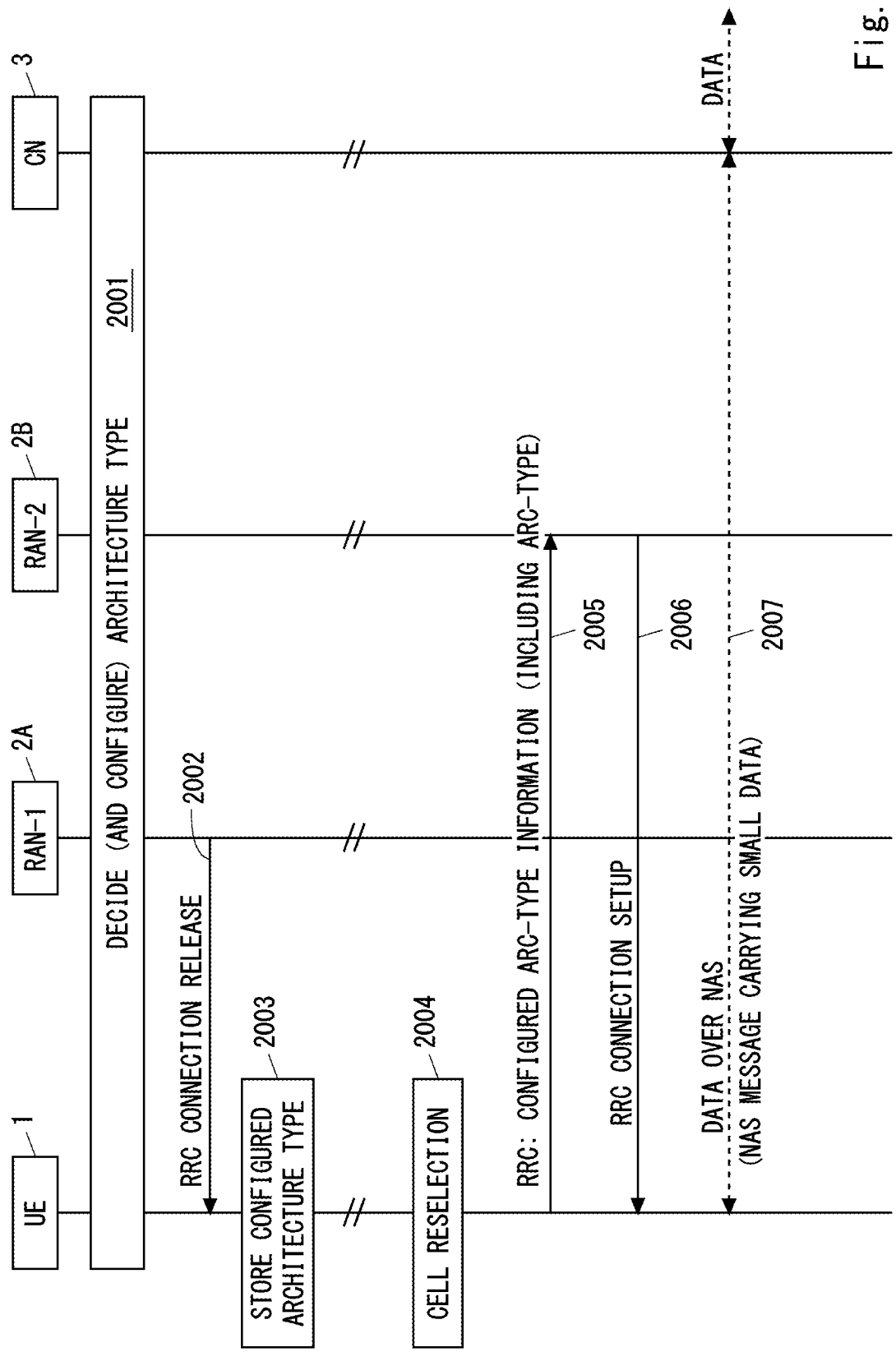
FIG. 20 is a sequence diagram showing an example of a communication procedure according to a nineteenth embodiment.
Figure 21:
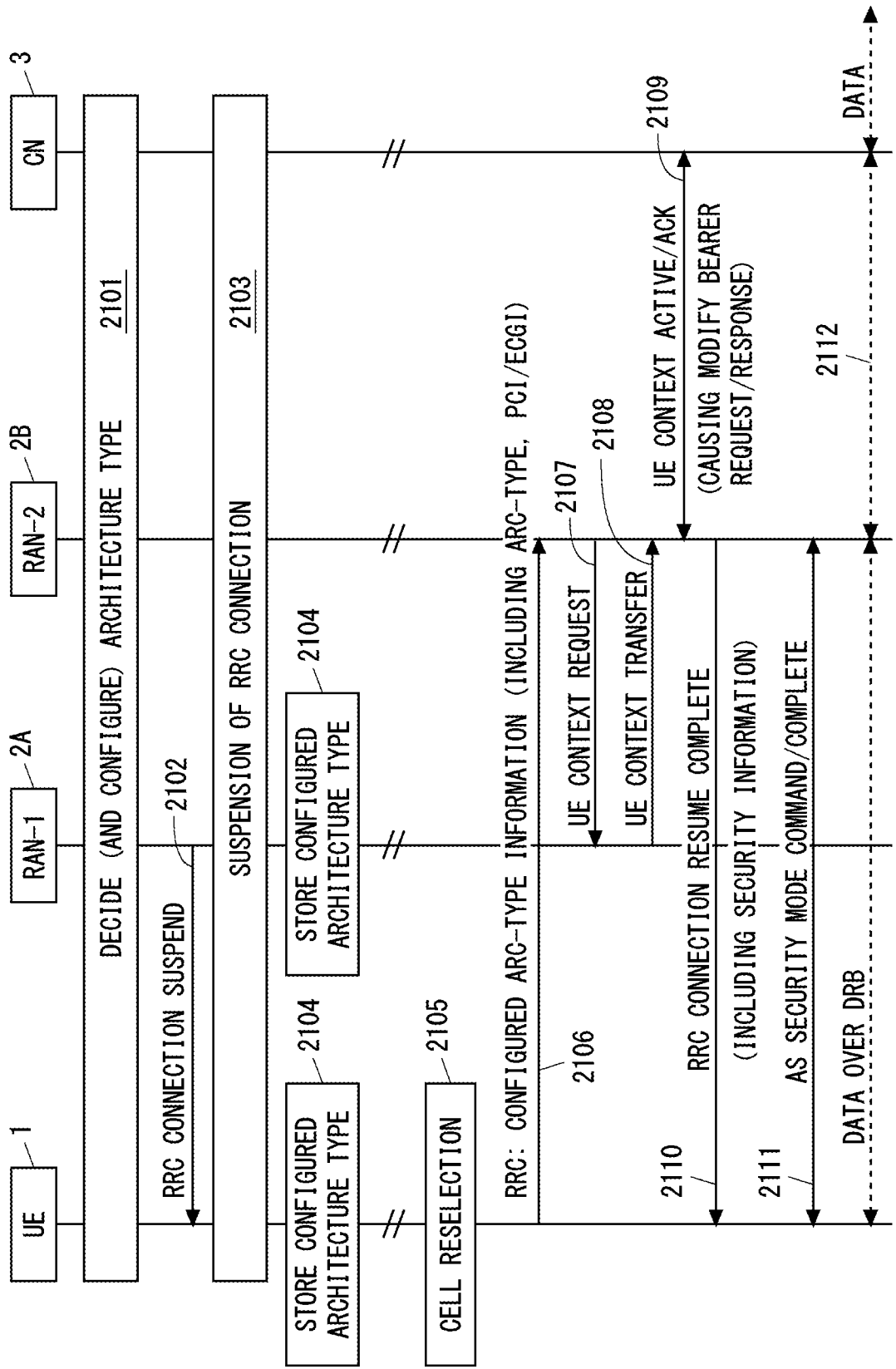
FIG. 21 is a sequence diagram showing an example of a communication procedure according to the nineteenth embodiment.

FIGS. 20 and 21 are sequence diagrams showing examples of communication procedures according to this embodiment. FIG. 20 shows a case where the first communication architecture type is used for the UE 1. Meanwhile, FIG. 21 shows a case where the second communication architecture type is used for the UE 1. In the examples shown in FIGS. 20 and 21, the RAN 2 includes a RAN-1 2A and a RAN-2 2B. The RAN-1 2A corresponds to a RAN node (e.g., CIoT BS or eNB) before the cell change (a cell reselection) and the RAN-2 2B corresponds to a RAN node after the cell change.

Referring to FIG. 20, in step 2001, a communication architecture type used for the UE 1 is determined in accordance with any one of the procedures described in the first to seventeenth embodiments and the UE 1 is configured with the determined communication architecture type. In the example shown in FIG. 20, the UE 1 uses the first communication architecture type. In step 2002, the RAN-1 2A transmits an RRC Connection Release message to the UE 1 on an SRB 1. In step 2003, the UE 1 records (stores) the communication architecture type with which the UE 1 has been configured and transitions to RRC-Idle mode (or another suspension mode). In the example shown in FIG. 20, the UE 1 uses the first communication architecture type.

The UE 1 measures a serving cell and a neighbor cell(s) in RRC-Idle mode (or another suspension mode). In step 2004, the UE 1 performs a cell reselection. In steps 2005 and 2006, the UE 1 and the RAN-2 2B perform an RRC connection establishment procedure so that the UE 1 enters RRC-Connected mode for the first time after the cell reselection. During this procedure, the UE 1 transmits an information element (e.g., Configured arc-type information) explicitly or implicitly indicating the communication architecture type that has been configured in (or applied to) the UE 1 since before the cell reselection to the RAN-2 2B. This information element may be transmitted by, for example, an RRC Connection Request message or an RRC Connection Setup Complete message. In the example shown in FIG. 20, the information element indicates the first communication architecture type. It allows the RAN-2 2B to recognize the communication architecture type that has been configured in (or applied to) the UE 1 since before the cell reselection and hence the RAN-2 can perform operations corresponding to the communication architecture type with which the UE 1 has been configured.

In step 2007, the UE 1 performs either or both of UL data transmission and DL data reception using a NAS message. Similarly to the ninth and tenth embodiments, the UE 1 may transmit a NAS message containing UL data on an SRB 1 using an RRC Setup Complete message or an RRC: UL Information Transfer message. The UE 1 may receive a NAS message containing DL data on the SRB 1 using an RRC: DL Information Transfer message.

The procedure shown in FIG. 20 may be modified as follows. For example, the RAN-2 2B may communicate with the CN 3 to authenticate or approve the UE 1.

The UE 1 may use a NAS message to transmit to the CN 3 the information element (e.g., Configured arc-type information) explicitly or implicitly indicating the communication architecture type that has been configured in (or applied to) the UE 1 since before the cell reselection. In this case, the CN 3 may send, to the RAN-2 2B, an information element indicating the communication architecture type that has been configured in (or applied to) the UE 1.

Instead of transmitting the information element indicating the communication architecture type configured in (or applied to) the UE 1, the UE 1 may transmit, to the RAN-2 2B, an information element indicating a resumption of the already-configured communication architecture type and an information element indicating a cell or RAN node before the cell reselection (e.g., a Physical Cell ID (PCI), a Carrier frequency (EARFCN), or an E-UTRAN Cell Global ID (ECGI)). In this case, the RAN-2 2B may ask a RAN node that manages the cell before the cell reselection about the communication architecture type that has been configured in (or applied to) the UE 1.

The UE 1 may transmit to the CN 3 the information element indicating a resumption of the already-configured communication architecture type. In this case, the CN 3 may send, to the RAN-2 2B, an information element indicating the communication architecture type that has been configured in (or applied to) the UE 1.

Next, referring to FIG. 21, in step 2101, a communication architecture type used for the UE 1 is determined in accordance with any one of the procedures described in the first to seventeenth embodiments and the UE 1 is configured with the determined communication architecture type. In the example shown in FIG. 21, the UE 1 uses the second communication architecture type. In step 2102, the RAN-1 2A transmits an RRC message (e.g., an RRC Connection Suspend message) to suspend the RRC connection to the UE 1. Upon receiving the RRC message, the UE 1 transitions from RRC-Connected mode to RRC-Idle mode (or another suspension mode) and retains information about the RRC connection while it is in RRC-Idle mode (or another suspension mode) (Step 2103). Similarly, the RAN-1 2A and the CN 3 retain contexts related to the UE 1 necessary for a suspension of the RRC connection (step 2103). The UE 1 and the RAN-1 2A further stores the communication architecture type with which the UE 1 has been configured (i.e., the second communication architecture type in this example) (step 2104).

Steps 2105 and 2106 are similar to steps 2004 and 2005 in FIG. 20. However, in the RRC message transmitted in step 2106, the information element (e.g., the Configured arc-type information), which explicitly or implicitly indicates the communication architecture type that has been configured in (or applied to) the UE 1, indicates the second communication architecture type. Further, the RRC message transmitted in step 2106 includes an information element (e.g., a PCI or an ECGI) indicating a cell or a RAN node before the cell reselection.

In step 2107, upon receiving the RRC message in step 2106, the RAN-2 2B requests a UE context from the RAN-1 2A before the cell reselection. In step 2098, the RAN-1 2A sends the UE context retained in the RAN-1 2A to the RAN-2 2B. In step 2109, the RAN-2 2B communicates with the CN 3 to resume the suspended RRC connection. Specifically, the RAN-2 2B may send an S1-AP: UE Context Active message to the CN 3 and receive an S1-AP: UE Context Active Ack message from the CN 3. The S1-AP: UE Context Active message triggers a procedure for modifying an S1 bearer in the CN 3. This procedure includes, for example, transmission of a Modify Bearer Request message from an MME (or a C-SSN) to an S-GW and transmission of a Modify Bearer Response message from the S-GW to the MME (or the C-SSN).

In step 2110, the RAN-2 2B transmits an RRC message indicating the completion of the resumption of the RRC connection (e.g., an RRC Connection Resume Complete message) to the UE 1. This RRC message includes AS security information. In step 2111, the UE 1 and the RAN-2 2B establish AS security. In step 2112, the UE 1 transmits UL data through the RAN-2 2B on a UL bearer and receives DL data through the RAN-2 2B on a DL bearer.

As described above, in this embodiment, after performing a cell reselection, the UE 1 transmits to the RAN-2 2B or the CN 3 an information element (e.g., Configured arc-type information) explicitly or implicitly indicating the communication architecture type that has been configured in (or applied to) the UE 1 since before the cell reselection. It is thus possible to prevent an inconsistency (or mismatch) between the communication architecture type configuration in the UE 1 and that in the network after the cell change.

Twentieth Embodiment

A configuration example of a radio communication network according to this embodiment is similar to the one shown in FIG. 2. The UE 1 according to this embodiment may be a CIoT device (e.g., NB-IoT or LTE eMTC), or may be a UE conforming to LTE, LTE-Advanced, or modified versions of these standards. This embodiment provides examples of connected-mode mobility in a case where one of the above-described communication architecture types is applied to the UE 1.

In this embodiment, when performing a handover of the UE 1, a source RAN node (e.g., CIoT BS or eNB) transmits a Handover Request including an information element explicitly or implicitly indicating a communication architecture type that has been configured in the UE 1 (i.e., used for the UE 1) to a target RAN node (e.g., CIoT BS or eNB).

Figure 22:
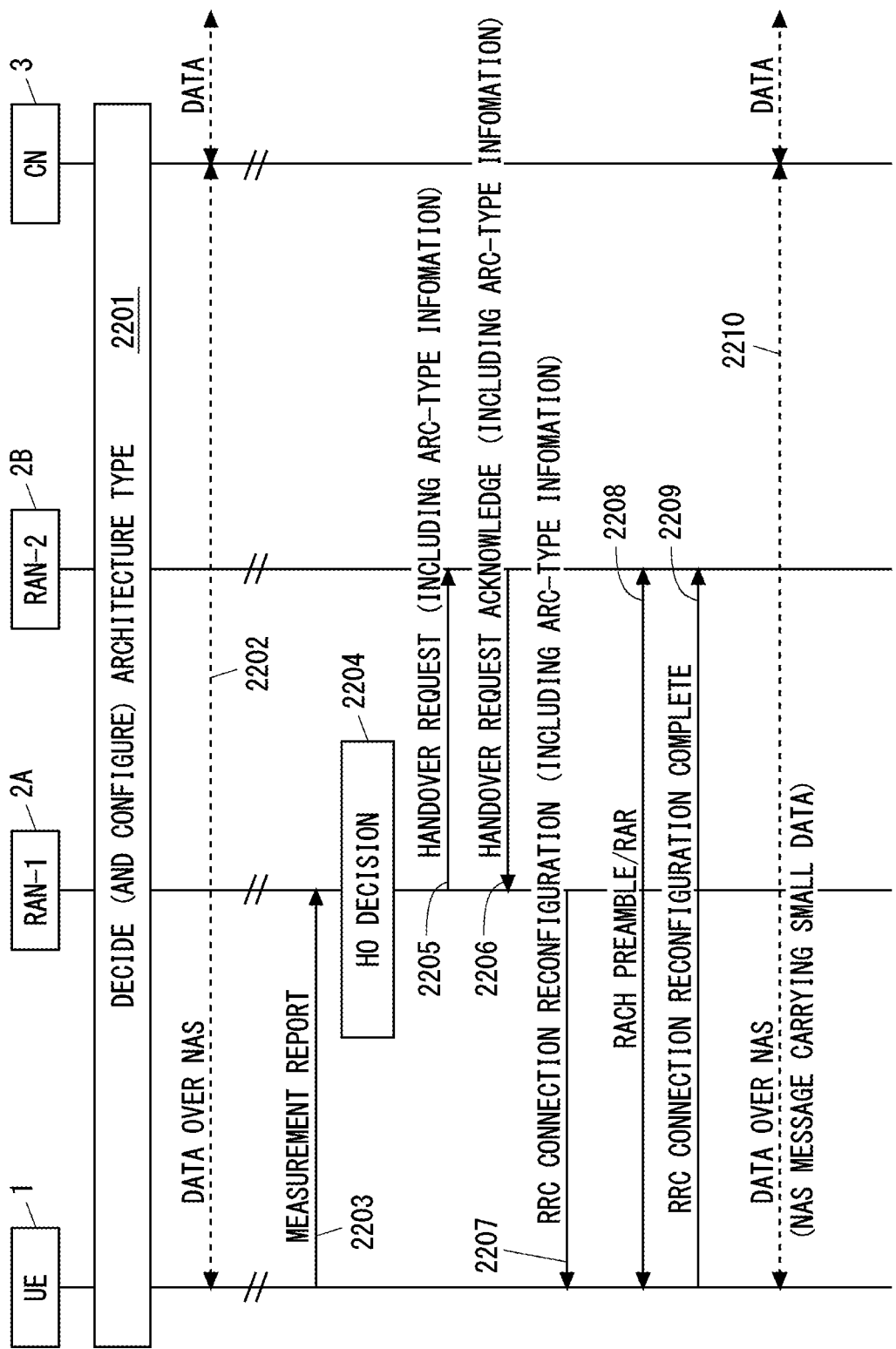
FIG. 22 is a sequence diagram showing an example of a communication procedure according to a twentieth embodiment.
Figure 23:
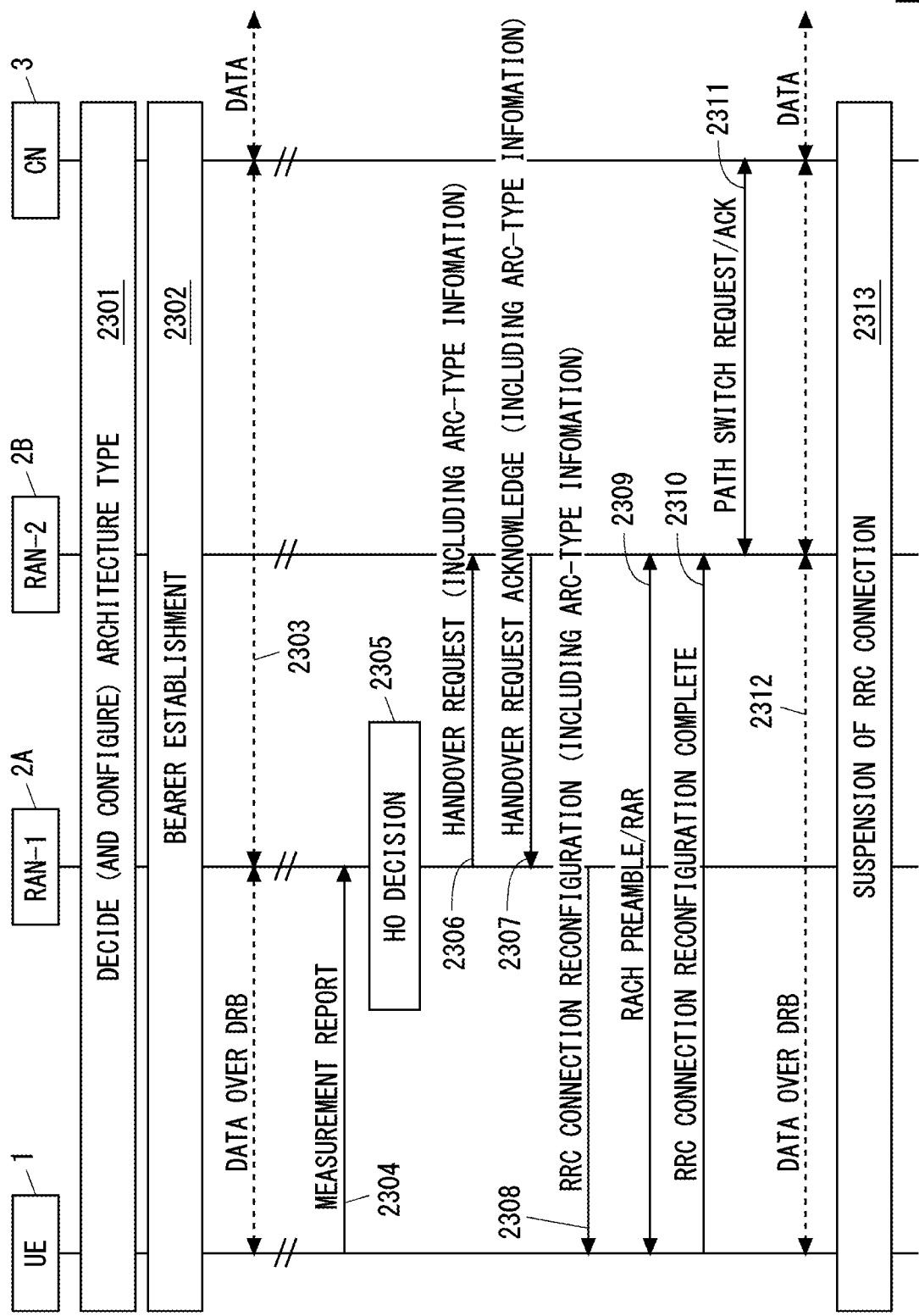
FIG. 23 is a sequence diagram showing an example of a communication procedure according to the twentieth embodiment.

FIGS. 22 and 23 are sequence diagrams showing examples of communication procedures according to this embodiment. FIG. 22 shows a case where the first communication architecture type is used for the UE 1. Meanwhile, FIG. 23 shows a case where the second communication architecture type is used for the UE 1. In the examples shown in FIGS. 22 and 23, the RAN 2 includes a RAN-1 2A and a RAN-2 2B. The RAN-1 2A corresponds to the source RAN node (e.g., CIoT BS or eNB) and the RAN-2 2B corresponds to the target RAN node.

Referring to FIG. 22, in step 2201, a communication architecture type used for the UE 1 is determined in accordance with any one of the procedures described in the first to seventeenth embodiments and the UE 1 is configured with the determined communication architecture type. In the example shown in FIG. 22, the UE 1 uses the first communication architecture type. In step 2202, the UE 1 is in RRC-Connected mode. Accordingly, in step 2202, the UE 1 may perform either or both of UL data transmission and DL data reception using a NAS message.

In step 2203, the UE 1 transmits a measurement report indicating a measurement result of the serving cell and a neighbor cell(s) to the source RAN-1 2A. In step 2004, the source RAN-1 2A determines a handover of the UE 1 to the target RAN-2 2B. In step 2005, the source RAN-1 2A sends a handover request to the target RAN-2 2B. This handover request includes an information element (e.g., arc-type information) indicating a communication architecture type used for the UE 1 in the source RAN-1 2A (i.e., the first communication architecture type in this example).

In step 2206, upon receiving the handover request, the target RAN-2 2B sends a response message to the handover request (e.g., a Handover Request Acknowledge message) to the source RAN-1 2A. In some implementations, this response message indicates whether the target RAN-2 2B supports the communication architecture type that it has been notified of from the source RAN-1 2A. Alternatively, the response message explicitly or implicitly indicates a (changed) communication architecture type to be used for the UE 1 in the target RAN-2 2B.

In step 2207, the source RAN-1 2A transmits to the UE 1 a handover instruction including an information element (e.g., arc-type information) indicating that the current communication architecture type is continuously used after the handover or indicating the (changed) communication architecture type to be applied to the UE 1 after the handover. The handover instruction may be, for example, a RRC Connection Reconfiguration message including a MobilityControlInfo IE. In the example shown in FIG. 22, the first communication architecture type is used for the UE 1 also in the target RAN-2 2B.

In step 2208, the UE 1 performs a random access procedure in order to synchronize to the target cell (i.e., the target RAN-2 2B). In step 2209, the UE 1 transmits an RRC Connection Reconfiguration Complete message including a handover confirmation (e.g., Handover Confirm) to the target RAN-2 2B. In step 2210, the UE 1 performs either or both of UL transmission and DL reception in accordance with the communication architecture type indicated from the source RAN-1 2A in step 2207. In the example shown in FIG. 22, the first communication architecture type is used for the UE 1 also in the target RAN-2 2B. Accordingly, in step 2210, the UE 1 may perform either or both of UL data transmission and DL data reception using a NAS message.

The procedure shown in FIG. 22 may be modified as follows. In step 2205, the handover request may indicate that the UE 1 has been authorized to use the first communication architecture type.

Next, Referring to FIG. 23, in step 2301, a communication architecture type used for the UE 1 is determined in accordance with any one of the procedures described in the first to seventeenth embodiments and the UE 1 is configured with the determined communication architecture type. In the example shown in FIG. 23, the UE 1 uses the second communication architecture type. In step 2302, a bearer establishment procedure for the UE 1 is performed. In step 2303, the UE 1 transmits UL data through the RAN-1 2A on a UL bearer and receives DL data through the RAN-1 2A on a DL bearer.

Steps 2304 to 2310 are similar to steps 2203-2209 in FIG. 22. However, in the example shown in FIG. 23, the target RAN-2 2B uses the second communication architecture type for the UE 1. In step 2311, the target RAN-2 2B communicates with the CN 3 to change a route of the S1 bearer(s) for the UE 1 as in the case of an ordinary handover procedure. For example, the target RAN-2 2B sends an S1AP: Path Switch Request message to the CN 3 and receives an S1AP: Path Switch Request Ack message from the CN 3.

In step 2312, the UE 1 transmits UL data through the target RAN-2 2B on a UL bearer and receives DL data through the target RAN-2 2B on a DL bearer.

In step 2313, the UE 1, the target RAN-2 2B, and the CN 3 suspends the RRC connection.

The procedures in FIGS. 22 and 23 may be combined as appropriate. That is, as already described, the target RAN-2 2B may apply to the UE 1 a communication architecture type different from the one that was applied to the UE 1 in the source RAN-1 2A. Accordingly, in FIG. 22, when the handover response message (step 2206) indicates that the second communication architecture type is to be used for the UE 1 in the target RAN-2 2B, steps 2311 to 2313 shown in FIG. 23 may be performed instead of performing step 2210. The same is true for the reversed case.

As described above, in this embodiment, the source RAN-1 2A transmits, to the target RAN-2 2B, a Handover Request including an information element indicating a communication architecture type that has been configured in the UE 1 (i.e., used for the UE 1). It is thus possible to prevent an inconsistency (or mismatch) between the communication architecture type configuration in the UE 1 and that in the target RAN-2 2B.

Further, in this embodiment, the target RAN-2 2B sends to the source RAN-1 2A a handover response message including an information element indicating whether the target RAN-2 2B supports the communication architecture type that it has been notified of from the source RAN-1 2A or indicating a (changed) communication architecture type to be used for the UE 1 in the target RAN-2 2B. Further, the source RAN-1 2A transmits to the UE 1 a handover instruction including an information element indicating the communication architecture type to be used for the UE 1 in the target RAN-2 2B. It allows the target RAN-2 2B to use, for the UE 1, a communication architecture type different from the one that was used in the source RAN-1 2A.

Twenty-First Embodiment

A configuration example of a radio communication network according to this embodiment is similar to the one shown in FIG. 2. The UE 1 according to this embodiment may be a CIoT device (e.g., NB-IoT or LTE eMTC), or may be a UE conforming to LTE, LTE-Advanced, or modified versions of these standards. This embodiment provides examples of connected-mode mobility in a case where one of the above-described communication architecture types is applied to the UE 1.

In this embodiment, during a forward handover procedure in connected mode, the UE 1 transmits to the target RAN-2 2B an information element explicitly or implicitly indicating a communication architecture type that has been configured in (or applied to) the UE 1 in the source RAN-1 2A. Specifically, the UE 1 may transmit this information element using an RRC Connection Re-establishment message toward the target RAN-2 2B. The forward handover procedure may be started as the RAN-1 2A transmits an "RRC release with redirection" message to the UE 1. Alternatively, the forward handover procedure may be voluntarily started by the UE 1 in response to expiration of a Radio Link Failure (RLF) timer.

Figure 24:
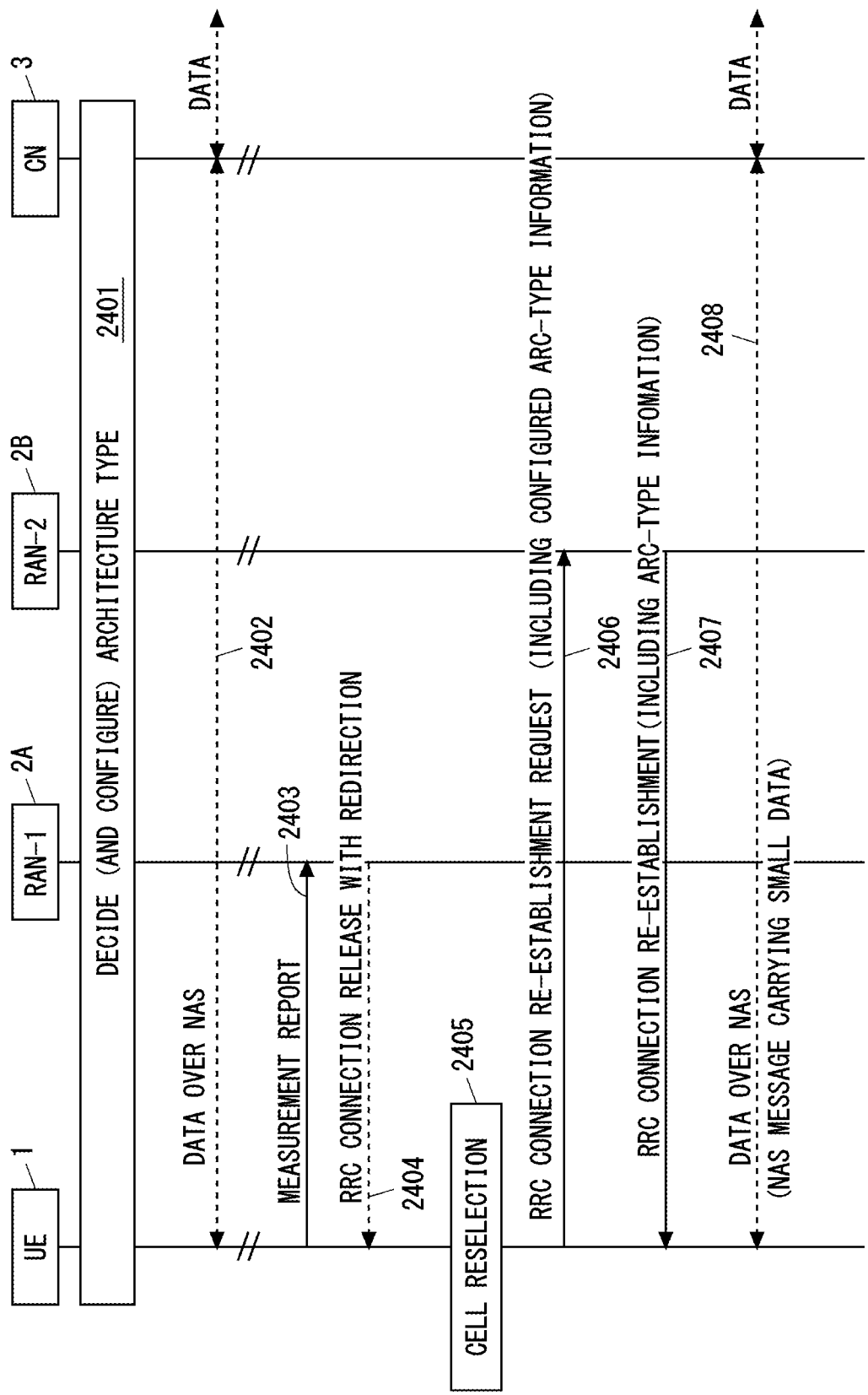
FIG. 24 is a sequence diagram showing an example of a communication procedure according to a twenty-first embodiment.
Figure 25A:
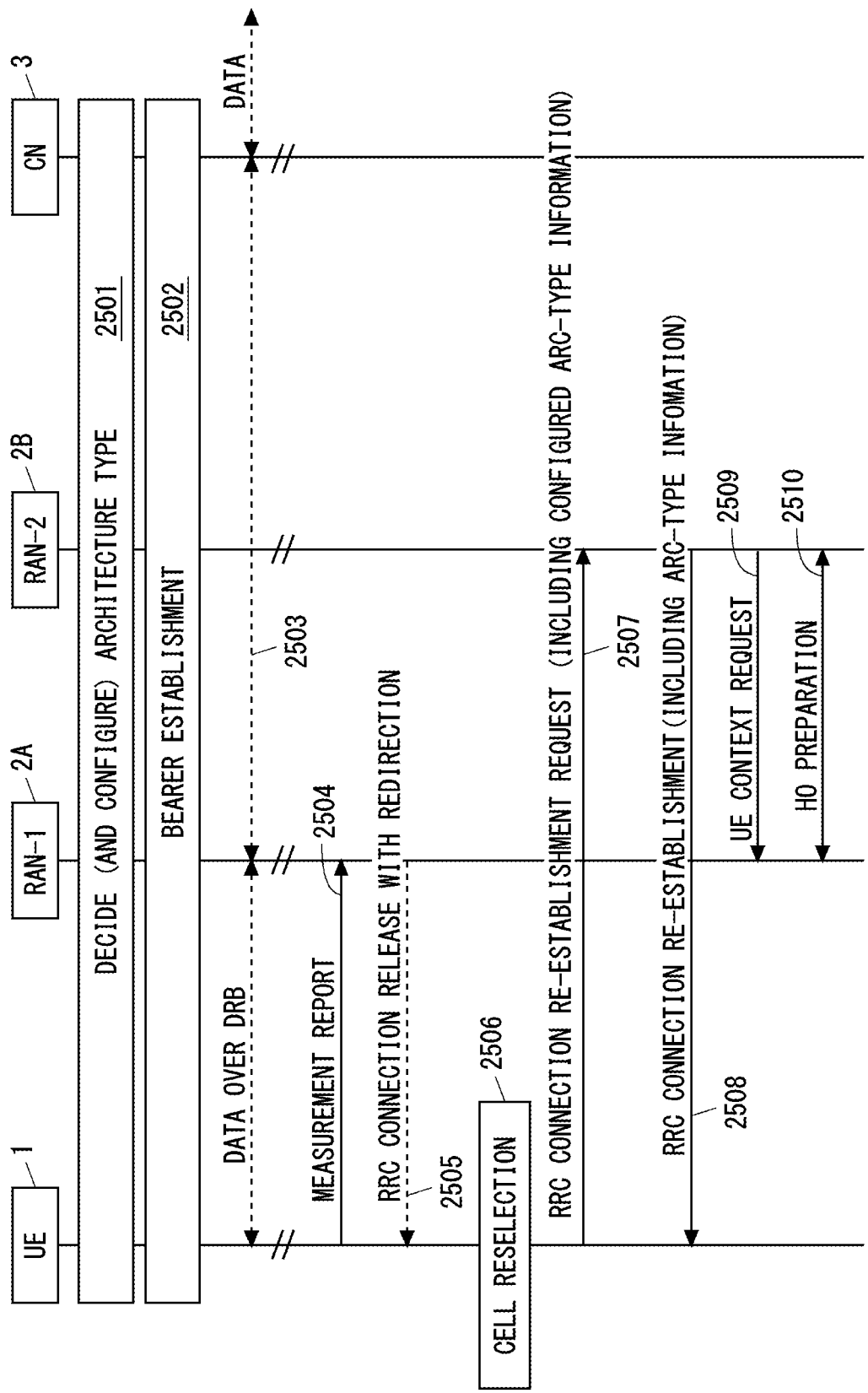
FIG. 25A is a sequence diagram showing an example of a communication procedure according to the twenty-first embodiment.
Figure 25B:
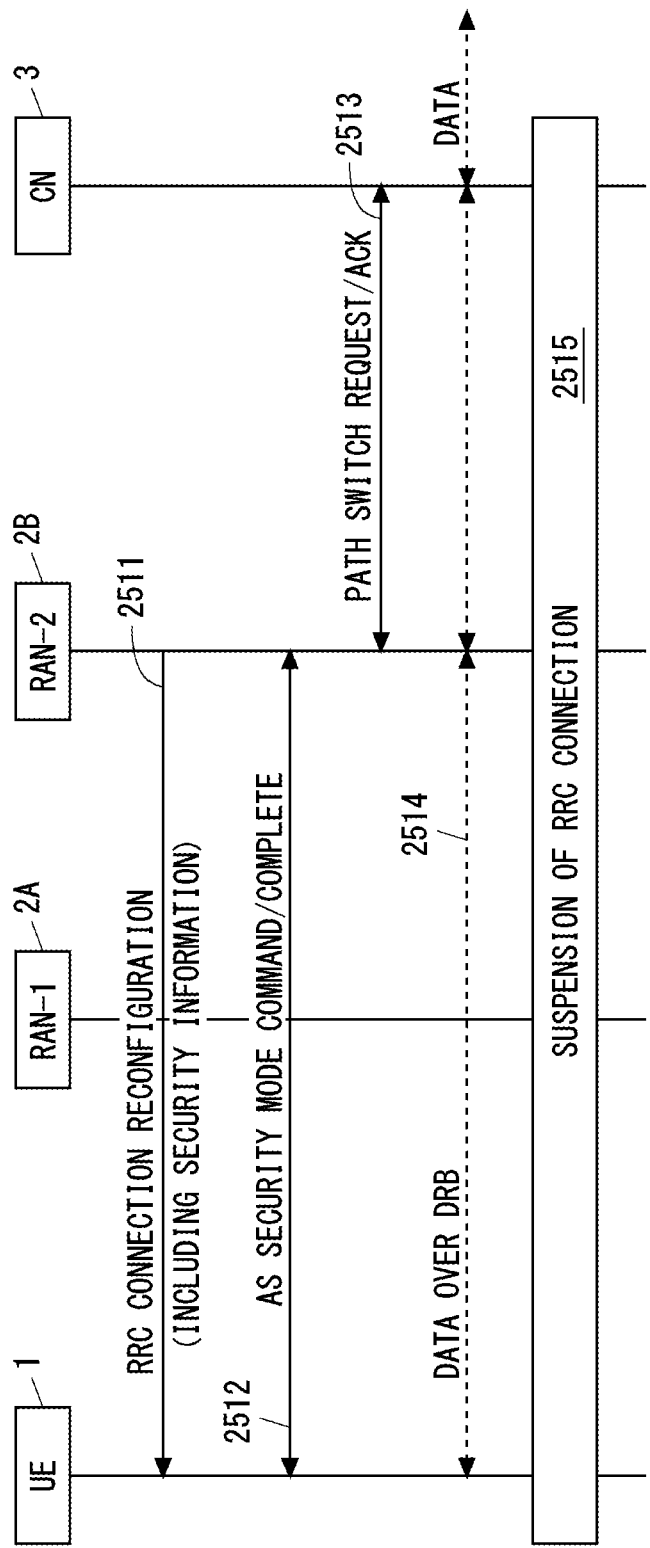
FIG. 25B is a sequence diagram showing an example of a communication procedure according to the twenty-first embodiment.

FIGS. 24, 25A and 25B are sequence diagrams showing examples of communication procedures according to this embodiment. FIG. 24 shows a case where the first communication architecture type is used for the UE 1. Meanwhile, FIGS. 25A and 25B show a case where the second communication architecture type is used for the UE 1. In the examples shown in FIGS. 24, 25A and 25B, the RAN 2 includes a RAN-1 2A and a RAN-2 2B. The RAN-1 2A corresponds to the source RAN node (e.g., CIoT BS or eNB) and the RAN-2 2B corresponds to the target RAN node.

Referring to FIG. 24, steps 2401 to 2403 are similar to steps 2201 to 2203 in FIG. 22. In step 2404, the source RAN-1 2A transmits to the UE 1 an RRC release message indicating a redirection to the target RAN-2 2B. Upon receiving the RRC release message, the UE 1 performs a cell reselection (step 2405). Note that step 2404 does not necessarily have to be performed. Specifically, the UE 1 may voluntarily perform a cell (re)selection (step 2405) in response to expiration of the RLF timer.

In step 2406, the UE 1 transmits an RRC connection re-establishment request message to the target RAN-2 2B. This RRC connection re-establishment request message includes an information element about a communication architecture type (e.g., Configured arc-type information) which explicitly or implicitly indicates the communication architecture type that has been configured in (or applied to) the UE 1 in the source RAN-1 2A.

In step 2407, the target RAN-2 2B transmits an RRC Connection Re-establishment message to the UE 1. This message may include an information element about a communication architecture type (e.g., arc-type information) which indicates that the current communication architecture type is continuously used, or indicates explicitly or implicitly a (changed) communication architecture type applied to the UE 1 in the target RAN-2 2B.

In the example shown in FIG. 24, the target RAN-2 2B uses the first communication architecture type for the UE 1. Thus, step 2408 is similar to step 2210 in FIG. 22.

Next, Referring to FIGS. 25A and 25B, steps 2501 to 2504 are similar to steps 2301 to 2304 in FIG. 23.

Steps 2505 to 2508 are similar to steps 2404 to 2407 in FIG. 24. In the example shown in FIGS. 25A and 25B, the target RAN-2 2B uses the second communication architecture type for the UE 1. Thus, steps 2509 to 2514 are similar to steps 2107 to 2112 in FIG. 21.

Step 2515 is similar to step 2313 in FIG. 23.

The procedure shown in FIGS. 25A and 25B may be modified as follows. The RRC connection release message in step 2505 may indicate a Resume ID. The Resume ID is an identifier that the RAN 2 assigns to the UE 1 for an RRC suspension. The RAN 2 uses the Resume ID to associate the UE 1 with the previously stored UE context. In some implementations, the source RAN-1 2A may determine the Resume ID and transmit it to the UE 1 and the target RAN-2 2B. Alternatively, the target RAN-2 2B may determine the Resume ID and transmit it to the UE 1 through the source RAN-1 2A.

As described above, in this embodiment, after performing a cell reselection related to a forward handover, the UE 1 transmits to the target RAN-2 2B an information element indicating a communication architecture type that has been configured in (or applied to) the UE 1 in the source RAN-1 2A (e.g., Configured arc-type information). It is thus possible to prevent an inconsistency (or mismatch) between the communication architecture type configuration in the UE 1 and that in the target RAN-2 2B.

Twenty-second Embodiment

The 3GPP is starting to work on the standardization for 5G, i.e., 3GPP Release 14, in 2016 to make 5G a commercial reality in 2020. 5G is expected to be realized by continuous enhancement/evolution of LTE and LTE-Advanced and an innovative development by an introduction of a new 5G air-interface (i.e., a new Radio Access Technology (RAT)). The new RAT (i.e., New 5G RAT) supports, for example, frequency bands higher than the frequency bands (e.g., 6 GHz or lower) supported by the LTE/LTE-Advanced and its enhancement/evolution. For example, the new RAT supports centimeter-wave bands (10 GHz or higher) and millimeter-wave bands (30 GHz or higher).

Higher frequency can provide higher-rate communication. However, because of its frequency properties, coverage of the higher frequency is more local. Therefore, high frequencies are used to boost capacity and data rates in specific areas, while wide-area coverage is provided by lower current frequencies. That is, in order to ensure the stability of New 5G RAT communication in high frequency bands, tight integration or interworking between low and high frequencies (i.e., tight integration or interworking between LTE/LTE-Advanced and New 5G RAT) is required. A 5G supporting radio terminal (i.e., 5G User Equipment (UE)) is connected to both of a low frequency band cell and a high frequency band cell (i.e., a LTE/LTE-Advanced cell and a new 5G cell) by using Carrier Aggregation (CA) or Dual Connectivity (DC), or a modified technique thereof.

The term "LTE" used in this specification includes enhancements of LTE and LTE-Advanced for 5G to provide tight interworking with the New 5G RAT, unless otherwise indicated. Such enhancements of LTE and LTE-Advanced are also referred to as LTE-Advanced Pro, LTE+, or enhanced LTE (eLTE). Further, the term "5G" or "New 5G" in this specification is used, for the sake of convenience, to indicate an air-interface (RAT) that is newly introduced for the fifth generation (5G) mobile communication systems, and nodes, cells, protocol layers, etc. related to this air-interface. The names of the newly introduced air interface (RAT), and nodes, cells, and protocol layers related thereto will be determined in the future as the standardization work progresses. For example, the LTE RAT may be referred to as Primary RAT (P-RAT or pRAT) or Master RAT. Meanwhile, the New 5G RAT may be referred to as Secondary RAT (S-RAT or sRAT).

The first to twenty-first embodiments described above may be applied to a 5G radio communication network that provides tight interworking between the LTE RAT and the New 5G RAT. In some implementations, the UE 1, the RAN 2, and the CN 3 may perform any one of the attach procedures described in the first to eighth embodiments in the LTE RAT and then perform data transmission in the New 5G RAT according to a communication architecture type determined (or selected) in the attach procedure.

For example, when the first communication architecture type is used for the UE 1, the UE 1 may transmit data using a UL Information Transfer message in the 5G cell, instead of using an RRC Connection Setup Complete message in the LTE cell, and receive data using a DL Information Transfer message in the 5G cell. For example, when the second communication architecture type is used for the UE 1, the UE 1, the RAN 2, and the CN 3 may perform suspension and resumption of an RRC connection in the 5G cell. In this process, the UE 1 and the RAN 2 may be connected to both a core network node for communication in the LTE cell and a core network node different from that for the communication in the LTE cell.

Figure 26:
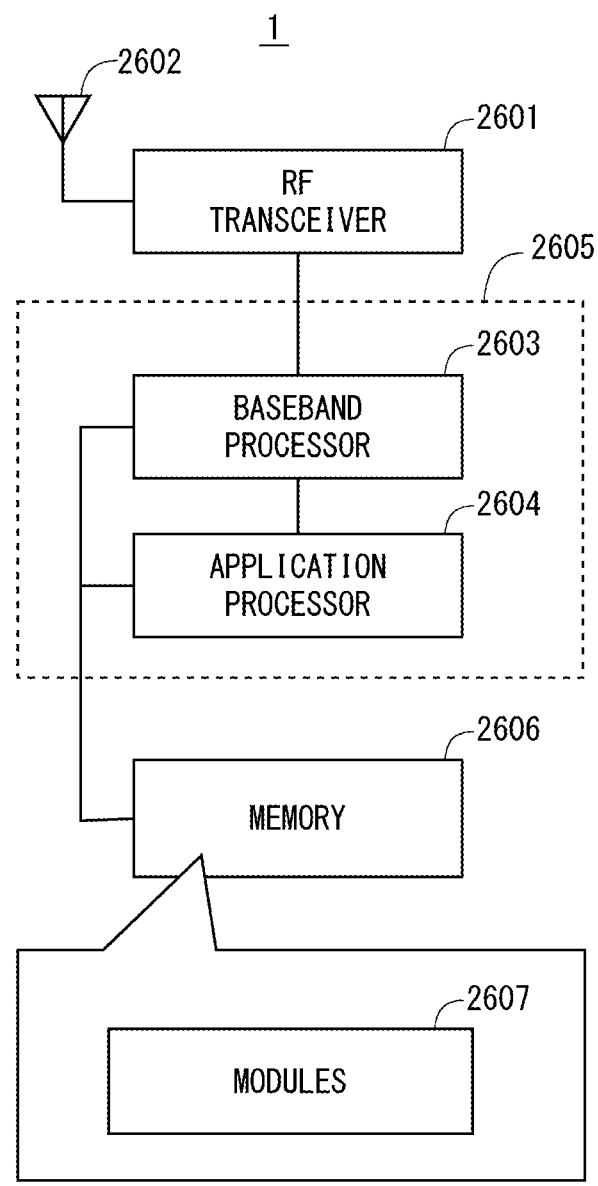
FIG. 26 is a block diagram showing a configuration example of a radio terminal according to some embodiments.

Lastly, configuration examples of the UE 1, a node in the RAN 2 (e.g., CIoT BS and eNB) and a node in the CN 3 (e.g., C-SGN and MME) according to the above-described embodiments will be described. FIG. 26 is a block diagram showing a configuration example of the UE 1. A Radio Frequency (RF) transceiver 2601 performs an analog RF signal processing to communicate with the RAN 2. The analog RF signal processing performed by the RF transceiver 2601 includes frequency up-conversion, frequency down-conversion, and amplification. The RF transceiver 2601 is coupled to an antenna 2602 and a baseband processor 2603. That is, the RF transceiver 2601 receives modulated symbol data (or OFDM symbol data) from the baseband processor 2603, generates a transmission RF signal, and supplies the generated transmission RF signal to the antenna 2602. Further, the RF transceiver 2601 generates a baseband reception signal based on a reception RF signal received by the antenna 2602 and supplies the generated baseband reception signal to the baseband processor 2603.

The baseband processor 2603 performs digital baseband signal processing (i.e., data-plane processing) and control-plane processing for radio communication. The digital baseband signal processing includes (a) data compression/de-compression, (b) data segmentation/concatenation, (c) composition/decomposition of a transmission format (i.e., transmission frame), (d) channel coding/decoding, (e) modulation (i.e., symbol mapping)/demodulation, and (f) generation of OFDM symbol data (i.e., baseband OFDM signal) by Inverse Fast Fourier Transform (IFFT). On the other hand, the control-plane processing includes communication management of layer 1 (e.g., transmission power control), layer 2 (e.g., radio resource management and hybrid automatic repeat request (HARQ) processing), and layer 3 (e.g., signaling regarding attach, mobility, and call management).

In the case of LTE or LTE-Advanced, for example, the digital baseband signal processing performed by the baseband processor 2603 may include signal processing of the Packet Data Convergence Protocol (PDCP) layer, Radio Link Control (RLC) layer, Medium Access Control (MAC) layer, and Physical (PHY) layer. Further, the control-plane processing performed by the baseband processor 2603 may include processing of Non-Access Stratum (NAS) protocol, RRC protocol, and MAC Control Element (MAC CE).

The baseband processor 2603 may include a modem processor (e.g., Digital Signal Processor (DSP)) that performs the digital baseband signal processing and a protocol stack processor (e.g., Central Processing Unit (CPU) or a Micro Processing Unit (MPU)) that performs the control-plane processing. In this case, the protocol stack processor, which performs the control-plane processing, may be integrated with an application processor 2604 described in the following.

The application processor 2604 may also be referred to as a CPU, an MPU, a microprocessor, or a processor core. The application processor 2604 may include a plurality of processors (processor cores). The application processor 2604 loads a system software program (Operating System (OS)) and various application programs (e.g., voice call application, WEB browser, mailer, camera operation application, and music player application) from a memory 2606 or from another memory (not shown) and executes these programs, thereby providing various functions of the UE 1.

In some implementations, as represented by a dashed line (2605) in FIG. 26, the baseband processor 2603 and the application processor 2604 may be integrated on a single chip. In other words, the baseband processor 2603 and the application processor 2604 may be implemented in a single System on Chip (SoC) device 2605. An SoC device may be referred to as a system Large Scale Integration (LSI) or a chipset.

The memory 2606 is a volatile memory, a nonvolatile memory, or a combination thereof. The memory 2606 may include a plurality of memory devices that are physically independent from each other. The volatile memory is, for example, a Static Random Access Memory (SRAM), a Dynamic RAM (DRAM), or a combination thereof. The non-volatile memory is, for example, a mask Read Only Memory (MROM), an Electrically Erasable Programmable ROM (EEPROM), a flash memory, a hard disc drive, or any combination thereof. The memory 2606 may include, for example, an external memory device that can be accessed by the baseband processor 2603, the application processor 2604, and the SoC 2605. The memory 2606 may include an internal memory device that is integrated in the baseband processor 2603, the application processor 2604, or the SoC 2605. Further, the memory 2606 may include a memory in a Universal Integrated Circuit Card (UICC).

The memory 2606 may store one or more software modules (computer programs) 2607 including instructions and data to perform processing by the UE 1 described in the above embodiments. In some implementations, the baseband processor 2603 or the application processor 2604 may load the one or more software modules 2607 from the memory 2606 and execute the loaded software modules, thereby performing the processing of the UE 1 described in the above embodiments.

Figure 27:
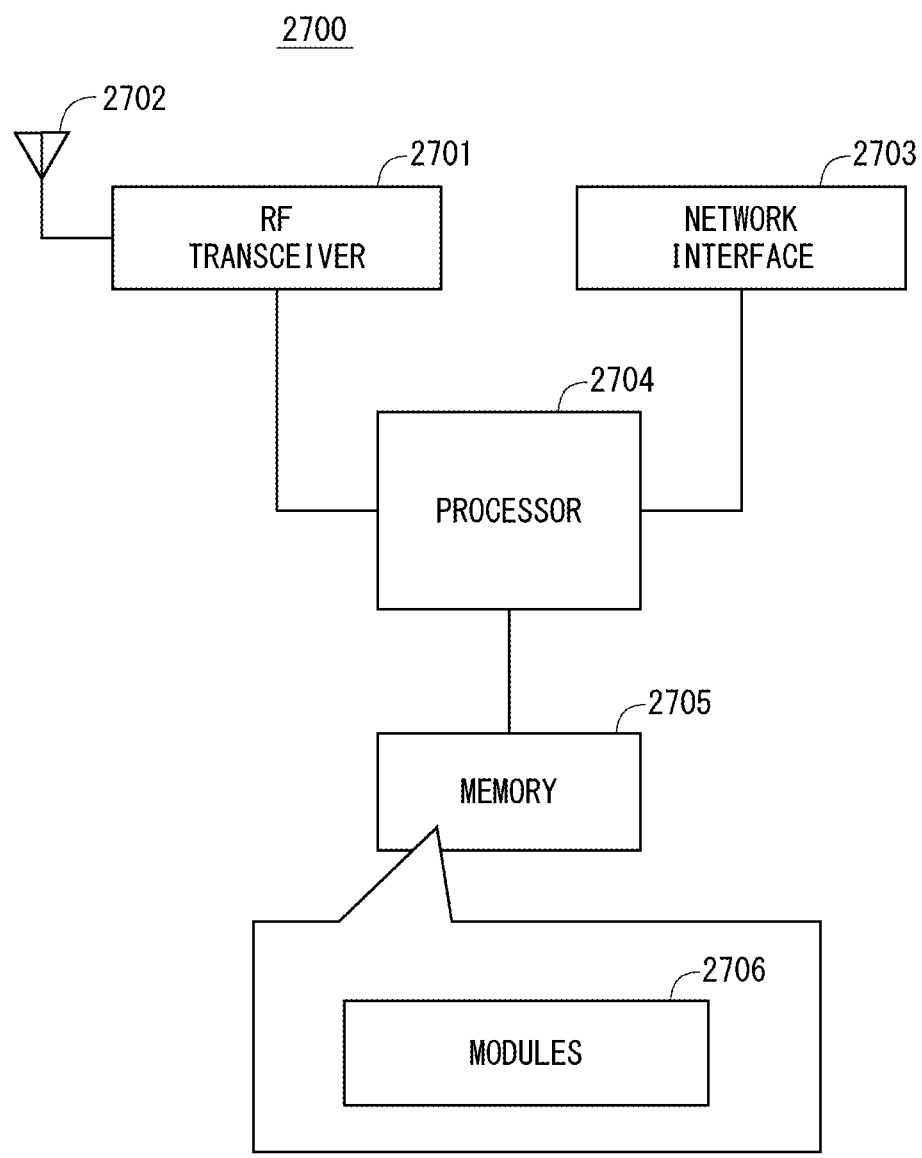
FIG. 27 is a block diagram showing a configuration example of a base station according to some embodiments.

FIG. 27 is a block diagram showing a configuration example of a node in the RAN 2 (e.g., CIoT BS or eNB) according to the above-described embodiments. As shown in FIG. 27, the node includes an RF transceiver 2701, a network interface 2703, a processor 2704, and a memory 2705. The RF transceiver 2701 performs analog RF signal processing to communicate with the radio terminal 1. The RF transceiver 2701 may include a plurality of transceivers. The RF transceiver 2701 is connected to an antenna 2702 and the processor 2704. The RF transceiver 2701 receives modulated symbol data (or OFDM symbol data) from the processor 2704, generates a transmission RF signal, and supplies the generated transmission RF signal to the antenna 2702. Further, the RF transceiver 2701 generates a baseband reception signal based on a reception RF signal received by the antenna 2702 and supplies this signal to the processor 2704.

The network interface 2703 is used to communicate with network nodes (e.g., MME, C-SGN, and S-GW). The network interface 2703 may include, for example, a network interface card (NIC) conforming to the IEEE 802.3 series.

The processor 2704 performs digital baseband signal processing (i.e., data-plane processing) and control-plane processing for radio communication. In the case of LTE or LTE-Advanced, for example, the digital baseband signal processing performed by the processor 2704 may include signal processing of the PDCP layer, RLC layer, MAC layer, and PHY layer. Further, the control-plane processing performed by the processor 2704 may include processing of S1 protocol, RRC protocol, and MAC CEs.

The processor 2704 may include a plurality of processors. The processor 2704 may include, for example, a modem processor (e.g., DSP) that performs the digital baseband signal processing and a protocol-stack-processor (e.g., CPU or MPU) that performs the control-plane processing.

The memory 2705 is composed of a combination of a volatile memory and a nonvolatile memory. The volatile memory is, for example, an SRAM, a DRAM, or a combination thereof. The nonvolatile memory is, for example, an MROM, a PROM, a flash memory, a hard disk drive, or a combination thereof. The memory 2705 may include a storage located apart from the processor 2704. In this case, the processor 2704 may access the memory 2705 through the network interface 2703 or an I/O interface (not shown).

The memory 2705 may store one or more software modules (computer programs) 2706 including instructions and data to perform processing by the node in the RAN 2 (e.g., CIoT BS or eNB) described in the above embodiments. In some implementations, the processor 2704 may load the one or more software modules 2706 from the memory 2705 and execute the loaded software modules, thereby performing the processing of any node in the RAN 2 described in the above embodiments.

Figure 28:
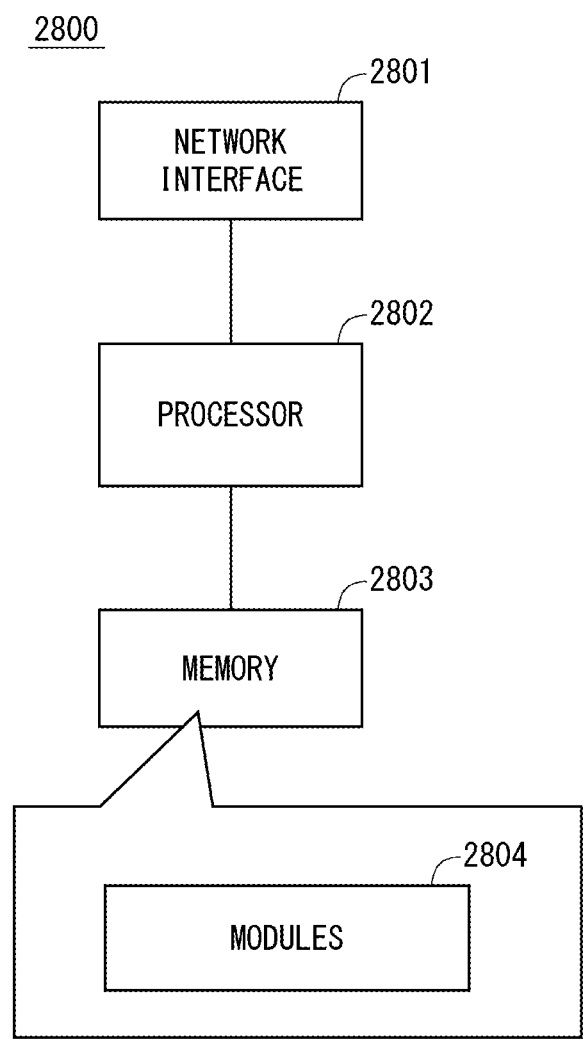
FIG. 28 is a block diagram showing a configuration example of a core network node according to some embodiments.

FIG. 28 is a block diagram showing a configuration example of a node in the CN 3 (e.g., C-SGN and MME) according to the above-described embodiments. As shown in FIG. 28, the node includes a network interface 2801, a processor 2802, and a memory 2803. The network interface 2801 is used to communicate with network nodes (e.g., C-SGN, MME, HSS, S-GW, P-GW, CIoT BS, and eNB). The network interface 2801 may include, for example, a network interface card (NIC) conforming to the IEEE 802.3 series.

The processor 2802 loads one or more software modules (computer programs) 2804 from the memory 2803 and executes the loaded software modules, thereby performing the processing of any node in the CN 3 (e.g., C-SGN or MME) described in the above embodiments. The processor 2802 may be, for example, a microprocessor, an MPU, or a CPU. The processor 2802 may include a plurality of processors.

The memory 2803 is composed of a combination of a volatile memory and a nonvolatile memory. The memory 2803 may include a storage located apart from the processor 2802. In this case, the processor 2802 may access the memory 2803 through an I/O interface (not shown).

As described above with reference to FIGS. 26 to 28, each of the processors included in the UE 1, the nodes in the RAN 2 and the nodes in the CN 3 in the above embodiments executes one or more programs including a set of instructions to cause a computer to perform an algorithm described above with reference to the drawings. These programs may be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a Compact Disc Read Only Memory (CD-ROM), CD-R, CD-R/W, and a semiconductor memory (such as a mask ROM, a Programmable ROM (PROM), an Erasable PROM (EPROM), a flash ROM, and a Random Access Memory (RAM)). These programs may be supplied to computers by using various types of transitory computer readable media. Examples of the transitory computer readable media include an electrical signal, an optical signal, and an electromagnetic wave. The transitory computer readable media can be used to supply programs to a computer through a wired communication line (e.g., electric wires and optical fibers) or a wireless communication line.

Other Embodiments

Each of the above embodiments may be used individually, or two or more of the embodiments may be appropriately combined with one another.

The RAN 2 described in the above embodiments may be a Cloud Radio Access Network (C-RAN). The C-RAN is also referred to as a Centralized RAN. In other words, the processes and the operations performed by the RAN 2, or the CIoT BS or the eNB in the RAN 2, described in the above embodiments may be provided by one or a combination of a Digital Unit (DU) and a Radio Unit (RU) included in the C-RAN architecture. The DU is also referred to as a Baseband Unit (BBU). The RU is also referred to as a Remote Radio Head (RRH) or Remote Radio Equipment (RRE). That is, the processes and the operations performed by the RAN 2, the CIoT BS, or the eNB described in the above embodiments may be provided by any one or more radio stations (RAN nodes).

The above-described embodiments may be applied to either or both of communication in NB-IoT and communication in LTE eMTC. Further, the above-described embodiments may be applied to communication of UEs according to LTE, LTE-Advanced and modifications thereof. Furthermore, the above-described embodiments are not limited to LTE, LTE-Advance and modifications thereof and may also be applied to other radio communication networks.

Further, the above-described embodiments are merely examples of applications of the technical ideas obtained by the inventors. These technical ideas are not limited to the above-described embodiments and various modifications may be made thereto.

This application is based upon and claims the benefit of priority from Japanese patent application No. 2015-256034, filed on Dec. 28, 2015, the disclosure of which is incorporated herein in its entirety by reference.

REFERENCE SIGNS LIST

1 USER EQUIPMENT (UE)
2 RADIO ACCESS NETWORK (RAN)
3 CORE NETWORK (CN)
4 APPLICATION SERVER
5 HOME SUBSCRIBER SERVER (HSS)
6 SERVING GATEWAY (S-GW)
2603 BASEBAND PROCESSOR
2604 APPLICATION PROCESSOR
2606 MEMORY
2704 PROCESSOR
2705 MEMORY
2802 PROCESSOR
2803 MEMORY

The invention claimed is:

1. A radio terminal comprising:
a memory; and
at least one processor coupled to the memory, wherein the at least one processor is configured to:
  support a first Cellular Internet of Things (CIoT) architecture which enables the radio terminal to transport user data over a control plane;
  support a second CIoT architecture which enables the radio terminal to transport user data over a user plane; and
  transmit to a radio station a Radio Resource Control (RRC) Connection Setup Complete message including an information element indicating to the radio station that the radio terminal supports the second CIoT architecture,
wherein the RCC Connection Setup Complete message further includes a Non-Access Stratum (NAS) message, the NAS message being different from the information element, and
wherein the information element is Access Stratum (AS) layer information and is not included in the NAS message.

2. The radio terminal according to claim 1, wherein the at least one processor is configured to receive a System Information Block (SIB) including at least one of a first information element and a second information element, the first information element indicating that the radio station supports the first CIoT architecture and the second information element indicating that the radio station the second CIoT architecture.

3. The radio terminal according to claim 1, wherein the at least one processor is configured to transmit a RRC Connection Request message to the radio station, receive a RRC Connection Setup message for the radio station, and transmit the RRC Connection Setup Complete message after receiving the RRC Connection Setup message.

4. The radio terminal according to claim 1, wherein the information element indicating to the radio station that the radio terminal supports the second CIoT architeture is RRC information not sent to a core network.

5. The radio terminal according to claim 1, wherein the information element indicating to the radio station that the radio terminal suports the second CIoT architecture is configured to be used by the radio station in selecting a core network node to which the NAS message is to be sent.

6. A radio station comprising:
a memory; and
at least one processor coupled to the memory and configured to:
receive a Radio Resource Control (RRC) Connection Setup Complete message from a radio terminal supporting a first Cellular Internet of Things (CIoT) architecture which enables the radio terminal to transport user data over a control plane and supporting a second CIoT architecture which enables the radio terminal to transport user data over a user plane,
wherein the RRC Connection Setup Complete message includes an information element indicating to the radio station that the radio terminal supports the second CIoT architecture,
wherein the RRC Conneciton Seetup Complete message further includes a Non-Access Stratum (NAS) message, the NAS message being different from the information element, and
wherein the information element is Access Stratum (AS) layer information and is not included in the NAS message.

7. The radio station according to claim 6, wherein the at least one processor is configured to transmit a System Information Block (SIB) including at least one of a first information element and a second information element, the first information element indicating that the radio station supports the first CIoT architecture and the second information element indicating that the radio station supports the second CIoT architecture.

8. The radio station according to claim 6, wherein the at least one processor is configured to recieve a RRC Connection Request message from the radio terminal, transmit a RRC Connection Setup message to the radio terminal, and receive the RRC Connection Setup Complete message after transmitting the RRC Connection Setup message.

9. The radio station according to claim 6, wherein the information element indicating to the radio station that the radio terminal supports the second CIoT architecture is RRC information not sent to a core network.

10. The radio station according to claim 6, wherein the information element indicating to the radio station that the radio terminal supports the second CIoT architecture is configured to be used by the radio station in selecting a core network node to which the NAS message is to be sent.

11. A method in a radio station, the method comprising:
receiving a Radio Resource Control (RRC) Connection Setup Complete message from a radio terminal supporting a first Cellular Internet of Things (CIoT) architecture which enables the radio terminal to transport user data over a control plane and supporting a second CIoT architecture which enables the radio terminal to transport user data over user plane,
wherein the RRC Connection Setup Complete message includes an information element indicating to the radio station that the radio terminal supports the second CIoT architecture,
wherein the RRC Connection Setup Complete message further includes a Non-Access Stratum (NAS) message, the NAS message being different from the information element, and
wherein the information element is Access Stratum (AS) layer information and is not included in the NAS message.

12. The method according to claim 11, the method further comprising transmitting a System Informatin Block (SIB) including at least one of a first information element and a second information element, the first information element indicating that the radio station supports the first CIoT architecture and the second information element indicating that the radio station supports the second CIoT architecture.

13. The method according to claim 11, the method further comprising:
receiving a RRC Connection Request message frtom the radio terminal; and
transmitting a RRC Connection Setup message to the radio terminal,
wherein said receiving the RRC Connection Setup Complete message includes receiving the RRC Connection Setup Complete message after transmitting the RRC Connection Setup message.

14. The method according to claim 11, wherein the information element indicating to the radio station that the radio terminal supports the second CIoT architecture is RRC information not sent to a core network.

15. The method according to claim 11, wherein the information element indicating to the radio station that the radio terminal supports the second CIoT architecture is used by the radio station in selecting a core network node to which the NAS message is to be sent.

16. A method of a radio teminal, the method comprising:
supporting a first Cellular Internet of Things (CIoT) architecture which enables the radio terminal to transport user data over a control plane;
supporting a second CIoT architecture which enables the radio terminal to transport user data over user plane; and
transmitting to a radio station a Radio Resource Control (RRC) Connection Setup Complete message including an information elemeent indicating to the radio station tht the radio terminal suports the second CIoT architecture,
wherein the RRC Connection Setup Complete message further includes a Non-Access Stratum (NAS) message, the NAS message being different from the information element, and
wherein the information element is Access Stratum (AS) layer information and is not included in the NAS message.

17. The method according to claim 16, wherein the information element indicating to the radio station that the radio terminal supports the second CIoT architecture is used by the radio station in selecting a core network node to which the NAS message is to be sent.

* * * * *